United States Patent
Lin et al.

(10) Patent No.: US 12,433,515 B2
(45) Date of Patent: *Oct. 7, 2025

(54) DRY ELECTROCHEMICAL IMPEDANCE SPECTROSCOPY METROLOGY FOR CONDUCTIVE CHEMICAL LAYERS

(71) Applicant: Medtronic MiniMed, Inc., Northridge, CA (US)

(72) Inventors: Chi-En Lin, Encino, CA (US); Akhil Srinivasan, Woodland Hills, CA (US); David L. Probst, Chandler, AZ (US); Melissa Tsang, Los Angeles, CA (US); Mohsen Askarinya, Chandler, AZ (US); Riley Clayton Kimball, Tempe, AZ (US); Robert McKinlay, West Hills, CA (US); Vu Nguyen, Chandler, AZ (US); Wally Dong, Chandler, AZ (US); Xin Heng, Glendale, CA (US); Brennan Toshner, Northridge, CA (US)

(73) Assignee: MEDTRONIC MINIMED, INC., Northridge, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 17/401,716

(22) Filed: Aug. 13, 2021

(65) Prior Publication Data
US 2023/0053254 A1  Feb. 16, 2023

(51) Int. Cl.
*A61B 5/1468* (2006.01)
*A61B 5/145* (2006.01)
(Continued)

(52) U.S. Cl.
CPC ........ *A61B 5/1468* (2013.01); *A61B 5/14532* (2013.01); *G01N 27/026* (2013.01);
(Continued)

(58) Field of Classification Search
CPC .............. G01N 27/26; G01N 27/3272; G01N 27/3274; G01N 27/333
See application file for complete search history.

(56) References Cited

U.S. PATENT DOCUMENTS 4,755,173 A  7/1988 Konopka et al.
5,391,250 A  2/1995 Cheney, II et al.
(Continued)

OTHER PUBLICATIONS

T.S. Chen, Determination of the Capacitance, Inductance, and Characteristic Impedance of Rectangular Lines, IRE Transactions on Microwave Theory and Techniques, Sep. 1960, p. 510-519. (Year: 1960).*

(Continued)

*Primary Examiner* — C. Sun
(74) *Attorney, Agent, or Firm* — GATES & COOPER LLP

(57) ABSTRACT

A method of testing one or more analyte sensors each comprising a first electrode; a second electrode; and a material layer disposed on or above the first electrode; the method including (a) applying a voltage potential to the first electrode with respect to the second electrode; (b) measuring a test signal comprising an output current from the first electrode that results from the application of the voltage potential; (c) using the test signal from (b) to observe an electrical characteristic of the analyte sensor; and (d) correlating the electrical characteristic a parameter associated with an electrochemical response of the analyte sensor to an analyte, wherein the testing is under dry conditions without exposure of the electrodes to a fluid containing the analyte or an in-vivo environment containing the analyte.

20 Claims, 44 Drawing Sheets

(51) Int. Cl.
    *G01N 27/02*     (2006.01)
    *G01N 27/26*     (2006.01)
    *G01N 27/327*     (2006.01)
    *G01N 27/333*     (2006.01)

(52) U.S. Cl.
    CPC ......... *G01N 27/26* (2013.01); *G01N 27/3272* (2013.01); *G01N 27/3274* (2013.01); *G01N 27/333* (2013.01); *A61B 2562/0271* (2013.01); *A61B 2562/168* (2013.01)

(56) References Cited

U.S. PATENT DOCUMENTS

| | | |
|---|---|---|
| 5,485,408 A | 1/1996 | Blomquist |
| 5,522,803 A | 6/1996 | Teissen-Simony |
| 5,665,065 A | 9/1997 | Colman et al. |
| 5,800,420 A | 9/1998 | Gross et al. |
| 5,807,375 A | 9/1998 | Gross et al. |
| 5,925,021 A | 7/1999 | Castellano et al. |
| 5,954,643 A | 9/1999 | Van Antwerp et al. |
| 6,017,328 A | 1/2000 | Fischell et al. |
| 6,186,982 B1 | 2/2001 | Gross et al. |
| 6,246,992 B1 | 6/2001 | Brown |
| 6,248,067 B1 | 6/2001 | Causey, III et al. |
| 6,248,093 B1 | 6/2001 | Moberg |
| 6,355,021 B1 | 3/2002 | Nielsen et al. |
| 6,379,301 B1 | 4/2002 | Worthington et al. |
| 6,544,212 B2 | 4/2003 | Galley et al. |
| 6,558,351 B1 | 5/2003 | Steil et al. |
| 6,591,876 B2 | 7/2003 | Safabash |
| 6,641,533 B2 | 11/2003 | Causey, III et al. |
| 6,736,797 B1 | 5/2004 | Larsen et al. |
| 6,749,587 B2 | 6/2004 | Flaherty |
| 6,766,183 B2 | 7/2004 | Walsh et al. |
| 6,801,420 B2 | 10/2004 | Talbot et al. |
| 6,804,544 B2 | 10/2004 | Van Antwerp et al. |
| 7,003,336 B2 | 2/2006 | Holker et al. |
| 7,029,444 B2 | 4/2006 | Shin et al. |
| 7,066,909 B1 | 6/2006 | Peter et al. |
| 7,137,964 B2 | 11/2006 | Flaherty |
| 7,303,549 B2 | 12/2007 | Flaherty et al. |
| 7,399,277 B2 | 7/2008 | Saidara et al. |
| 7,442,186 B2 | 10/2008 | Blomquist |
| 7,602,310 B2 | 10/2009 | Mann et al. |
| 7,647,237 B2 | 1/2010 | Malave et al. |
| 7,699,807 B2 | 4/2010 | Faust et al. |
| 7,727,148 B2 | 6/2010 | Talbot et al. |
| 7,785,313 B2 | 8/2010 | Mastrototaro |
| 7,806,886 B2 | 10/2010 | Kanderian, Jr. et al. |
| 7,819,843 B2 | 10/2010 | Mann et al. |
| 7,828,764 B2 | 11/2010 | Moberg et al. |
| 7,879,010 B2 | 2/2011 | Hunn et al. |
| 7,890,295 B2 | 2/2011 | Shin et al. |
| 7,892,206 B2 | 2/2011 | Moberg et al. |
| 7,892,748 B2 | 2/2011 | Norrild et al. |
| 7,901,394 B2 | 3/2011 | Ireland et al. |
| 7,942,844 B2 | 5/2011 | Moberg et al. |
| 7,946,985 B2 | 5/2011 | Mastrototaro et al. |
| 7,955,305 B2 | 6/2011 | Moberg et al. |
| 7,963,954 B2 | 6/2011 | Kavazov |
| 7,977,112 B2 | 7/2011 | Burke et al. |
| 7,979,259 B2 | 7/2011 | Brown |
| 7,985,330 B2 | 7/2011 | Wang et al. |
| 8,024,201 B2 | 9/2011 | Brown |
| 8,100,852 B2 | 1/2012 | Moberg et al. |
| 8,114,268 B2 | 2/2012 | Wang et al. |
| 8,114,269 B2 | 2/2012 | Cooper et al. |
| 8,137,314 B2 | 3/2012 | Mounce et al. |
| 8,181,849 B2 | 5/2012 | Bazargan et al. |
| 8,182,462 B2 | 5/2012 | Stoc et al. |
| 8,192,395 B2 | 6/2012 | Estes et al. |
| 8,195,265 B2 | 6/2012 | Goode, Jr. et al. |
| 8,202,250 B2 | 6/2012 | Stutz, Jr. |
| 8,207,859 B2 | 6/2012 | Enegren et al. |
| 8,226,615 B2 | 7/2012 | Bikovsky |
| 8,257,259 B2 | 9/2012 | Brauker et al. |
| 8,267,921 B2 | 9/2012 | Yodfat et al. |
| 8,275,437 B2 | 9/2012 | Brauker et al. |
| 8,277,415 B2 | 10/2012 | Mounce et al. |
| 8,292,849 B2 | 10/2012 | Bobroff et al. |
| 8,298,172 B2 | 10/2012 | Nielsen et al. |
| 8,303,572 B2 | 11/2012 | Adair et al. |
| 8,305,580 B2 | 11/2012 | Aasmul |
| 8,308,679 B2 | 11/2012 | Hanson et al. |
| 8,313,433 B2 | 11/2012 | Cohen et al. |
| 8,318,443 B2 | 11/2012 | Norrild et al. |
| 8,323,250 B2 | 12/2012 | Chong et al. |
| 8,343,092 B2 | 1/2013 | Rush et al. |
| 8,352,011 B2 | 1/2013 | Van Antwerp et al. |
| 8,353,829 B2 | 1/2013 | Say et al. |
| 11,311,215 B2 * | 4/2022 | Lin ..................... A61B 5/0031 |
| 2007/0123819 A1 | 5/2007 | Mernoe et al. |
| 2010/0160861 A1 | 6/2010 | Causey, III et al. |
| 2012/0006100 A1 | 1/2012 | Gottlieb et al. |
| 2015/0164382 A1 | 6/2015 | Varsavsky et al. |
| 2017/0311852 A1 * | 11/2017 | Morgan ............ A61B 5/14865 |
| 2019/0241926 A1 * | 8/2019 | McKinlay ............. C12Q 1/006 |
| 2020/0315504 A1 | 10/2020 | Lin et al. |

OTHER PUBLICATIONS

Balasubramani V. et al: "Impedance Spectroscopy-Based Reduced Graphene Oxide-Incorporated ZnO Composite Sensor for $H_2S$ Investigations", ACS OMEGA, [Online] vol. 4, No. 6, Jun. 7, 2019 (Jun. 7, 2019), pp. 9976-9982.

Extended European Search Report dated Dec. 9, 2022 for EP Application No. 22189641.8.

Patil Pallavi T. et al: "Development of Electrospun Polyaniline/ZnO Composite Nanofibers for LPG Sensing", Procedia Materials Science, vol. 10, Aug. 10, 2015 (Aug. 10, 2015), pp. 195-204.

European Communication pursuant to Article 94(3) EPC dated Dec. 13, 2024 for European Application No. 22189641.8.

* cited by examiner

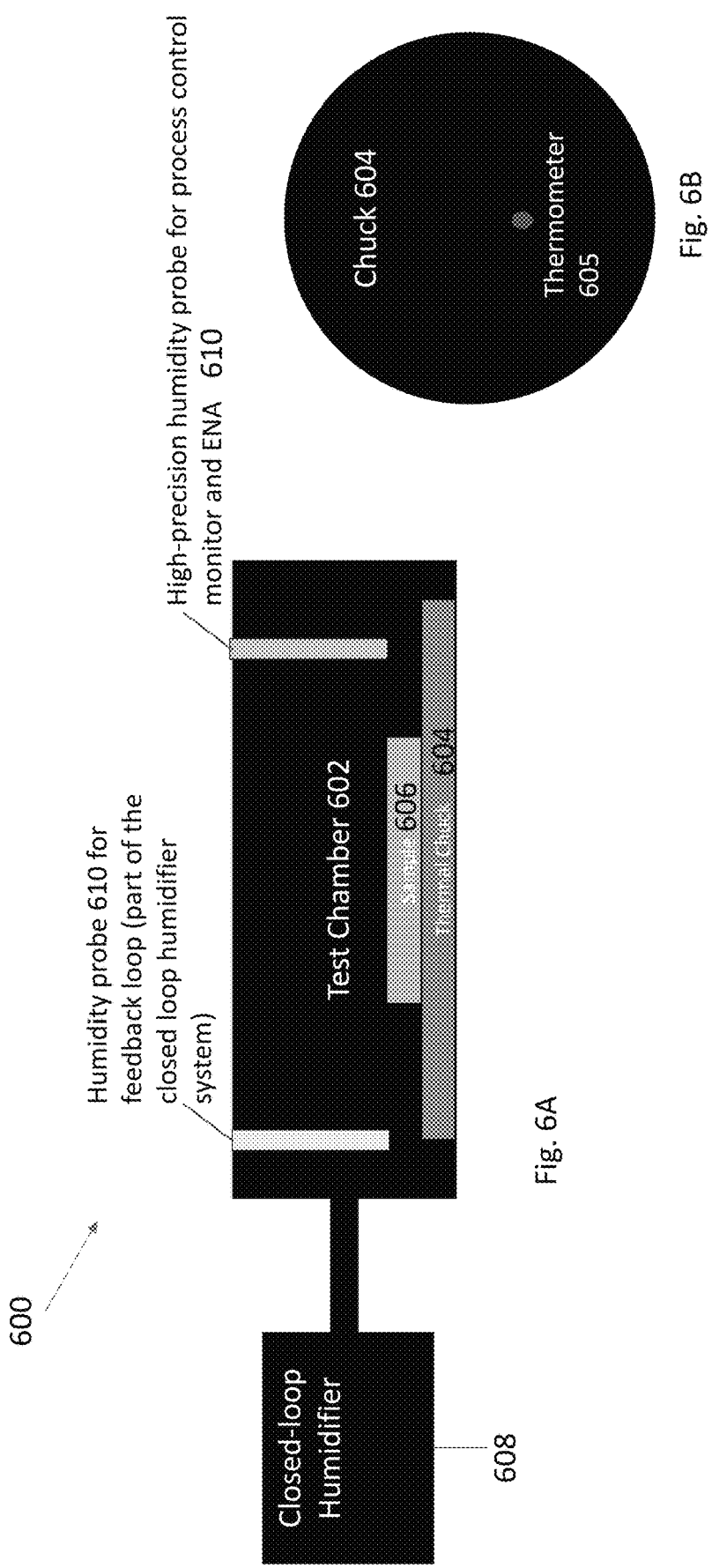

Day2-15, Glucose calibration, 120mg/dL

Day2-15, Glucose calibration, 400mg/dL

DRY ELECTROCHEMICAL IMPEDANCE SPECTROSCOPY METROLOGY FOR CONDUCTIVE CHEMICAL LAYERS

TECHNICAL FIELD

The invention relates to the use of electrical impedance spectroscopy to assess device parameters and/or material characteristics.

BACKGROUND OF THE INVENTION

Subjects/patients and medical personnel wish to monitor readings of physiological conditions within the subject's body. Illustratively, subjects wish to monitor blood glucose levels in a subject's body on a continuing basis. Presently, a patient can measure his/her blood glucose (BG) using a BG measurement device (i.e. glucose meter), such as a test strip meter, a continuous glucose measurement system (or a continuous glucose monitor), or a hospital hemacue. BG measurement devices use various methods to measure the BG level of a patient, such as a sample of the patient's blood, a sensor in contact with a bodily fluid, an optical sensor, an enzymatic sensor, or a fluorescent sensor. When the BG measurement device has generated a BG measurement, the measurement is displayed on the BG measurement device.

Biomolecule sensors such as continuous glucose monitoring (CGM) sensors include enzyme based electrochemical biosensors that consist of multiple electrochemical electrodes which measure a chemical substrate via relation of electricity and chemical change. In typical CGM sensors, each glucose sensor consists of various layers, with electrodes on one layer which provide the interchange between patient and sensor. In such sensors, each layer has defined properties such as a target thickness and electrochemical response for optimal functioning. Currently a reliable and effective method to measure properties such as the thickness of these material layers does not exist. By measuring properties such as the thickness or electrochemical response of each layer on electrodes in devices such as CGM sensors, the properties of such devices can be observed during manufacturing processes for quality control purposes.

There is a need in the field for additional methods and materials that allow artisans to assess device parameters and/or characteristics prior to delivery to a customer.

SUMMARY OF THE INVENTION

The invention disclosed herein provides methods and materials designed to test the operation of devices such as electrochemical analyte sensors using non-Faradaic Electrochemical Impedance Spectroscopy (EIS). Typically, in these methods, an AC voltage is applied to the desired analyte sensor while a test signal (e.g., output current) useful for determining an electrical characteristic (e.g., capacitance) is measured. This voltage can be applied at multiple frequencies in sweep mode in order to detect both the material and, for example the thickness, composition or architecture of the target material, or other properties useful for estimating an electrochemical response of the analyte sensor to an analyte. In this way, EIS allows the characterization of various properties of material layers found in devices such as amperometric glucose sensors in a non-destructive, sensitive and rapid manner.

Traditionally, electrochemistry, such as Electrochemical Impedance Spectroscopy (EIS), is performed in solution, with the diffusion of ions in solution facilitating electron transferring mechanisms. Such electron transferring mechanisms result in EIS signals that are dependent on the material's properties of a surface being tested, and in this way provide useful information on the sample/material being examined by such methods. However, in the absence of a solution, ion diffusion does not occur, and the EIS signal resembles open circuit, a situation which typically provides little information regarding a sample/material. As discussed in detail below, we have discovered that when a material being examined by such methods has sufficient electron mobility; and the overall electrochemical cell has sufficient surface capacitance, electron transfer can occur via electron hopping amongst charged materials in a sample/material (e.g. polymers) in the absence of fluid, a phenomena which can yield EIS signals useful to observe or extrapolate sample/material properties. We have harnessed this discovery to generate embodiments of the invention, termed "dry" EIS, methodologies which can be used as a dry electrical test to evaluate material properties in MEMS fabrication, thereby avoiding the traditional use of fluids (and their associated complications) in MEMS fabrication.

The invention disclosed herein has a number of embodiments. Embodiments of the invention include methods of testing an analyte sensor comprising a first electrode coupled to second electrode and wherein a material layer is disposed over at least the first electrode. These methods comprise applying a voltage potential to the first electrode (with respect to the second electrode); and then measuring a test signal comprising an output current that results from the application of the voltage potential. The methods then comprise using the measured output current to observe the electrical characteristic (e.g., capacitance) of the analyte sensor; and then correlating the capacitance with the property of the layer of material or a parameter associated with an electrochemical response of the analyte sensor.

The electrical characteristic (e.g., capacitance) can be used as a measure of the parameter associated with the electrochemical response and the method can further comprise comparing the parameter to one or more predetermined values so as to determine whether the electrochemical response (determined from the capacitance) enables a measurement of a concentration level of the analyte in the in-vivo environment that is useful for determining an administration of insulin to the body of a diabetic patient. The methods can be used to observe a variety of different properties of layer(s) of a material (e.g., high density amine layer) disposed in an electrochemical analyte sensor including, for example, the thickness of the material layer, the architecture or roughness of the material layer, the dielectric properties of the material layer, the concentration of one or more components in a composition that forms the material layer, or the homogeneity of a composition that forms the material layer. Advantageously, embodiments of the current method are quite rapid, and for example, take just 20 minutes to measure an entire wafer including 100 test sites (sensors), so that the measurement time per test site is around 10 seconds.

Embodiments of the invention allow for the indirect measurement of electrochemical response and/or material properties of compositions (e.g. material layer thickness) in devices such as electrochemical glucose sensors during manufacturing processes. In these methods, a fixed AC voltage is applied to the contact point (e.g. a designated test pad for such test, aka PCM) while the electrical characteristic is being measured, and this voltage is applied in frequency sweep mode to capture different behaviors of the material and/or analyte sensor at different frequencies. By applying a specific mathematical or other model of the measured impedance and capacitance, parameters associated with the electrochemical response, and specific material properties such as material thickness, can be estimated.

Embodiments of the invention can be used to monitor manufacturing processes and provide valuable data about process variability and sensor to sensor variability. In particular, minute differences in process variability can cause slight shifts in performance making calibration of the sensor difficult and increasing sensor to sensor performance variability. However, data from the EIS methodologies disclosed herein can be used as an input to algorithms to enable manufacturing calibration thereby overcoming these difficulties in sensor calibration, sensor to sensor variability, and the like.

Embodiments of the invention can be performed in controlled environments (e.g., controlled humidity and/or temperature) to increase the accuracy of the measurements. In one or more examples, the method includes normalizing the electrical characteristic to obtain a normalized electrical characteristic, thereby suppressing noise contributions to the electrical characteristic induced by any variability in the an environment of the analyte sensor during the testing. In one illustrative embodiment, the method comprises setting a humidity target value for a humidity of the environment; setting a temperature target value for a temperature of the environment; obtaining a first peak fluctuation (delta chuck temp) of the temperature with respect the temperature target value; obtaining a second peak fluctuation (delta % RH) of the humidity with respect to the humidity target value; determining an error in the electrical characteristic using a regression equation and fitting parameters including the first peak fluctuation and the second peak fluctuation; and the normalizing comprises subtracting the error from the electrical characteristic to obtain the normalized electrical characteristic. The present disclosure further describes an apparatus that can be used to perform the methods in a controlled environment.

The methods also enable automatic testing of a plurality of the analyte sensors in a batch; and recording the impedance characteristics for each of the analyte sensors in a database so that the measured capacitances are traceable to the each of the analyte sensors.

Other objects, features and advantages of the present invention will become apparent to those skilled in the art from the following detailed description. It is to be understood, however, that the detailed description and specific examples, while indicating some embodiments of the present invention are given by way of illustration and not limitation. Many changes and modifications within the scope of the present invention may be made without departing from the spirit thereof, and the invention includes all such modifications.

BRIEF DESCRIPTION OF THE DRAWINGS

FIG. 1A shows a schematic of EIS interrogation of an electrochemical cell. FIG. 1B shows a schematic of EIS data during interrogation of an electrochemical cell using AC voltage stimulus. FIG. 1C illustrates a Nyquist plot the relationship between imaginary impedance (Zimag) and real impedance (Zreal) at each frequency (each data point), as determined from the EIS data. FIG. 1D illustrates a variety of transformation data obtainable from the EIS data, including real part of the capacitance C', imaginary part of the capacitance C", magnitude of the capacitance |C|, C'/C", inverse of the capacitance M, M'=1/C', M"=1/C", |M|, M'/M", impedance Z, real part of the impedance Z', imaginary part of the impedance Z". Z'/Z", admittance Y=1/Z, Y'=1/Z', and Y"=1/Z". FIG. 1E illustrates a dry EIS signal is generated from charges in the chemical layer.

FIG. 2C shows the cross section of a WE and FIG. 2D illustrates the flow of the electrons from WE to CE in an glucose enzymatic reaction. In the example of FIG. 2C, GLM has a thickness of 12 micrometers, AP has a thickness of 1 micron, HSA has a thickness of 2-3 micrometers, Gox has a thickness of 7 microns, Pt has a thickness of 2 microns, Cr has a thickness of 200 Angstroms, and Ag has a thickness of 6200 Angstroms, and the polyimide has a thickness of 25 microns.

FIG. 6A-6D illustrate an example dry EIS testing system, wherein FIG. 6A is a cross-sectional schematic, FIG. 6B is a top view of the temperature chuck, FIG. 6C is a perspective view, and FIG. 6D illustrates the humidifier probe.

FIGS. 10A-10D illustrate normalization of the EIS signal with the environment normalization algorithm, wherein FIG. 10A is a normal probability plot plotting percentage versus standardized residual, FIG. 10B plots standardized residual versus fitted value, FIG. 10C is a histogram plotting frequency versus standardized residual, and FIG. 10D plots standardized residual versus observation order.

DETAILED DESCRIPTION OF THE INVENTION

Figure 1A:
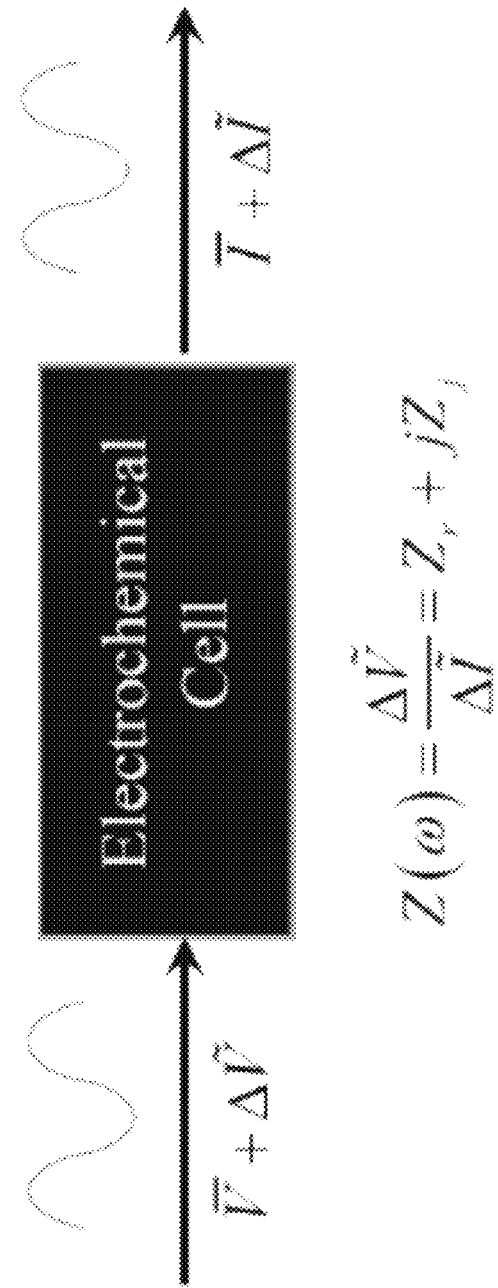
FIGS. 1A-1E show schematics of Electrochemical Impedance Spectroscopy phenomena and techniques useful in practicing embodiments of the invention.
Figure 1B:
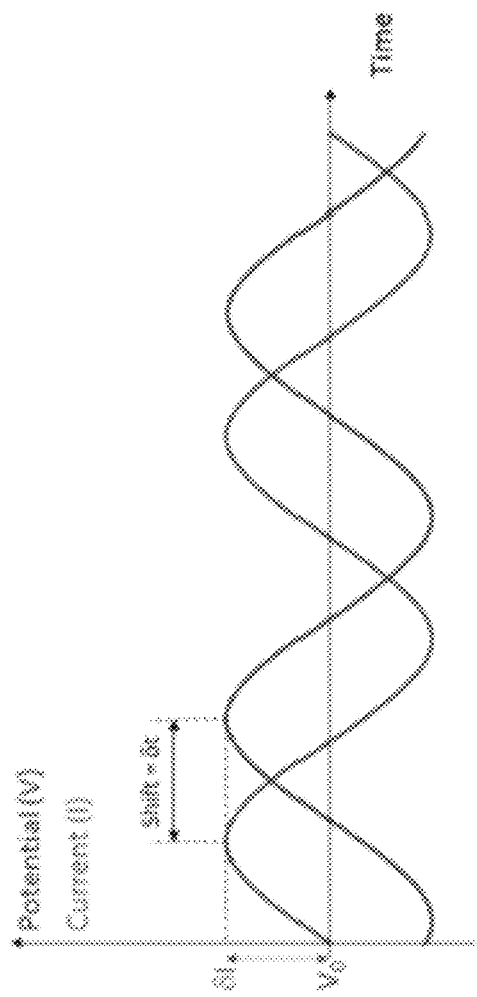
Figure 1C:
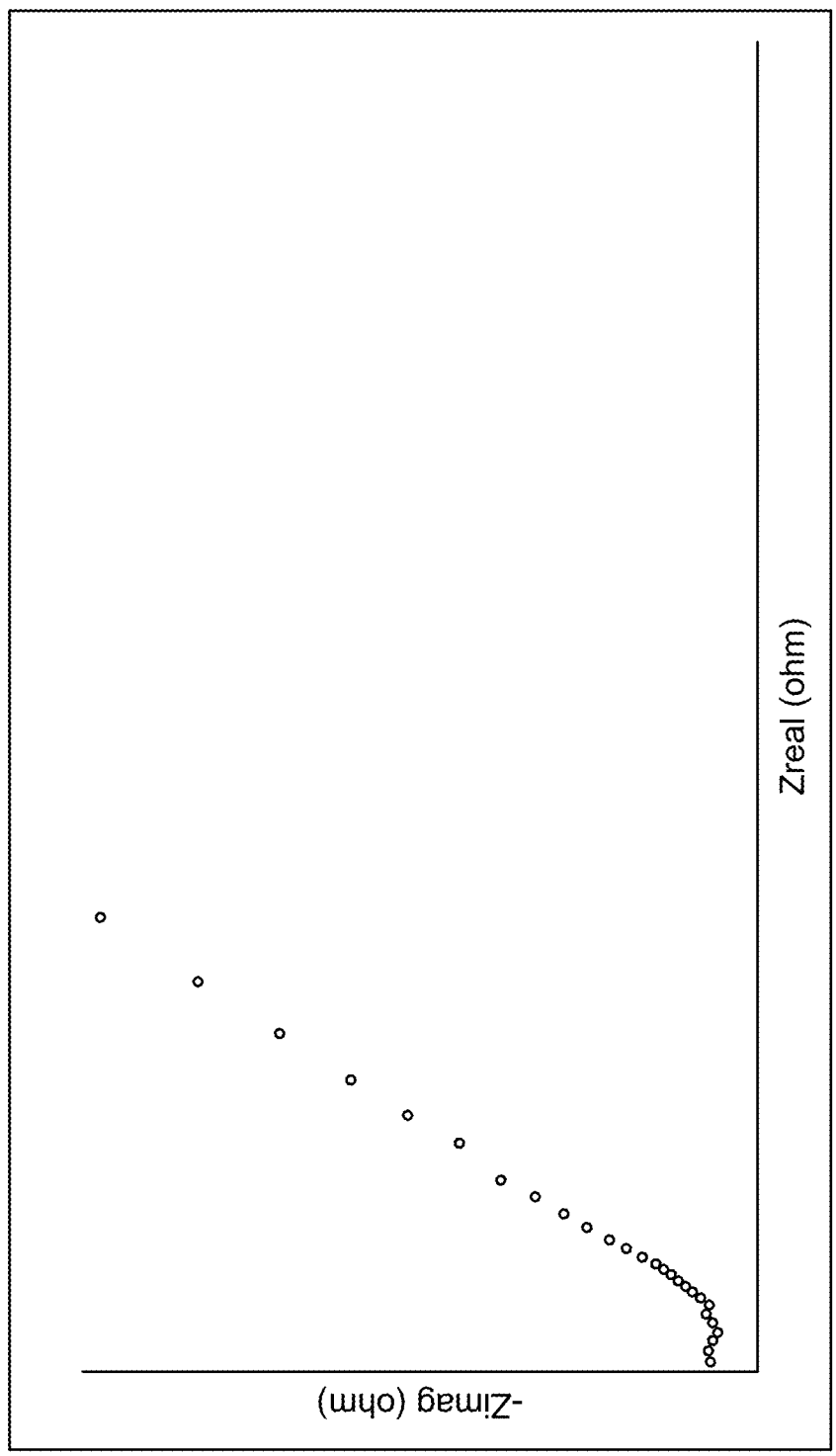
Figure 1D:
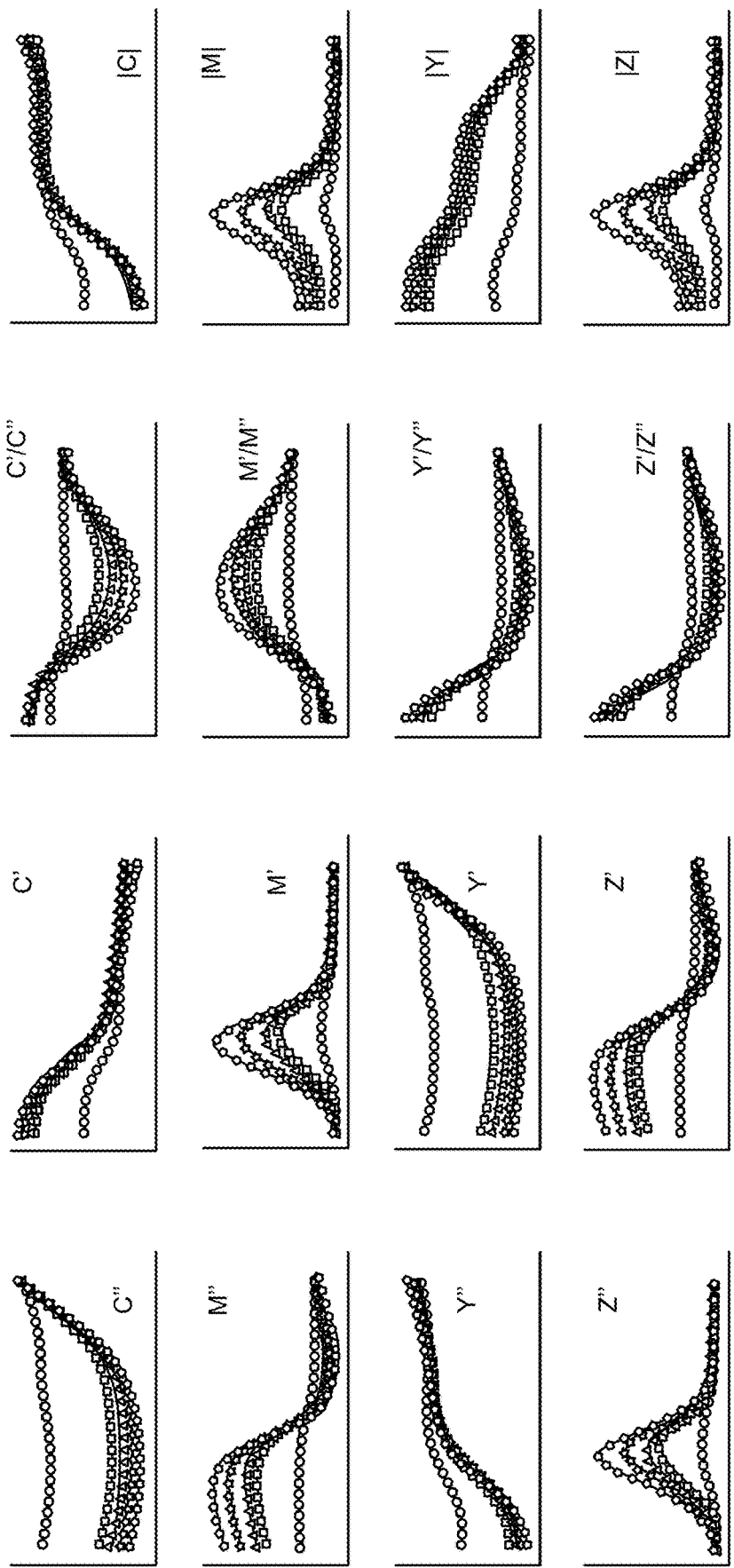
Figure 1E:
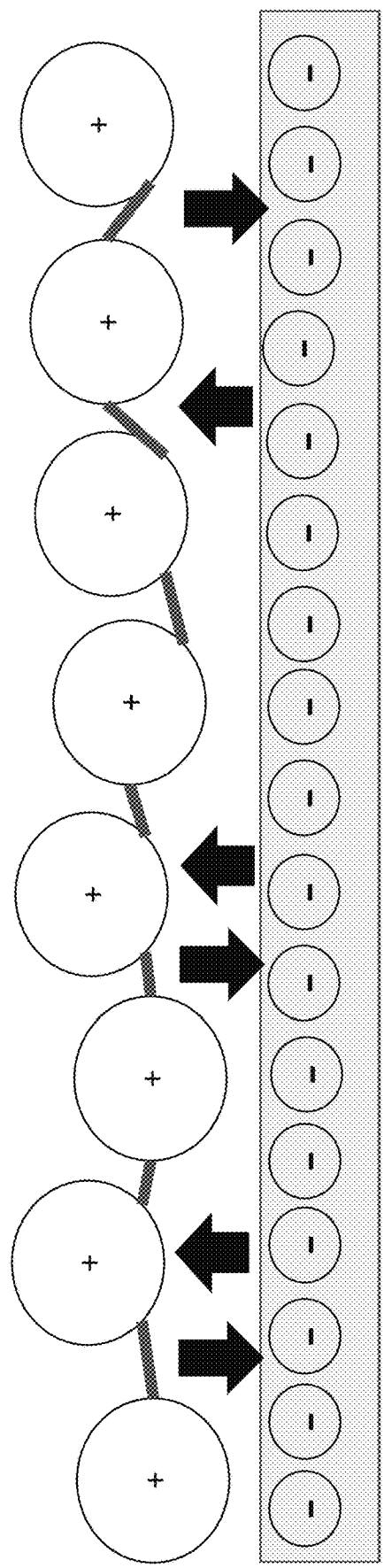

In the detailed description of the invention, references may be made to the accompanying drawings which form a part hereof, and in which is shown by way of illustration specific embodiments in which the invention may be practiced. It is to be understood that other embodiments may be utilized, and structural changes may be made without departing from the scope of the present invention. A number of different publications are also referenced herein as indicated throughout the specification. These and all publications, patents, and patent applications cited herein are hereby incorporated by reference in their entirety for all purposes.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are generally well understood and commonly employed using conventional methodology by those skilled in the art.

The inventions herein are described below with reference to flowchart illustrations of methods, systems, devices, apparatus, and programming and computer program products (see, e.g. the FIGS. 27 and 28). It will be understood that each block of the flowchart illustrations, and combinations of blocks in the flowchart illustrations, can be implemented by programing instructions, including computer program instructions (as can any menu screens described in the figures). These computer program instructions may be loaded onto a computer or other programmable data processing apparatus (such as a controller, microcontroller, or processor in a sensor electronics device) to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks, and/or menus presented herein. Programming instructions may also be stored in and/or implemented via electronic circuitry, including integrated circuits (ICs) and Application Specific Integrated Circuits (ASICs) used in conjunction with sensor devices, apparatuses, and systems.

Embodiments of the invention disclosed herein provide non-Faradaic Electrochemical Impedance Spectroscopy (EIS) methods and materials for examining elements (e.g. material layers) found in devices such as sensors of the type used, for example, in subcutaneous or transcutaneous monitoring of blood glucose levels in a diabetic patient. A variety of implantable, electrochemical biosensors have been developed for the treatment of diabetes and other life-threatening diseases. Many existing sensor designs use some form of immobilized enzyme to achieve their bio-specificity. Embodiments of the invention described herein can be adapted and implemented with a wide variety of known electrochemical sensors, including for example, U.S. Patent Application No. 20050115832, U.S. Pat. Nos. 6,001,067, 6,702,857, 6,212,416, 6,119,028, 6,400,974, 6,595,919, 6,141,573, 6,122,536, 6,512,939 5,605,152, 4,431,004, 4,703,756, 6,514,718, 5,985,129, 5,390,691, 5,391, 250, 5,482,473, 5,299,571, 5,568,806, 5,494,562, 6,120,676, 6,542,765, 7,033,336 as well as PCT International Publication Numbers WO 01/58348, WO 04/021877, WO 03/034902, WO 03/035117, WO 03/035891, WO 03/023388, WO 03/022128, WO 03/022352, WO 03/023708, WO 03/036255, WO03/036310 WO 08/042, 625, and WO 03/074107, and European Patent Application EP 1153571, the contents of each of which are incorporated herein by reference.

Illustrative Aspects and Embodiments of the Invention and Associated Materials and Methods Biomolecule sensors such as continuous glucose monitoring (CGM) sensors include enzyme based electrochemical biosensors that consist of multiple electrochemical electrodes which measure a chemical substrate via relation of electricity and chemical change. In CGM sensors, each glucose sensor consists of various layers, with electrodes on one layer which provide the interchange between patient and sensor. Each electrode contains multiple layers including but not limited to a base layer formed from materials such as polyimide, a metal layer formed from materials such as Cr and Au, an enzyme layer formed from materials such as glucose oxidase (GOx), layers that contain proteins such as human serum albumin, layers that contain adhesion promoting materials, and analyte modulating layers that modulate the diffusion of glucose therethrough. In such sensors, each layer has a target thickness for optimal functioning. The invention disclosed herein provides a reliable and effective method to measure various properties including the thickness of these material layers. By measuring the thickness of each material layer on each electrode, manufacturing quality parameters of the sensor can be observed.

The invention disclosure herein has a number of embodiments. Embodiments of the invention include methods of testing an analyte sensor comprising a first electrode electronically coupled to second electrode and including a material layer disposed over at least the first electrode. These methods comprise applying a voltage potential to the first electrode with respect to the second electrode; and then measuring an output current that results from the application of the voltage potential. These methods then comprise using the measured output current to observe capacitance of the analyte sensor; and then correlating the capacitance with the property of the layer of material or a parameter associated with an electrochemical response of the analyte sensor to an analyte.

The methods can include determining the parameter associated with the electrochemical response (e.g., isig) from the capacitance and comparing the parameter to one or more predetermined values so as to determine whether the estimated electrochemical response enables a measurement of a concentration level of the analyte in the in-vivo environment that is useful for determining an administration of insulin to the body of a diabetic patient.

These methods can be used to observe a variety of different properties of layer(s) of a material disposed in an electrochemical analyte sensor including, for example, the thickness of the material layer (e.g. to observe layers between 0.5 and 20 microns in thickness), the conductivity of the material layer, the architecture or roughness of the material layer, the concentration of one or more components in a composition that forms the material layer (e.g. water or glucose oxidase), or the homogeneity of a composition that forms the material layer.

Embodiments of the invention are designed to work quickly, with the method being performed in less than 60, 30 or 20 minutes. In certain embodiments of the invention, the frequency sweep used in the method is in a range from 0.1 to 1 megahertz (or from 1 Hz to 50 Hz, 10 Hz to 100 Hz, 10 Hz to 20 Hz, 100 Hz to 3,000 Hz, 9 Hz to 11 Hz, 1000 to 3,000 Hz, or 10,000 Hz to 30,000 Hz etc.); and/or the voltage potential is between 5 volts and −5 volts (e.g. 0 volts DC, and 50 millivolts AC). Typically, the methods include correlating the capacitance with the properties of the layer of material comprises application of a mathematical model of impedance and/or correlating the capacitance with empirically derived data from the sample/material being tested. In certain embodiment of this method no electrolyte or buffer is used, and therefore no ion is transferred between each electrode. In such embodiments, the impedance is solely based on the charge transfer within the material. In some embodiments, an "optimal frequency" or band of frequencies is identified such that the EIS measurement at that frequency represents an optimal balance between its sensitivity to the material of interest, as well as the test time, robustness to environmental noise, reduced signal to noise, etc., so as to obtain an accurate, reproducible, and scalable correlation between the dry EIS signal and the sensor performance in the presence of the analyte. The EIS measurement can be simplified down to applying only 1 frequency. This drastically reduces the measurement time to only a few seconds only, thereby enable dry EIS measurement as a practical method for in-process metrology. In one or more examples, the Dry EIS metrology is performed at 1 kHz, 0V DC, and 50 mV AC. In one or more examples, the frequency is in a range of 1-1000 Hz and is determined using a design of experiments process. Illustrative embodiments of the invention include estimating a thickness or amount of an HDA layer disposed on a glucose sensor, real and imaginary impedance of the analyte sensor, isig, a slope of isig, or an intercept of the isig curve. This method comprises applying a fixed alternating current voltage in a frequency sweep mode to the first electrode in a sensor architecture where the material layer is disposed over the first electrode. The method further comprises measuring an output current that results from the application of the alternating current voltage, and then using the output current measured observe or infer capacitance of the analyte sensor comprising the material layer. A final step in this method comprises correlating the capacitance with the thickness of the HDA, an amount of the HDA, real and imaginary impedance of the analyte sensor, isig, the slope of isig, or an intercept of isig (e.g. empirically via testing, and/or via application of a mathematical model of impedance).

The methods of the invention can be used to characterize electrochemical glucose sensors comprising 1, 2, 3, 4 or more working electrodes. As discussed in detail below, such layers include for example base layers (e.g. sensor support layers formed from a polyimide), conductive layers (e.g. those comprising one or more electrical elements such as electrodes), analyte sensing layer (e.g. those comprising an enzyme such as glucose oxidase), protein layers (e.g. those comprising polypeptides such as human serum albumin), adhesion promoting layers (e.g. those comprising a material that facilitates layer adherence such as a silane compound) and analyte modulating layer (e.g. a glucose limiting membrane that selectively limits the diffusion or glucose therethrough but not the diffusion of $O_2$ therethrough). In certain embodiments of the invention, the material layer studied is between 0.25 and 20 microns in thickness.

Moreover, while sensors are described herein as the typical devices on which the methods are practiced, these methods can be used to characterize a wide variety of other devices and the like including batteries and fuel cells.

Certain embodiments of the invention comprise dry EIS methods, and optionally include controlling the humidity of the environment under which the EIS procedure is performed. The results of such dry EIS methods are unexpected in view of what is conventionally known in this art (see, e.g. Müller et al., Sensors 2019, 19, 171; doi:10.3390/s19010171; and Hall et al., Review of Scientific Instruments 90, 015005 (2019)). As shown in FIGS. 7B-7C, there is a correlation between dry EIS function and humidity. In this context, some embodiments of the invention are designed to be performed at a selected relative humidity (RH), for example a RH that is greater than about 35% (e.g. practiced in an environment having between about 35%-55% RH). In addition, in certain embodiments of the invention, data obtained by the EIS method is evaluated by observing Zimag (ohms). In other embodiments of the invention, data is evaluated by observing capacitance (pF). In typical embodiments of the invention, capacitance is preferred over Zimag. Optionally, data is evaluated by observing capacitance and this data is then evaluated using a humidity normalization algorithm.

As disclosed herein, Electrochemical Impedance Spectroscopy (EIS) procedure are used to observe impedance-related parameters for one or more sensing electrodes. The parameters may include real impedance, imaginary impedance, impedance magnitude, and/or phase angle. The observed values of the impedance-related parameters are then used to obtain information on one or more layers of material disposed over an electrode. Advantageously, impedance-related parameters can be designed to be specific for a material layer of interest. Electrochemical Impedance Spectroscopy (EIS) methods that can be adapted for use with embodiments of the invention are well known in the art (e.g. U.S. Patent Publication Nos. 20150300969, 20130331676, 20110230741, 20080000779 and 20070170073, and International Publication Number WO 2013/184416). In this context, the general relation between the potential and the current (which is directly related with the amount of electrons and so the charge transfer via Faradays law) is:

$$i = i_0 \left( \frac{C_O}{C^*_O} \exp\left(\frac{\alpha nF\eta}{RT}\right) - \left(\frac{C_R}{C^*_R}\right) \exp\left(\frac{-(1-\alpha)nF\eta}{RT}\right)\right) \quad (1)$$

$I_0$=exchange current density
$C_O$=concentration of oxidant at the electrode surface
$C_O^*$=concentration of oxidant in the bulk
$C_R$=concentration of reductant at the electrode surface
η=overpotential
F=Faradays constant
T=temperature
R=gas constant
A=reaction order
N=number of electrons involved When the overpotential, η, is very small and the electrochemical system is at equilibrium, the expression for the charge-transfer resistance changes to $$R_{ct} = \frac{RT}{nFi_0} \quad (2)$$

From this equation the exchange current density can be calculated when $R_{ct}$ is known. As disclosed herein, such conventional EIS phenomena can be adapted to measure the electrochemical response and material properties of one or more layers of material in a device such as an amperometric glucose sensor.

In one or more examples, the EIS measurement determines capacitance using:

Z Total =

$$Z'(\text{real}) + Z''(\text{imaginary}) = R_s + \frac{R_{ct}}{\left(1 + (\omega C_{ct} R_{ct})^2\right)} + \frac{\omega C_{ct} R_{ct}^2}{\left(1 + (\omega C_{ct} R_{ct})^2\right)}$$

measured using the EIS as $Z_{total}=$ $$\frac{\Delta \tilde{V}}{\Delta \tilde{I}},$$

where $\Delta V$ is the applied voltage potential and $\Delta I$ is the measured output current in response to the voltage potential. Capacitance is determined from Ztotal using:

$$\text{Capacitance} = \frac{1}{2 * \pi * \text{frequency} * Z_{total}} \quad (4)$$

In typical glucose sensor embodiments of the invention, electrochemical glucose sensors are operatively coupled to a sensor input capable of receiving signals from the electrochemical sensor; and a processor coupled to the sensor input, wherein the processor is capable of characterizing one or more signals received from the electrochemical sensor. In certain embodiments of the invention, the electrical conduit of the electrode is coupled to a potentiostat. In certain embodiments of the invention, the processor is capable of comparing a first signal received from a working electrode in response to a first working potential with a second signal received from a working electrode in response to a second working potential. Optionally, the electrode is coupled to a processor adapted to convert data obtained from observing fluctuations in electrical current from a first format into a second format. Such embodiments include, for example, processors designed to convert a sensor current Input Signal (e.g. ISIG measured in nA) to a blood glucose concentration.

In some embodiments of the invention, the apparatus comprises a plurality of working electrodes, counter electrodes and reference electrodes, for example in an architecture where they are clustered together in units consisting essentially of one working electrode, one counter electrode and one reference electrode; and the clustered units are longitudinally distributed on the base layer in a repeating pattern of units. In some sensor embodiments, the distributed electrodes are organized/disposed within a flex-circuit assembly (i.e. a circuitry assembly that utilizes flexible rather than rigid materials). Such flex-circuit assembly embodiments provide an interconnected assembly of elements (e.g. electrodes, electrical conduits, contact pads and the like) configured to facilitate wearer comfort (for example by reducing pad stiffness and wearer discomfort).

In some embodiments of the invention, an analyte sensing layer is disposed over electrically conductive members, and includes an agent that is selected for its ability to detectably alter the electrical current at the working electrode in the presence of an analyte. In the working embodiments of the invention that are disclosed herein, the agent is glucose oxidase, a protein that undergoes a chemical reaction in the presence of glucose that results in an alteration in the electrical current at the working electrode. These working embodiments further include an analyte modulating layer disposed over the analyte sensing layer, wherein the analyte modulating layer modulates the diffusion of glucose as it migrates from an in vivo environment to the analyte sensing layer. In certain embodiments of the invention, the analyte modulating layer comprises a hydrophilic comb-copolymer having a central chain and a plurality of side chains coupled to the central chain, wherein at least one side chain comprises a silicone moiety. In certain embodiments of the invention, the analyte modulating layer comprises a blended mixture of: a linear polyurethane/polyurea polymer, and a branched acrylate polymer. In working embodiments of the present invention, the signal strength and $O_2$ response of the microarray sensor electrode can be increased with the use of a 2× permselective GLM (glucose limiting membrane). Typically, this analyte modulating layer composition comprises a first polymer formed from a mixture comprising a diisocyanate; at least one hydrophilic diol or hydrophilic diamine; and a siloxane; that is blended with a second polymer formed from a mixture comprising: a 2-(dimethylamino)ethyl methacrylate; a methyl methacrylate; a polydimethyl siloxane monomethacryloxypropyl; a poly(ethylene oxide) methyl ether methacrylate; and a 2-hydroxyethyl methacrylate. Additional material layers can be included in such apparatuses. For example, in some embodiments of the invention, the apparatus comprises an adhesion promoting layer disposed between the analyte sensing layer and the analyte modulating layer.

One sensor embodiment shown in FIG. 2 is an amperometric sensor 200 having a plurality of layered elements including a base layer 202 (e.g. one formed from a polymer disclosed herein), a conductive layer 204 (e.g. one comprising the plurality of electrically conductive members) which is disposed on and/or combined with the base layer 202. Typically, the conductive layer 204 comprises one or more electrodes. An analyte sensing layer 210 (typically comprising an enzyme such as glucose oxidase) can be disposed on one or more of the exposed electrodes of the conductive layer 204. A protein layer 216 can be disposed upon the analyte sensing layer 210. An analyte modulating layer 212 can be disposed above the analyte sensing layer 210 to regulate analyte (e.g. glucose) access with the analyte sensing layer 210. An adhesion promoter layer 214 is disposed between layers such as the analyte modulating layer 212 and the analyte sensing layer 210 as shown in FIG. 2 in order to facilitate their contact and/or adhesion. This embodiment also comprises a cover layer 206 such as a polymer surface coating disclosed herein can be disposed on portions of the sensor 200. Apertures 208 can be formed in one or more layers of such sensors. Amperometric glucose sensors having this type of design are disclosed, for example, in U.S. Patent Application Publication Nos. 20070227907, 20100025238, 20110319734 and 20110152654, the contents of each of which are incorporated herein by reference.

Specific aspects of embodiments of the invention are discussed in detail in the following sections.

Figure 3:
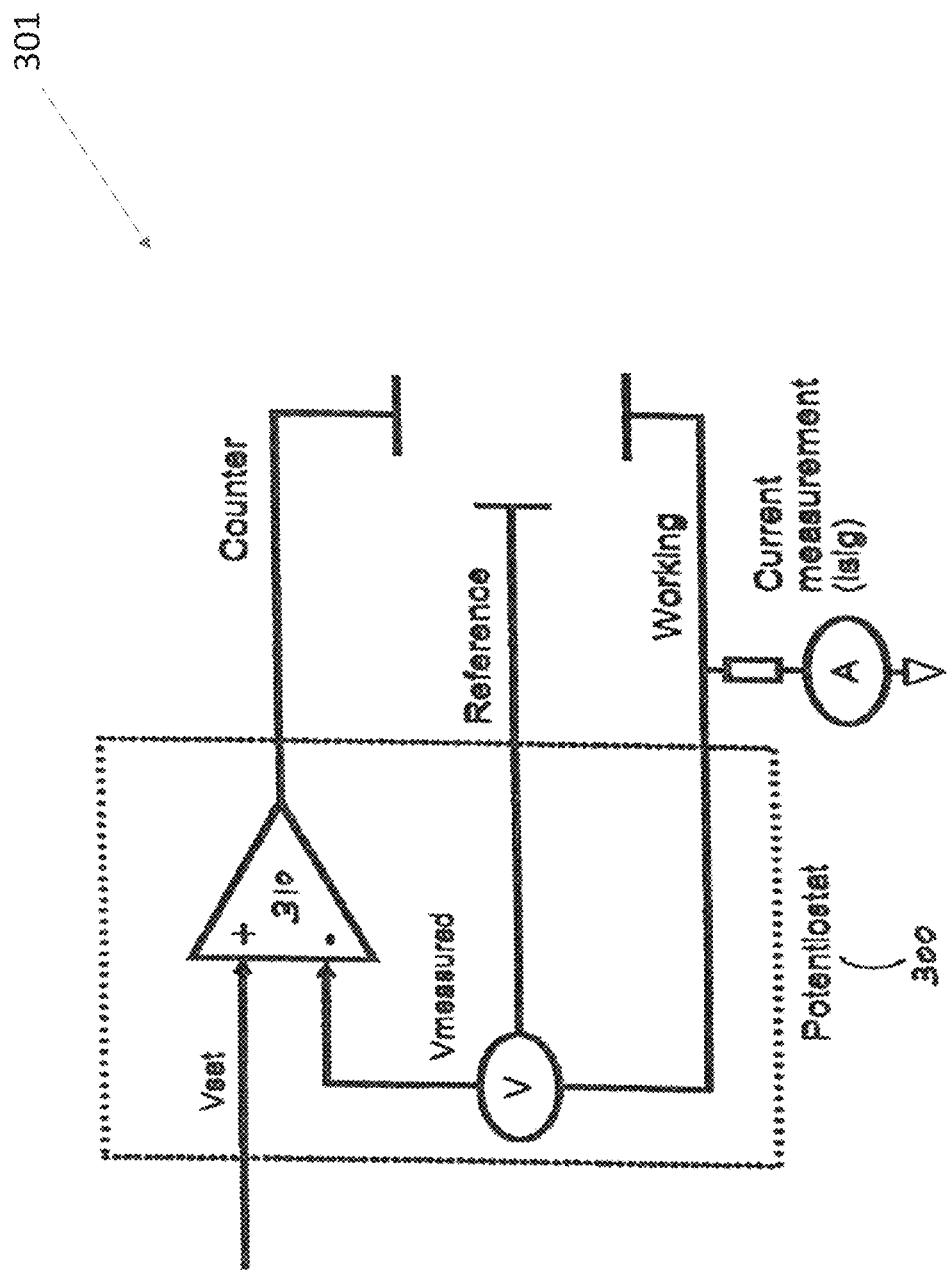
FIG. 3 shows a schematic of a potentiostat that may be used to measure current in embodiments of the present invention.
Figure 4:
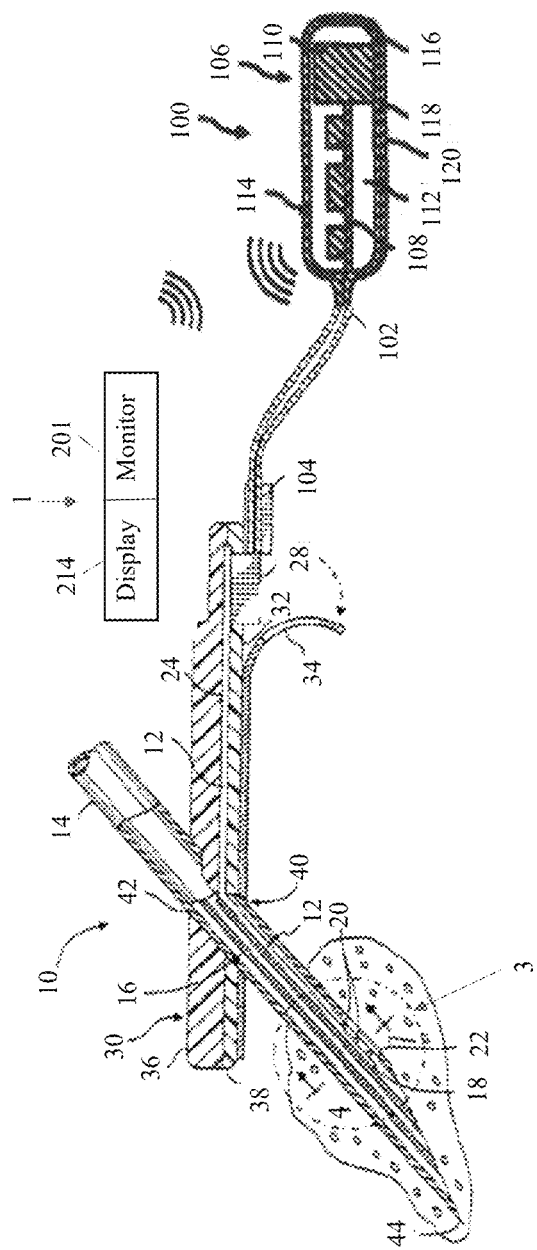
FIG. 4 provides a perspective view illustrating a subcutaneous sensor insertion set, a telemetered characteristic monitor transmitter device, and a data receiving device embodying features of the invention.

Typical Elements, Configurations and Analyte Sensor Embodiments of the Invention A. Typical Elements Found in of Embodiments of the Invention FIGS. 2, 3, and 4 provide illustrations of various sensor and sensor system embodiments of the invention.

FIG. 2 illustrates a cross-section of a typical sensor embodiment 200 of the present invention. This sensor embodiment is formed from a plurality of components that are typically in the form of layers of various conductive and non-conductive constituents disposed on each other according to art accepted methods and/or the specific methods of the invention disclosed herein. The components of the sensor are typically characterized herein as layers because, for example, it allows for a facile characterization of the sensor structure shown in FIG. 2. Artisans will understand however, that in certain embodiments of the invention, the sensor constituents are combined such that multiple constituents form one or more heterogeneous layers. In this context, those of skill in the art understand that the ordering of the layered constituents can be altered in various embodiments of the invention.

The embodiment shown in FIG. 2 includes a base layer 202 to support the sensor 200. The base layer 202 can be made of a material such as a polymeric surface having the constellation of elements disclosed herein, a metal and/or a ceramic, which may be self-supporting or further supported by another material as is known in the art. Embodiments of the invention include a conductive layer 204 which is disposed on and/or combined with the base layer 202. Typically, the conductive layer 204 comprises one or more electrically conductive elements that function as electrodes. An operating sensor 200 typically includes a plurality of electrodes such as a working electrode, a counter electrode and a reference electrode. Other embodiments may also include a plurality of working and/or counter and/or reference electrodes and/or one or more electrodes that performs multiple functions, for example one that functions as both as a reference and a counter electrode.

As discussed in detail below, the base layer 202 and/or conductive layer 204 can be generated using many known techniques and materials. In certain embodiments of the invention, the electrical circuit of the sensor is defined by etching the disposed conductive layer 204 into a desired pattern of conductive paths. A typical electrical circuit for the sensor 200 comprises two or more adjacent conductive paths with regions at a proximal end to form contact pads and regions at a distal end to form sensor electrodes. An electrically insulating cover layer 206 such as a polymer coating can be disposed on portions of the sensor 200. Acceptable polymer coatings for use as the insulating protective cover layer 206 can include, but are not limited to polymers having the constellation of features disclosed herein, non-toxic biocompatible polymers such as silicone compounds, polyimides, biocompatible solder masks, epoxy acrylate copolymers, or the like. In the sensors of the present invention, one or more exposed regions or apertures 208 can be made through the cover layer 206 to open the conductive layer 204 to the external environment and to, for example, allow an analyte such as glucose to permeate the layers of the sensor and be sensed by the sensing elements. Apertures 208 can be formed by a number of techniques, including laser ablation, tape masking, chemical milling or etching or photolithographic development or the like. In certain embodiments of the invention, during manufacture, a secondary photoresist can also be applied to the protective layer 206 to define the regions of the protective layer to be removed to form the aperture(s) 208. The exposed electrodes and/or contact pads can also undergo secondary processing (e.g. through the apertures 208), such as additional plating processing, to prepare the surfaces and/or strengthen the conductive regions.

In the sensor configuration shown in FIG. 2, an analyte sensing layer 210 is disposed on one or more of the exposed electrodes of the conductive layer 204. Typically, the analyte sensing layer 210 is an enzyme layer. Most typically, the analyte sensing layer 210 comprises an enzyme capable of producing and/or utilizing oxygen and/or hydrogen peroxide, for example the enzyme glucose oxidase. Optionally the enzyme in the analyte sensing layer is combined with a second carrier protein such as human serum albumin, bovine serum albumin or the like. In an illustrative embodiment, an oxidoreductase enzyme such as glucose oxidase in the analyte sensing layer 210 reacts with glucose to produce hydrogen peroxide, a compound which then modulates a current at an electrode. As this modulation of current depends on the concentration of hydrogen peroxide, and the concentration of hydrogen peroxide correlates to the concentration of glucose, the concentration of glucose can be determined by monitoring this modulation in the current.

In embodiments of the invention, the analyte sensing layer 210 can be applied over portions of the conductive layer or over the entire region of the conductive layer. Typically, the analyte sensing layer 210 is disposed on the working electrode which can be the anode or the cathode. Optionally, the analyte sensing layer 210 is also disposed on a counter and/or reference electrode. Methods for generating a thin analyte sensing layer 210 include brushing the layer onto a substrate (e.g. the reactive surface of a platinum black electrode), as well as spin coating processes, dip and dry processes, low shear spraying processes, ink-jet printing processes, silk screen processes and the like. In certain embodiments of the invention, brushing is used to: (1) allow for a precise localization of the layer; and (2) push the layer deep into the architecture of the reactive surface of an electrode (e.g. platinum black produced by an electrodeposition process).

Typically, the analyte sensing layer 210 is coated and or disposed next to one or more additional layers. Optionally, the one or more additional layers includes a protein layer 216 disposed upon the analyte sensing layer 210. Typically, the protein layer 216 comprises a protein such as human serum albumin, bovine serum albumin or the like. Typically, the protein layer 116 comprises human serum albumin. In some embodiments of the invention, an additional layer includes an analyte modulating layer 212 that is disposed above the analyte sensing layer 210 to regulate analyte contact with the analyte sensing layer 210. For example, the analyte modulating membrane layer 212 can comprise a glucose limiting membrane, which regulates the amount of glucose that contacts an enzyme such as glucose oxidase that is present in the analyte sensing layer. Such glucose limiting membranes can be made from a wide variety of materials known to be suitable for such purposes, e.g., silicone compounds such as polydimethyl siloxanes, polyurethanes, polyurea cellulose acetates, Nafion, polyester sulfonic acids (e.g. Kodak AQ), hydrogels or any other suitable hydrophilic membranes known to those skilled in the art.

In typical embodiments of the invention, an adhesion promoter layer 214 is disposed between the analyte modulating layer 212 and the analyte sensing layer 210 as shown in FIG. 2 in order to facilitate their contact and/or adhesion. In a specific embodiment of the invention, an adhesion promoter layer 214 is disposed between the analyte modulating layer 212 and the protein layer 216 as shown in FIG. 2 in order to facilitate their contact and/or adhesion. The adhesion promoter layer 214 can be made from any one of a wide variety of materials known in the art to facilitate the bonding between such layers. Typically, the adhesion promoter layer 214 comprises a silane compound. In alternative embodiments, protein or like molecules in the analyte sensing layer 210 can be sufficiently crosslinked or otherwise prepared to allow the analyte modulating membrane layer 212 to be disposed in direct contact with the analyte sensing layer 210 in the absence of an adhesion promoter layer 214.

B. Typical Analyte Sensor Layer/Constituents Observed in Embodiments of the Invention The following disclosure provides examples of typical layers/constituents that can be observed by EIS in sensor embodiments of the invention. While these elements can be described as discreet units (e.g. layers), those of skill in the art understand that sensors can be designed to contain elements having a combination of some or all of the material properties and/or functions of the elements/constituents discussed below (e.g. an element that serves both as a supporting base constituent and/or a conductive constituent and/or a matrix for the analyte sensing constituent and which further functions as an electrode in the sensor). Those in the art understand that these thin film analyte sensors can be adapted for use in a number of sensor systems such as those described below.

Base Constituent

Sensors of the invention typically include a base constituent (see, e.g. element 202 in FIG. 2). The term "base constituent" is used herein according to art accepted terminology and refers to the constituent in the apparatus that typically provides a supporting matrix for the plurality of constituents that are stacked on top of one another and comprise the functioning sensor. In one form, the base constituent comprises a thin film sheet of insulative (e.g. electrically insulative and/or water impermeable) material such as a polymer comprising a surface having the constellation of features disclosed herein that function to modulate immune response. This base constituent can be made of a wide variety of materials having desirable qualities such as the constellation of features disclosed herein as well as dielectric properties, water impermeability and hermeticity. Some materials include metallic, and/or ceramic and/or polymeric substrates or the like.

Conductive Constituent

The electrochemical sensors of the invention typically include a conductive constituent disposed upon the base constituent that includes at least one electrode for contacting an analyte or its byproduct (e.g. oxygen and/or hydrogen peroxide) to be assayed (see, e.g. element 204 in FIG. 2). The term "conductive constituent" is used herein according to art accepted terminology and refers to electrically conductive sensor elements such as a plurality of electrically conductive members disposed on the base layer in an array (e.g. so as to form a microarray electrode) and which are capable of measuring a detectable signal and conducting this to a detection apparatus. An illustrative example of this is a conductive constituent that forms a working electrode that can measure an increase or decrease in current in response to exposure to a stimuli such as the change in the concentration of an analyte or its byproduct as compared to a reference electrode that does not experience the change in the concentration of the analyte, a coreactant (e.g. oxygen) used when the analyte interacts with a composition (e.g. the enzyme glucose oxidase) present in analyte sensing constituent 210 or a reaction product of this interaction (e.g. hydrogen peroxide). Illustrative examples of such elements include electrodes which are capable of producing variable detectable signals in the presence of variable concentrations of molecules such as hydrogen peroxide or oxygen.

In addition to the working electrode, the analyte sensors of the invention typically include a reference electrode or a combined reference and counter electrode (also termed a quasi-reference electrode or a counter/reference electrode). If the sensor does not have a counter/reference electrode then it may include a separate counter electrode, which may be made from the same or different materials as the working electrode. Typical sensors of the present invention have one or more working electrodes and one or more counter, reference, and/or counter/reference electrodes. One embodiment of the sensor of the present invention has two, three or four or more working electrodes. These working electrodes in the sensor may be integrally connected or they may be kept separate. Optionally, the electrodes can be disposed on a single surface or side of the sensor structure. Alternatively, the electrodes can be disposed on a multiple surfaces or sides of the sensor structure (and can for example be connected by vias through the sensor material(s) to the surfaces on which the electrodes are disposed). In certain embodiments of the invention, the reactive surfaces of the electrodes are of different relative areas/sizes, for example a 1× reference electrode, a 2.6× working electrode and a 3.6× counter electrode.

Interference Rejection Constituent

The electrochemical sensors of the invention optionally include an interference rejection constituent disposed between the surface of the electrode and the environment to be assayed. In particular, certain sensor embodiments rely on the oxidation and/or reduction of hydrogen peroxide generated by enzymatic reactions on the surface of a working electrode at a constant potential applied. Because amperometric detection based on direct oxidation of hydrogen peroxide requires a relatively high oxidation potential, sensors employing this detection scheme may suffer interference from oxidizable species that are present in biological fluids such as ascorbic acid, uric acid and acetaminophen. In this context, the term "interference rejection constituent" is used herein according to art accepted terminology and refers to a coating or membrane in the sensor that functions to inhibit spurious signals generated by such oxidizable species which interfere with the detection of the signal generated by the analyte to be sensed. Certain interference rejection constituents function via size exclusion (e.g. by excluding interfering species of a specific size). Examples of interference rejection constituents include one or more layers or coatings of compounds such as hydrophilic polyurethanes, cellulose acetate (including cellulose acetate incorporating agents such as poly(ethylene glycol), polyethersulfones, polytetra-fluoroethylenes, the perfluorinated ionomer Nafion™, polyphenylenediamine, epoxy and the like.

Analyte Sensing Constituent

The electrochemical sensors of the invention include an analyte sensing constituent disposed on the electrodes of the sensor (see, e.g. element 210 in FIG. 2). The term "analyte sensing constituent" is used herein according to art accepted terminology and refers to a constituent comprising a material that is capable of recognizing or reacting with an analyte whose presence is to be detected by the analyte sensor apparatus. Typically this material in the analyte sensing constituent produces a detectable signal after interacting with the analyte to be sensed, typically via the electrodes of the conductive constituent. In this regard, the analyte sensing constituent and the electrodes of the conductive constituent work in combination to produce the electrical signal that is read by an apparatus associated with the analyte sensor. Typically, the analyte sensing constituent comprises an oxidoreductase enzyme capable of reacting with and/or producing a molecule whose change in concentration can be measured by measuring the change in the current at an electrode of the conductive constituent (e.g. oxygen and/or hydrogen peroxide), for example the enzyme glucose oxidase. An enzyme capable of producing a molecule such as hydrogen peroxide can be disposed on the electrodes according to a number of processes known in the art. The analyte sensing constituent can coat all or a portion of the various electrodes of the sensor. In this context, the analyte sensing constituent may coat the electrodes to an equivalent degree. Alternatively, the analyte sensing constituent may coat different electrodes to different degrees, with for example the coated surface of the working electrode being larger than the coated surface of the counter and/or reference electrode.

Typical sensor embodiments of this element of the invention utilize an enzyme (e.g. glucose oxidase) that has been combined with a second protein (e.g. albumin) in a fixed ratio (e.g. one that is typically optimized for glucose oxidase stabilizing properties) and then applied on the surface of an electrode to form a thin enzyme constituent. In a typical embodiment, the analyte sensing constituent comprises a GOx and HSA mixture. In a typical embodiment of an analyte sensing constituent having GOx, the GOx reacts with glucose present in the sensing environment (e.g. the body of a mammal) and generates hydrogen peroxide.

As noted above, the enzyme and the second protein (e.g. an albumin) are typically treated to form a crosslinked matrix (e.g. by adding a cross-linking agent to the protein mixture). As is known in the art, crosslinking conditions may be manipulated to modulate factors such as the retained biological activity of the enzyme, its mechanical and/or operational stability. Illustrative crosslinking procedures are described in U.S. patent application Ser. No. 10/335,506 and PCT publication WO 03/035891 which are incorporated herein by reference. For example, an amine cross-linking reagent, such as, but not limited to, glutaraldehyde, can be added to the protein mixture. The addition of a cross-linking reagent to the protein mixture creates a protein paste. The concentration of the cross-linking reagent to be added may vary according to the concentration of the protein mixture. While glutaraldehyde is an illustrative crosslinking reagent, other cross-linking reagents may also be used or may be used in place of glutaraldehyde. Other suitable cross-linkers also may be used, as will be evident to those skilled in the art.

As noted above, in some embodiments of the invention, the analyte sensing constituent includes an agent (e.g. glucose oxidase) capable of producing a signal (e.g. a change in oxygen and/or hydrogen peroxide concentrations) that can be sensed by the electrically conductive elements (e.g. electrodes which sense changes in oxygen and/or hydrogen peroxide concentrations). However, other useful analyte sensing constituents can be formed from any composition that is capable of producing a detectable signal that can be sensed by the electrically conductive elements after interacting with a target analyte whose presence is to be detected. In some embodiments, the composition comprises an enzyme that modulates hydrogen peroxide concentrations upon reaction with an analyte to be sensed. Alternatively, the composition comprises an enzyme that modulates oxygen concentrations upon reaction with an analyte to be sensed. In this context, a wide variety of enzymes that either use or produce hydrogen peroxide and/or oxygen in a reaction with a physiological analyte are known in the art and these enzymes can be readily incorporated into the analyte sensing constituent composition. A variety of other enzymes known in the art can produce and/or utilize compounds whose modulation can be detected by electrically conductive elements such as the electrodes that are incorporated into the sensor designs described herein. Such enzymes include for example, enzymes specifically described in Table 1, pages 15-29 and/or Table 18, pages 111-112 of Protein Immobilization: Fundamentals and Applications (Bioprocess Technology, Vol 14) by Richard F. Taylor (Editor) Publisher: Marcel Dekker; Jan. 7, 1991) the entire contents of which are incorporated herein by reference.

Protein Constituent

The electrochemical sensors of the invention optionally include a protein constituent disposed between the analyte sensing constituent and the analyte modulating constituent (see, e.g. element 216 in FIG. 2). The term "protein constituent" is used herein according to art accepted terminology and refers to constituent containing a carrier protein or the like that is selected for compatibility with the analyte sensing constituent and/or the analyte modulating constituent. In typical embodiments, the protein constituent comprises an albumin such as human serum albumin. The HSA concentration may vary between about 0.5%-30% (w/v). Typically the HSA concentration is about 1-10% w/v, and most typically is about 5% w/v. In alternative embodiments of the invention, collagen or BSA or other structural proteins used in these contexts can be used instead of or in addition to HSA. This constituent is typically crosslinked on the analyte sensing constituent according to art accepted protocols.

Adhesion Promoting Constituent

The electrochemical sensors of the invention can include one or more adhesion promoting (AP) constituents (see, e.g. element 214 in FIG. 2). The term "adhesion promoting constituent" is used herein according to art accepted terminology and refers to a constituent that includes materials selected for their ability to promote adhesion between adjoining constituents in the sensor. Typically, the adhesion promoting constituent is disposed between the analyte sensing constituent and the analyte modulating constituent. Typically, the adhesion promoting constituent is disposed between the optional protein constituent and the analyte modulating constituent. The adhesion promoter constituent can be made from any one of a wide variety of materials known in the art to facilitate the bonding between such constituents and can be applied by any one of a wide variety of methods known in the art. Typically, the adhesion promoter constituent comprises a silane compound such as γ-aminopropyltrimethoxysilane.

Analyte Modulating Constituent

The electrochemical sensors of the invention include an analyte modulating constituent disposed on the sensor (see, e.g. element 212 in FIG. 2). The term "analyte modulating constituent" is used herein according to art accepted terminology and refers to a constituent that typically forms a membrane on the sensor that operates to modulate the diffusion of one or more analytes, such as glucose, through the constituent. In certain embodiments of the invention, the analyte modulating constituent is an analyte-limiting membrane which operates to prevent or restrict the diffusion of one or more analytes, such as glucose, through the constituents. In other embodiments of the invention, the analyte-modulating constituent operates to facilitate the diffusion of one or more analytes, through the constituents. Optionally such analyte modulating constituents can be formed to prevent or restrict the diffusion of one type of molecule through the constituent (e.g. glucose), while at the same time allowing or even facilitating the diffusion of other types of molecules through the constituent (e.g. $O_2$).

High-Density Amine Constituent

Figure 2A:
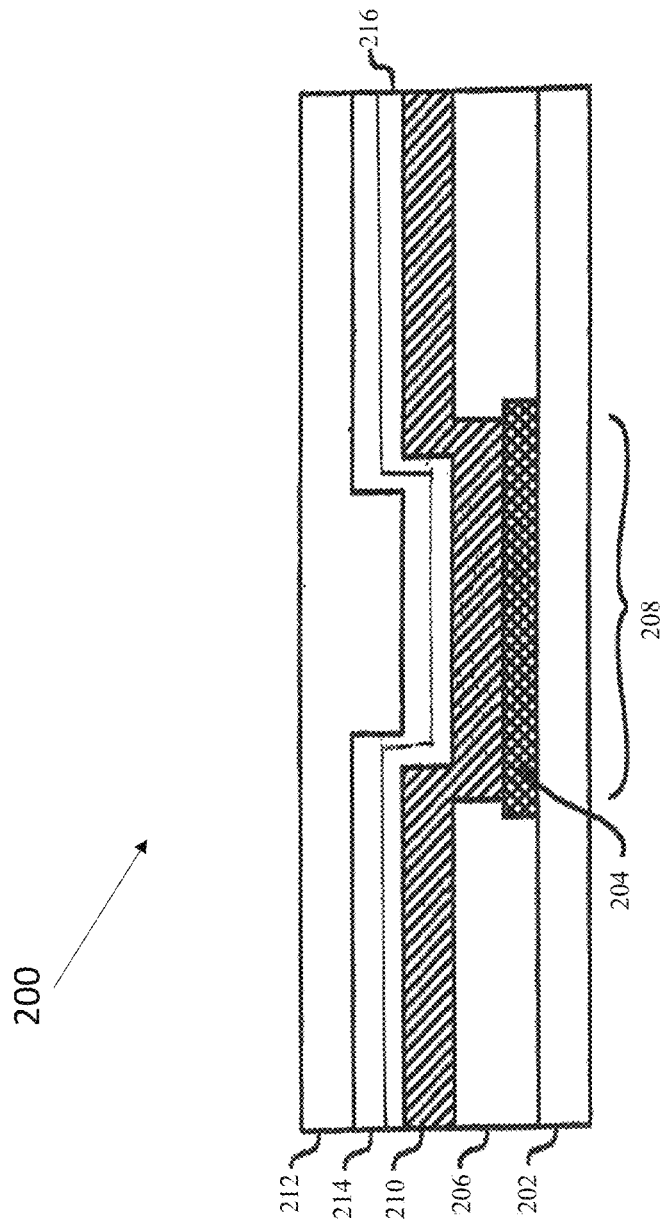
FIGS. 2A-2D provide schematics showing a sensor design comprising an amperometric analyte sensor formed from a plurality of planar layered elements which include albumin protein layer and an adhesion promoter layer (FIG. 2A); and a schematic showing differences between the multilayer sensor stack of FIG. 2A and sensor stacks having a high density amine layer (FIG. 2B).
Figure 2B:
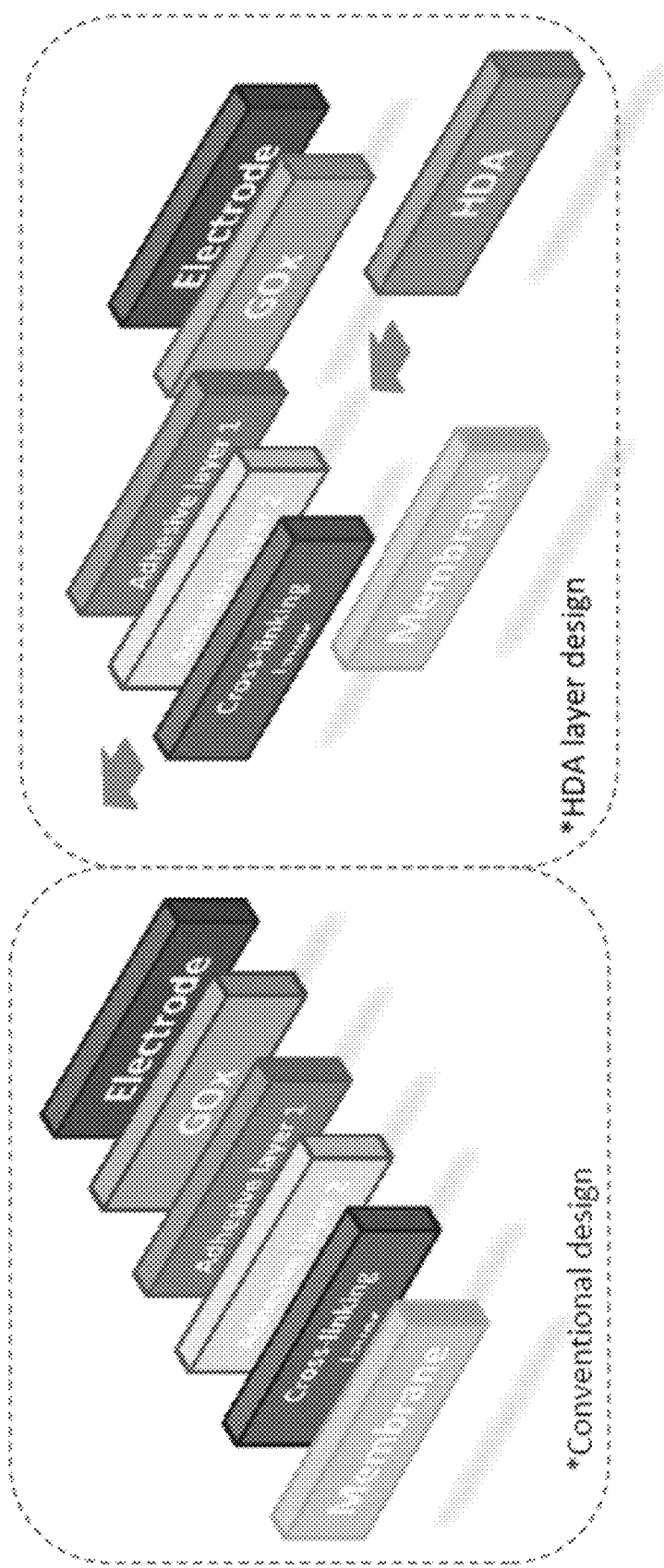

FIG. 2B illustrates the electrochemical sensors of the invention can include one or more high-density amine constituent layers that provide the sensors with a number of beneficial functions. Such layers can optimize sensor function, for example by acting as an adhesion promoting constituent for layers adjacent to the HDA layer, by decreasing fluctuations that can occur in glucose oxidase based sensors in the presence of fluctuating concentration of oxygen, by improving sensor initialization profiles and the like. The term "adhesion promoting constituent" is used herein according to art accepted terminology and refers to a constituent that includes materials selected for their ability to promote adhesion between adjoining constituents in the sensor. Typically, the high-density amine adhesion promoting constituent is disposed between and in direct contact with the analyte sensing constituent and the analyte modulating constituent. In typical embodiments, the high-density amine layer 510 comprises poly-l-lysine having molecular weights between 30 KDa and 300 KDa (e.g. between 150 KDa and 300 KDa). The concentrations of poly-l-lysine in such high-density amine layers 510 is typically from 0.1 weight-to-weight percent to 0.5 weight-to-weight percent and the high-density amine layer 510 is from 0.1 to 0.4 microns thick. In embodiments where the analyte sensing layer comprises glucose oxidase so that the analyte sensor senses glucose, and the high-density amine layer 510 functions to decrease sensor signal changes that result from fluctuating levels of oxygen ($O_2$).

Cover Constituent

The electrochemical sensors of the invention include one or more cover constituents which are typically electrically insulating protective constituents (see, e.g. element 206 in FIG. 2). Typically, such cover constituents can be in the form of a coating, sheath or tube and are disposed on at least a portion of the analyte modulating constituent. Typically, such features comprise a polymer comprising a surface having the constellation of features disclosed herein that function to modulate immune response. Acceptable polymer coatings for use as the insulating protective cover constituent can include, but are not limited to, non-toxic biocompatible polymers such as silicone compounds, polyimides, biocompatible solder masks, epoxy acrylate copolymers, or the like. Further, these coatings can be photo-imageable to facilitate photolithographic forming of apertures through to the conductive constituent. A typical cover constituent comprises spun on silicone. As is known in the art, this constituent can be a commercially available RTV (room temperature vulcanized) silicone composition. A typical chemistry in this context is polydimethyl siloxane (acetoxy based).

Typical Analyte Sensor Systems Used in Embodiments of the Invention

FIG. 3 (see also FIG. 11 in U.S. Patent Publication 2014/0163346) shows a schematic of a potentiostat that may be used to measure current in embodiments of the present invention. As shown in FIG. 4, a potentiostat 300 may include an op amp 310 that is connected in an electrical circuit so as to have two inputs: Vset and Vmeasured. As shown, Vmeasured is the measured value of the voltage between a reference electrode and a working electrode. Vset, on the other hand, is the optimally desired voltage across the working and reference electrodes. The current between the counter and reference electrode is measured, creating a current measurement (isig) that is output from the potentiostat.

Embodiments of the invention include devices which process display data from measurements of a sensed material layer characteristic (e.g. thickness) in a manner and format tailored to allow a user of the device to easily monitor the status of that characteristic. An illustrative embodiment of the invention is a device comprising a input capable of receiving a signal from a device such as a glucose sensor, the signal being based on a sensed material layer characteristic value of a device; a memory for storing a plurality of measurements of the sensed material layer characteristic value of the device from the received signal from the sensor; and a display for presenting a text and/or graphical representation of the plurality of measurements of the sensed material layer characteristic value (e.g. text, a line graph or the like, a bar graph or the like, a grid pattern or the like or a combination thereof).

FIG. 4 provides a perspective view of one generalized embodiment of subcutaneous sensor insertion system and a block diagram of a sensor electronics device according to one illustrative embodiment of the invention. Additional elements typically used with such sensor system embodiments are disclosed for example in U.S. Patent Application No. 20070163894, the contents of which are incorporated by reference. FIG. 4 provides a perspective view of a telemetered characteristic monitor system 1, including a subcutaneous sensor set 10 provided for subcutaneous placement of an active portion of a flexible sensor 12, or the like, at a selected site in the body of a user. The subcutaneous or percutaneous portion of the sensor set 10 includes a hollow, slotted insertion needle 14 having a sharpened tip 44, and a cannula 16. Inside the cannula 16 is a sensing portion 18 of the sensor 12 to expose one or more sensor electrodes 20 to the user's bodily fluids through a window 22 formed in the cannula 16. The sensing portion 18 is joined to a connection portion 24 that terminates in conductive contact pads, or the like, which are also exposed through one of the insulative layers. The connection portion 24 and the contact pads are generally adapted for a direct wired electrical connection to a suitable monitor 201 coupled to a display 214 for monitoring a user's condition in response to signals derived from the sensor electrodes 20. The connection portion 24 may be conveniently connected electrically to the monitor 201 or a characteristic monitor transmitter 100 by a connector block 28 (or the like).

As shown in FIG. 4, in accordance with embodiments of the present invention, subcutaneous sensor set 10 may be configured or formed to work with either a wired or a wireless characteristic monitor system. The proximal part of the sensor 12 is mounted in a mounting base 30 adapted for placement onto the skin of a user. The mounting base 30 can be a pad having an underside surface coated with a suitable pressure sensitive adhesive layer 32, with a peel-off paper strip 34 normally provided to cover and protect the adhesive layer 32, until the sensor set 10 is ready for use. The mounting base 30 includes upper and lower layers 36 and 38, with the connection portion 24 of the flexible sensor 12 being sandwiched between the layers 36 and 38. The connection portion 24 has a forward section joined to the active sensing portion 18 of the sensor 12, which is folded angularly to extend downwardly through a bore 40 formed in the lower base layer 38. Optionally, the adhesive layer 32 (or another portion of the apparatus in contact with in vivo tissue) includes an anti-inflammatory agent to reduce an inflammatory response and/or anti-bacterial agent to reduce the chance of infection. The insertion needle 14 is adapted for slide-fit reception through a needle port 42 formed in the upper base layer 36 and through the lower bore 40 in the lower base layer 38. After insertion, the insertion needle 14 is withdrawn to leave the cannula 16 with the sensing portion 18 and the sensor electrodes 20 in place at the selected insertion site. In this embodiment, the telemetered characteristic monitor transmitter 100 is coupled to a sensor set 10 by a cable 102 through a connector 104 that is electrically coupled to the connector block 28 of the connector portion 24 of the sensor set 10.

In the embodiment shown in FIG. 4, the telemetered characteristic monitor 100 includes a housing 106 that supports a printed circuit board 108, batteries 110, antenna 112, and the cable 102 with the connector 104. In some embodiments, the housing 106 is formed from an upper case 114 and a lower case 116 that are sealed with an ultrasonic weld to form a waterproof (or resistant) seal to permit cleaning by immersion (or swabbing) with water, cleaners, alcohol or the like. In some embodiments, the upper and lower case 114 and 116 are formed from a medical grade plastic. However, in alternative embodiments, the upper case 114 and lower case 116 may be connected together by other methods, such as snap fits, sealing rings, RTV (silicone sealant) and bonded together, or the like, or formed from other materials, such as metal, composites, ceramics, or the like. In other embodiments, the separate case can be eliminated and the assembly is simply potted in epoxy or other moldable materials that is compatible with the electronics and reasonably moisture resistant. As shown, the lower case 116 may have an underside surface coated with a suitable pressure sensitive adhesive layer 118, with a peel-off paper strip 120 normally provided to cover and protect the adhesive layer 118, until the sensor set telemetered characteristic monitor transmitter 100 is ready for use.

In the illustrative embodiment shown in FIG. 4, the subcutaneous sensor set 10 facilitates accurate placement of a flexible thin film electrochemical sensor 12 of the type used for monitoring specific blood parameters representative of a user's condition. The sensor 12 monitors glucose levels in the body, and may be used in conjunction with automated or semi-automated medication infusion pumps of the external or implantable type as described in U.S. Pat. No.

4,562,751; 4,678,408; 4,685,903 or 4,573,994, to control delivery of insulin to a diabetic patient.

In the illustrative embodiment shown in FIG. 4, the sensor electrodes 10 may be used in a variety of sensing applications and may be configured in a variety of ways. For example, the sensor electrodes 10 may be used in physiological parameter sensing applications in which some type of biomolecule is used as a catalytic agent. For example, the sensor electrodes 10 may be used in a glucose and oxygen sensor having a glucose oxidase enzyme catalyzing a reaction with the sensor electrodes 20. The sensor electrodes 10, along with a biomolecule or some other catalytic agent, may be placed in a human body in a vascular or non-vascular environment. For example, the sensor electrodes 20 and biomolecule may be placed in a vein and be subjected to a blood stream, or may be placed in a subcutaneous or peritoneal region of the human body.

In the embodiment of the invention shown in FIG. 4, the monitor of sensor signals 200 may also be referred to as a sensor electronics device 201. The monitor 201 may include a power source, a sensor interface, processing electronics (i.e. a processor), and data formatting electronics. The monitor 201 may be coupled to the sensor set 10 by a cable 102 through a connector that is electrically coupled to the connector block 28 of the connection portion 24. In an alternative embodiment, the cable may be omitted. In this embodiment of the invention, the monitor 201 may include an appropriate connector for direct connection to the connection portion 104 of the sensor set 10. The sensor set 10 may be modified to have the connector portion 104 positioned at a different location, e.g., on top of the sensor set to facilitate placement of the monitor 201 over the sensor set.

Example Electrode Configurations

Figure 5A:
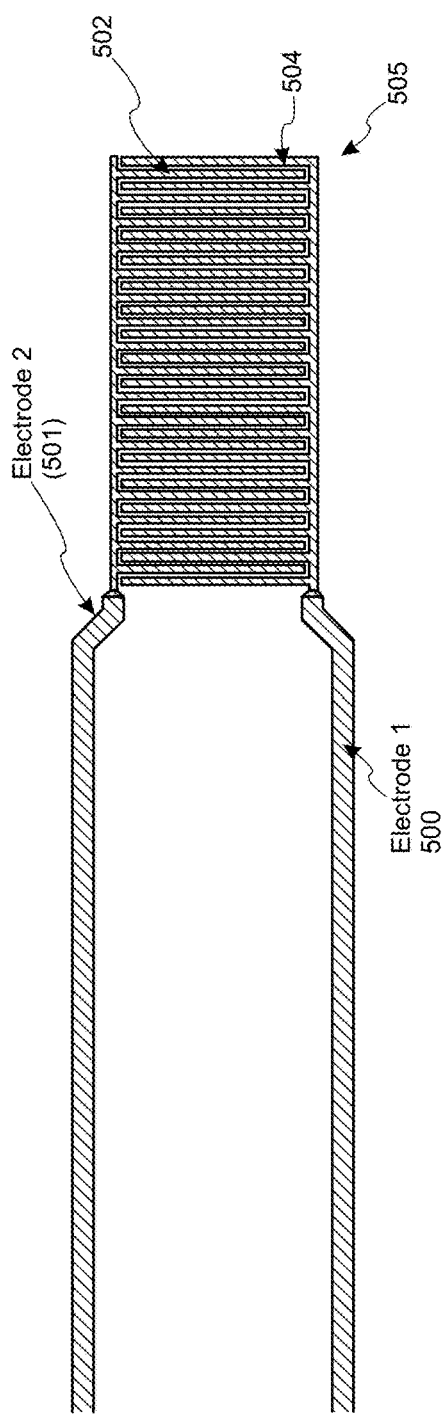
FIG. 5A illustrates a top view of an example process control monitoring (PCM) structure comprising an analyte sensor including an interdigitated electrode and tested using the dry EIS methods described herein, wherein the interdigitated electrode includes a two-electrode configuration comprising electrode 1 (a first fork shaped electrode) interdigitated with electrode 2 (a second fork shaped electrode).
Figure 5B:
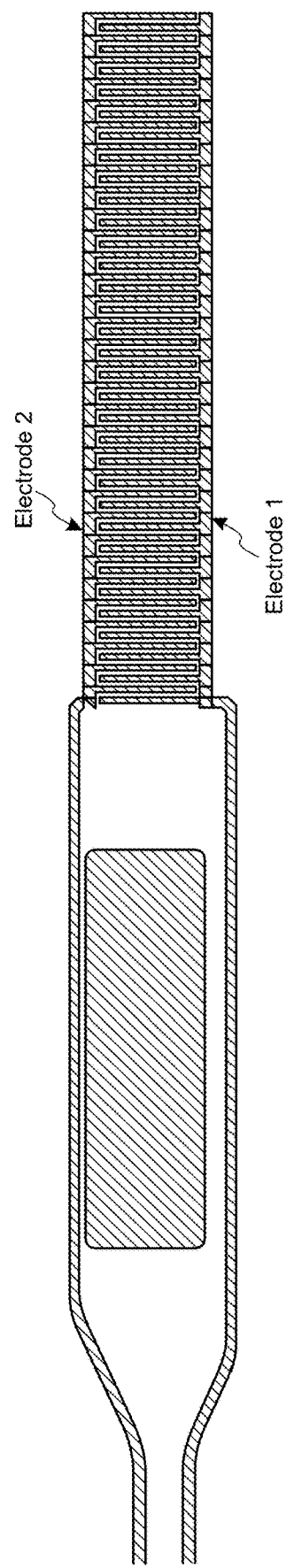
FIG. 5B illustrates a top view of another example PCM structure comprising the interdigitated electrode and an additional electrode.
Figure 5C:
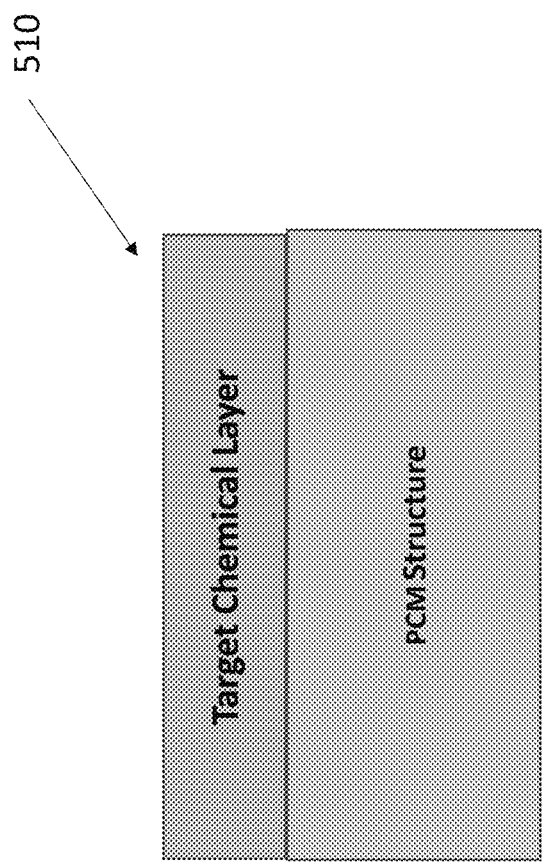
FIG. 5C is a cross-sectional schematic of the PCM structure.

FIG. 5A and FIG. 5B illustrate example process control monitoring (PCM) structures comprising two-electrode configurations, wherein electrode 1 500 comprises a working electrode (WE) and Electrode 2 (501) comprises a counter (CE) and a reference electrode (RE) shorted together. Electrode 1 comprises a first plurality (e.g., at least 40) of fingers 502, electrode 2 comprises a second plurality (e.g., at least 40) of fingers 504, and the first plurality of fingers and the plurality of fingers are interdigitated 505. These PCM structures are strategically located across the wafer to capture the deposition process's variability and uniformity. Higher interdigitation between Electrode 1 and Electrode 2 leads to higher surface areas that can be exposed to the target chemical layer on the PCM structure as illustrated in FIG. 5C, picking up more signals from its charges. The higher the interdigitation, the higher the Dry EIS capacitance signal.

The method of any of the examples 1-18, wherein the first electrode and the second electrode are interdigitated, the first electrode comprises a first set of at least 40 fingers, the second electrode comprises a second set of at least 40 fingers, and the first set of fingers and the set of fingers are interdigitated.

Figure 2C:
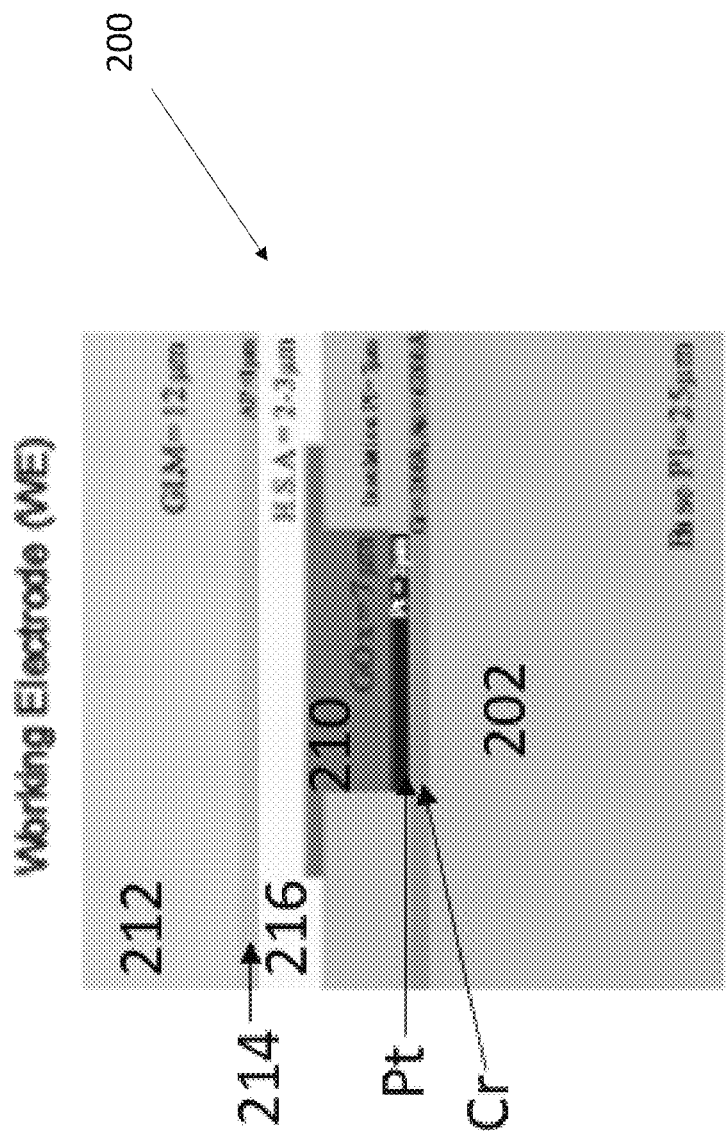
Figure 2D:
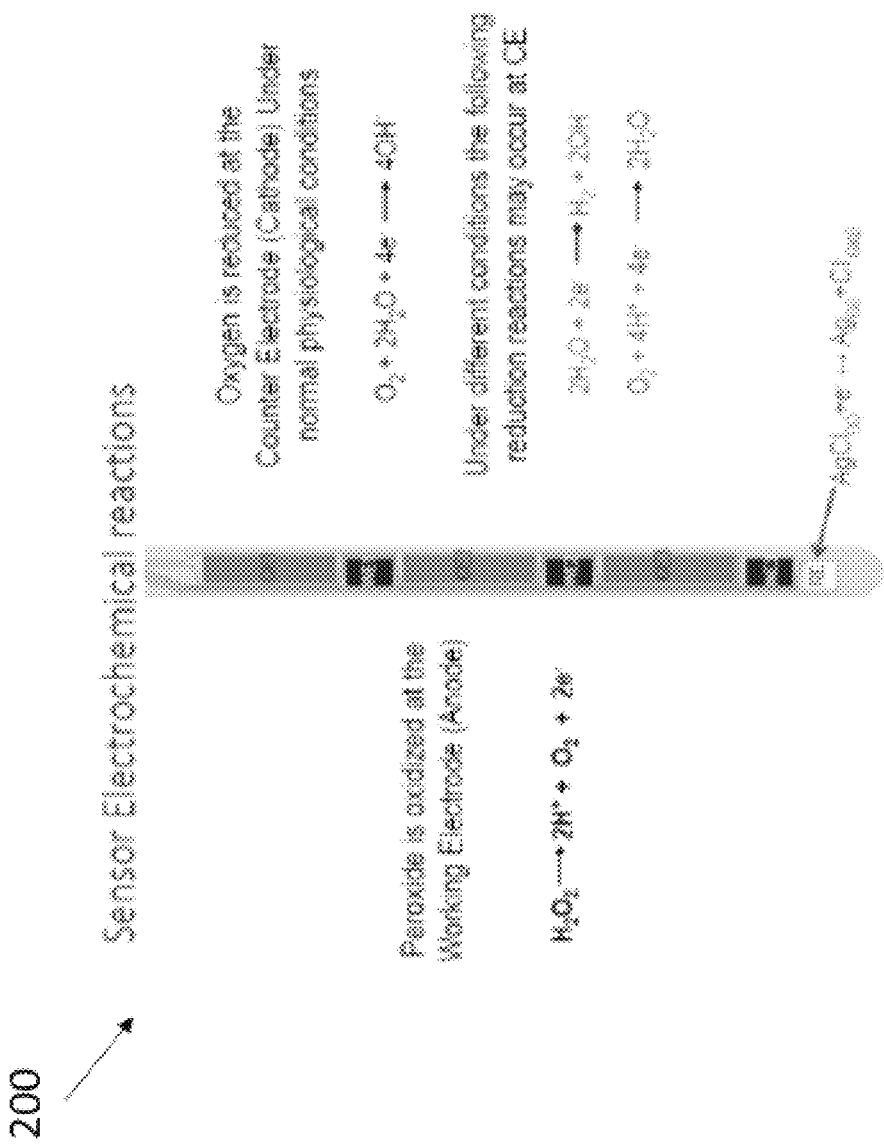

FIG. 2C illustrates an example analyte sensor 200 and FIG. 2D shows how the electrical current is generated in an enzymatic reaction and travels from a WE to a CE. The magnitude of current can be affected by the dielectric properties of the materials along its path. Therefore, the dielectric property of the target chemistry layer 510 reflected in Dry EIS capacitance measurement in FIG. 5A-5C can be correlated to sensor Isig performance.

The dry EIS is obtained by measuring a current outputted from electrode 1 in response to a voltage potential applied between electrode 1 and electrode 2.

In one more examples, the dry EIS measures $Z_{total}=$ $$\frac{\Delta V}{\Delta I},$$

where $\Delta V$ is the applied voltage potential and $\Delta I$ is the measured output current in response to the voltage potential. Dry EIS capacitance is determined from Ztotal using:

$$\text{Capacitance} = \frac{1}{2*\pi*\text{frequency}*Z_{total}}$$

In one or more examples, the voltage potential is an AC voltage having a frequency the dry EIS signal is measured with an optimal balance between sensitivity, test time, robustness to environmental noise. 1 kHz, 0V DC, and 50 mV AC).

Example EIS System

FIG. 6A-6D illustrate an example high throughput Dry EIS capacitance measuring system 600 comprising a test chamber 602 including a sample chuck 604 for holding the sample 606 in a dry environment, a thermometer 605 thermally coupled to the sample chuck 604; a closed loop humidifier 608; a humidity probe 610; a water reservoir 612 for the humidifier; a thermal chuck control module 614 (for controlling temperature); and a potentiostat 616 for applying the voltage potential and sensing the test signal in response to the voltage potential. An example potentiostat circuit is shown in FIG. 3. In one or more examples, the sample 606 comprises a wafer including a plurality (e.g., hundreds) of process control monitoring (PCM) structures (illustrated in FIG. 5A) distributed across the wafer.

The role of the humidifier is to maintain sufficient moistureness in the sample for signal detection. In one or more examples, ideal relative humidity (RH) for operation: 40% RH<X<equipment limit. In order to minimize day-to-day fluctuation in humidity, in one or more examples, the ideal accuracy of humidity control is <±1.5% RH The roles of the humidity probes include providing feedback to maintain constant humidity and recording the humidity measurement for inputting to the environmental normalization algorithm (ENA). In one or more examples, ideal accuracy of the humidity probe is <±0.5% RH. In one or more examples, the humidity control using feedback sets the relative humidity RH at any value in a range of 1%-100% RH (or in a range of 20%-70% RH) with a standard deviation less than 0.3% or in a range of 0.2%-0.3%.

The role of the thermal chuck includes supporting sufficient moisture condensation in the sample for signal detection. In one or more examples, the ideal chuck temperature is colder than room temperature and the ideal uniformity of chuck temperature is <±0.1° C.

Active cooling technology may further enable dry EIS measurement on a less charged chemistry layer. In one or more examples, the temperature controller minimizes day-to-day temperature fluctuations and measures chuck temperature for input to the ENA, and the thermometer measures with an ideal accuracy of temperature: <±0.1° C. In one or more examples, the temperature control using feedback sets the temperature T at any value in a range 10° C.≤T≤30° C. with a standard deviation less than 0.021° C. or in a range of 0.015° C.-0.021° C.

Figure 7A:
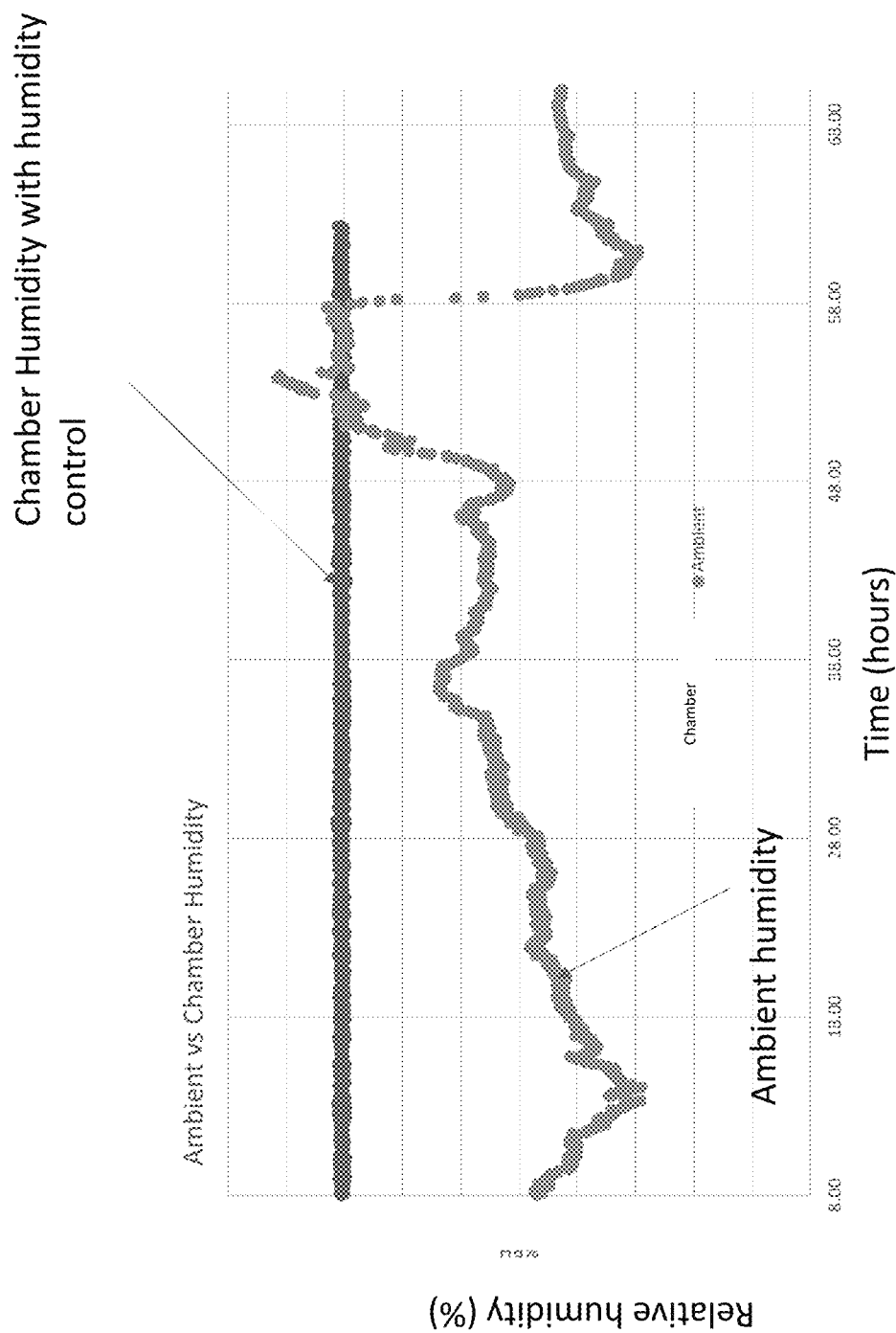
FIG. 7A illustrates example humidity control achievable using the EIS system illustrated in FIGS. 6A-6D.
Figure 7B:
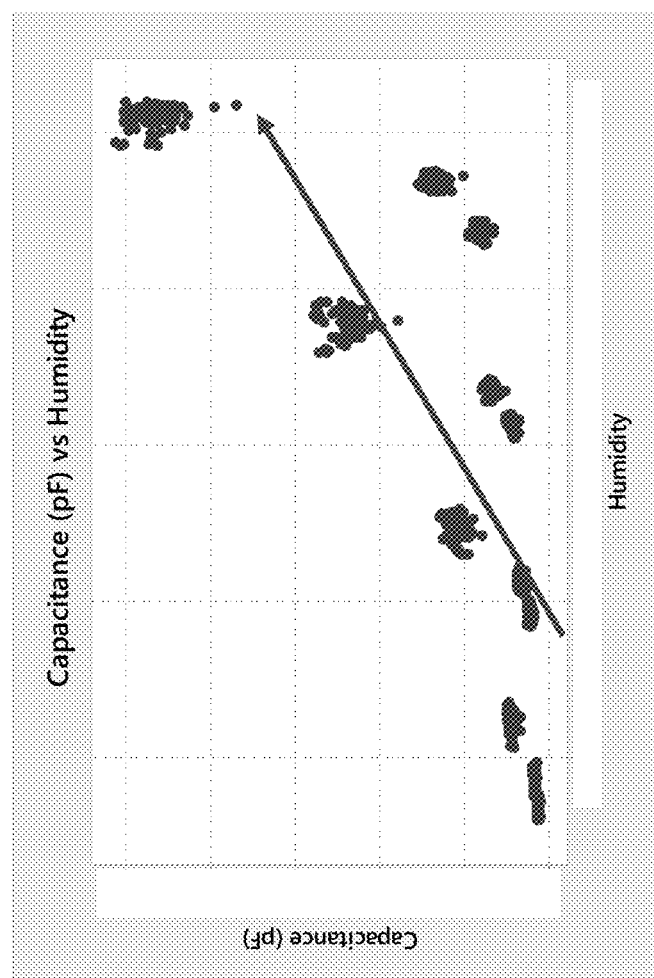
FIG. 7B-7C illustrate the effect of humidity (FIG. 7B) and chuck temperature (FIG. 7C) on Dry EIS signal (capacitance).
Figure 7C:
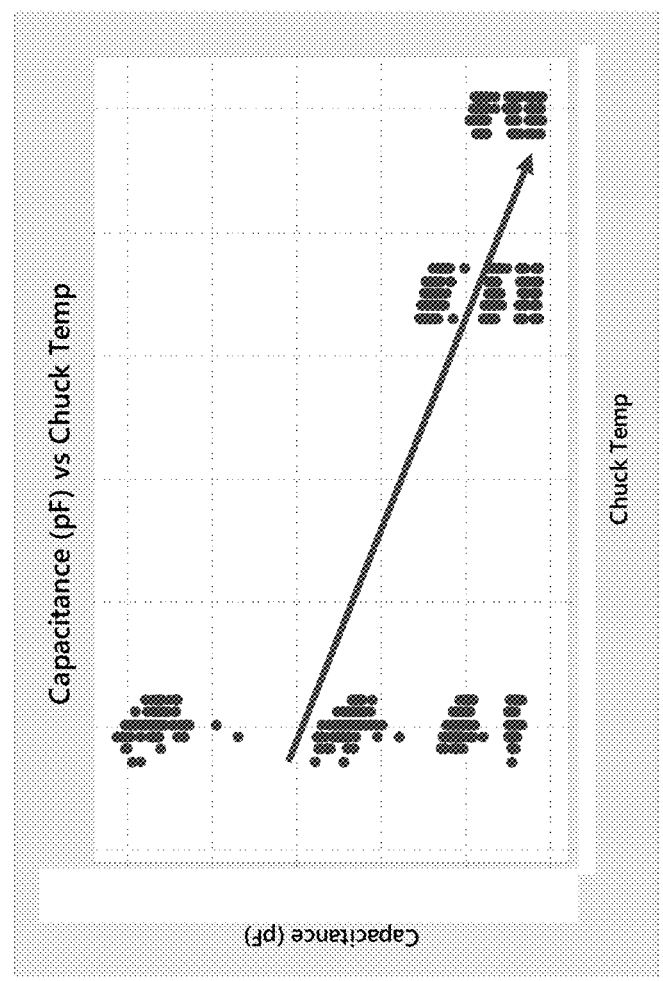

FIG. 7A illustrates how the humidifier controls humidity in the test chamber in the presence of a varying ambient humidity.

FIG. 7B and FIG. 7C illustrate the effect of humidity and chuck temperature on dry EIS signal capacitance, showing the dry EIS signal capacitance is proportional to the test chamber's humidity and the dry EIS signal capacitance is inversely proportional to the chuck (surface) temperature. Moreover, chamber humidity and chuck temperature may interact.

Figure 8:
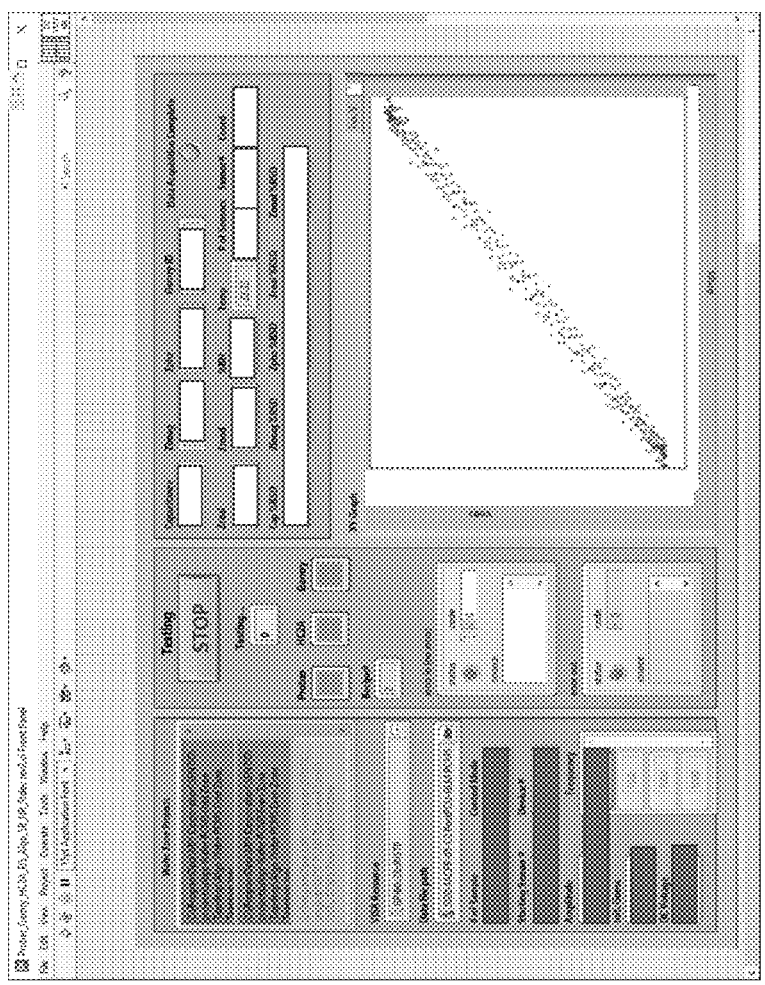
FIG. 8 illustrates an example software environment for controlling automation and traceability of the EIS metrology measurement.

FIG. 8 illustrates software implementing high throughput and automation achieved by a LabView script that integrates all the equipment and logs all the measurements. Data is stored in a Matlab database with proper traceability that supports using the dry EIS data as manufacturing data to calibrate the sensors to reduce sensor to sensor variability.

Figure 9A:
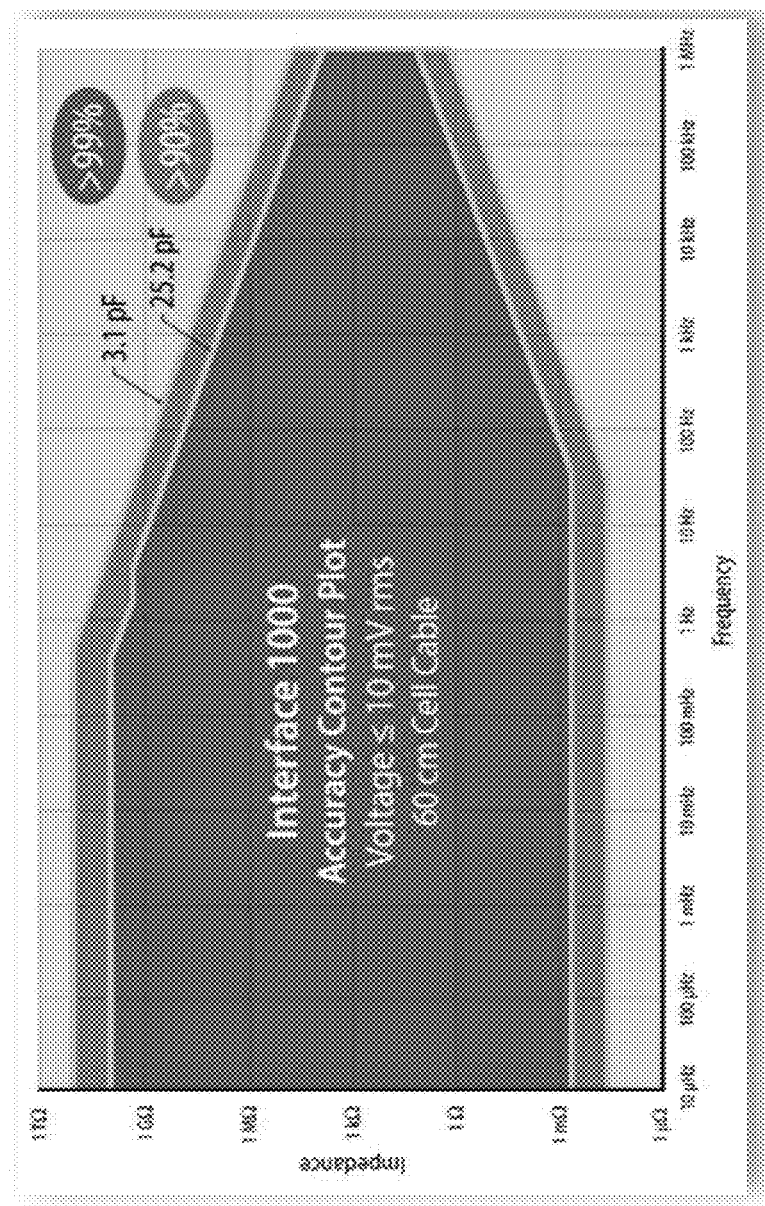
FIG. 9A illustrates parameters influencing accuracy of the EIS measurement.
Figure 9B:
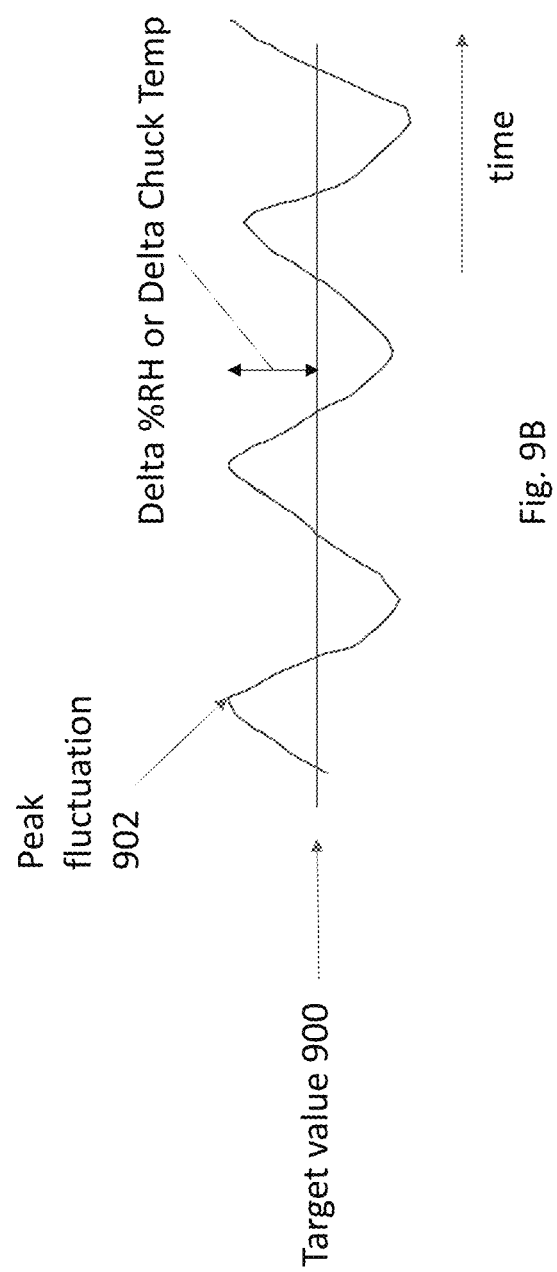
FIG. 9B illustrates environmental noise comprising fluctuations in temperature and humidity about target values (set by the humidifier and temperature control system).
Figure 10A:
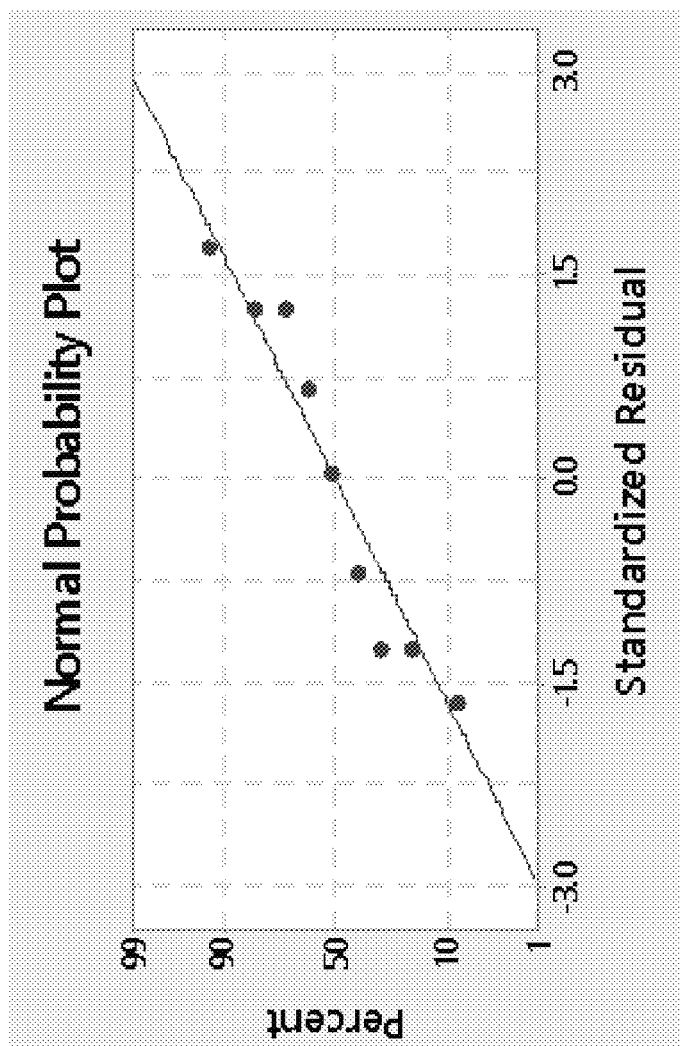
Figure 10B:
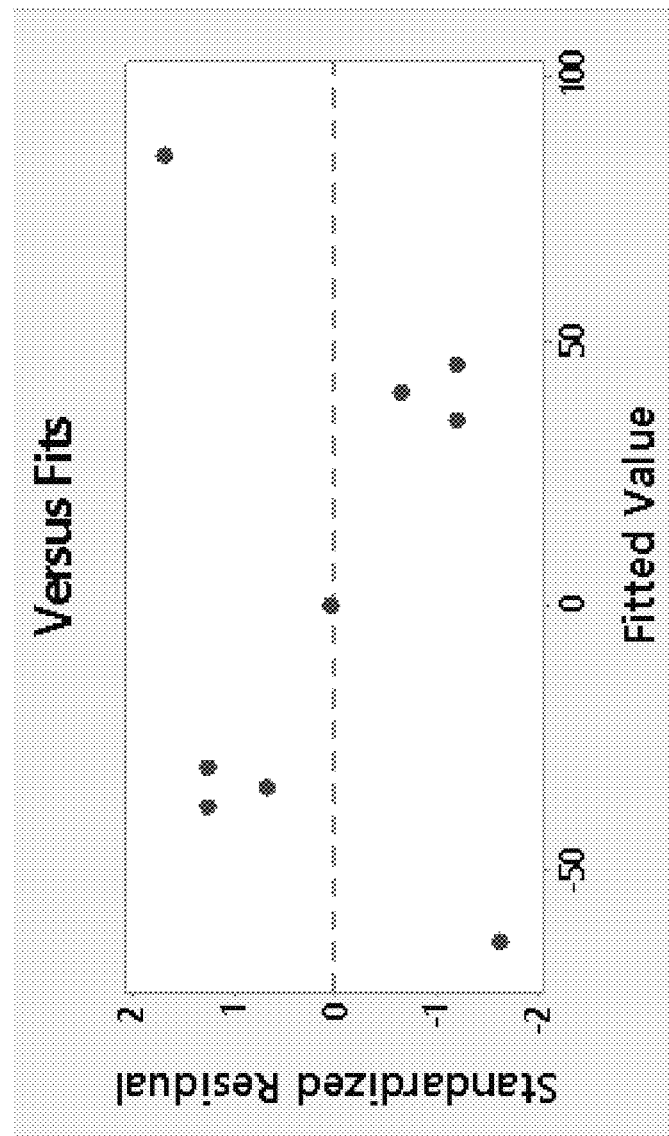
Figure 10C:
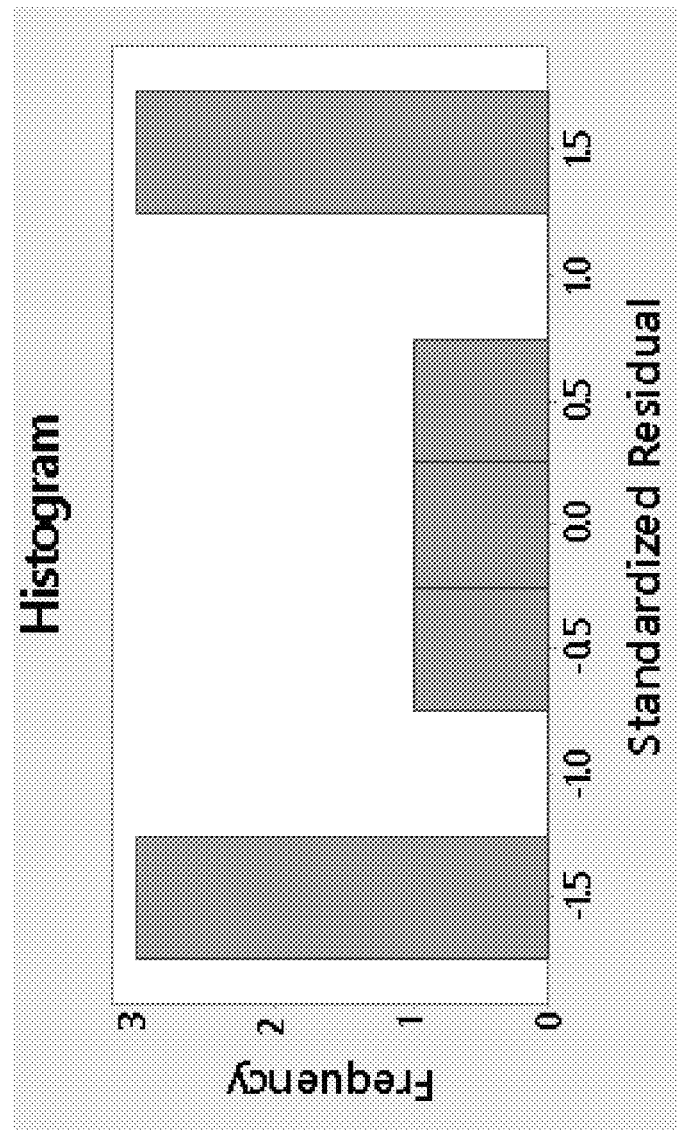
Figure 10D:
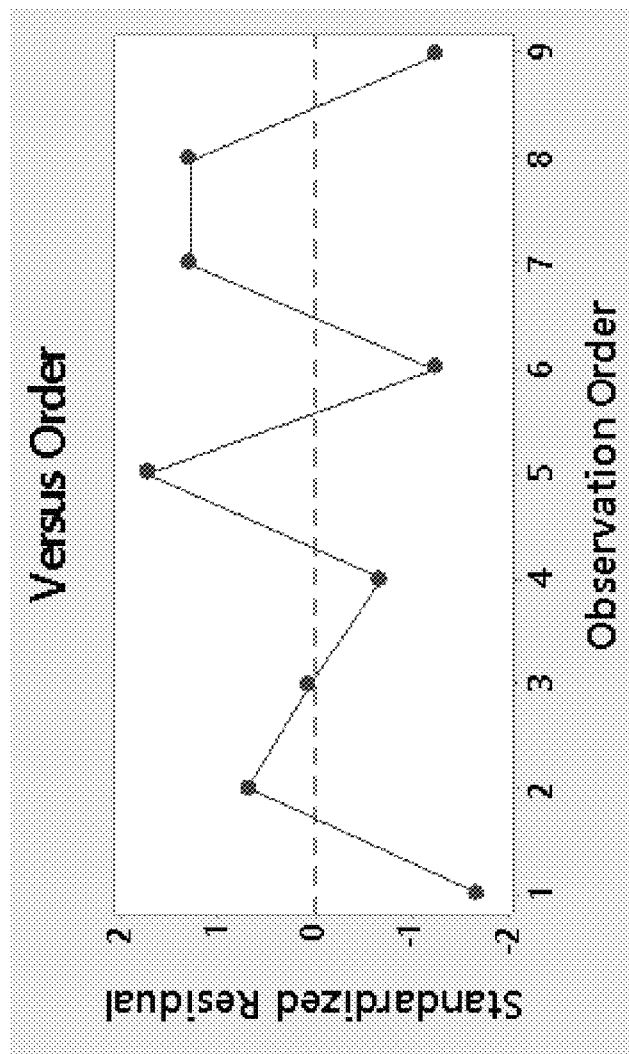

FIG. 9 illustrates the dry EIS capacitance measurement can have up to 10% error when the measured capacitance is between 3.1 pF and 25.2 pF. Moreover, a capacitance signal <3.1 pF (open circuit) is not differentiable. In one or more examples, raw data must be collected at >25 pF. The system 600 can adjust % RH and surface temperature to boost the EIS capacitance signal if needed.

Environmental Normalization Algorithm

The goal of ENA is to return a "normalized signal" that nullifies the noises induced by test environment variabilities. Once all test parameters are settled, ENA can be obtained by conducting a design of experiments (DOE) analysis of % RH and chuck temperature around their nominal values. In one or more examples, the ENA yields:

$$Cap_{normalized} = -(\text{regression equation} - Cap_{raw}) \quad (5)$$

where $Cap_{normalized}$ is the normalized capacitance and $Cap_{raw}$ is the raw capacitance measured using the EIS prior to normalization.

FIG. 9A illustrates that the temperature and humidity fluctuate about target value 900 for the humidity and temperature. Delta chuck temp is the peak fluctuation 902 of the temperature with respect the temperature target value (set by the temperature controller). Delta % RH is the peak fluctuation 902 of the relative humidity with respect to the humidity target value (set by the humidifier). Delta cap is the error in the capacitance resulting from these fluctuations. Delta cap can be determined using a regression equation and fitting parameters including the first peak fluctuation and the second peak fluctuation.

In one or more examples, the regression equation fits the error in the capacitance with an $R^2$ value of at least 0.99. FIGS. 10A-10D plot residuals graphically representing the regression equation and model summary. Thus, the statistical measures in the model summary and FIGS. 10A-10D demonstrate the correlation between the sensor performance and the dry EIS capacitance is achieved with a high degree of accuracy.

In summary, in one or more examples, normalizing the electrical characteristic (e.g., capacitance) comprises (a) setting a humidity target value 900 for a humidity of the environment; (b) setting a temperature target value 900 for a temperature of the environment; (d) obtaining a first peak fluctuation 902 (delta chuck temp) of the temperature with respect the temperature target value (e.g., by subtracting the first peak fluctuation from the temperature target value); obtaining a second peak fluctuation (delta % RH) of the humidity with respect to the humidity target value (e.g., by subtracting the second peak fluctuation from the humidity target value); and determining an error (e.g., delta cap) in the electrical characteristic (e.g., capacitance) using a regression equation and fitting parameters including the first peak fluctuation and the second peak fluctuation. In some examples, the error (e.g., delta cap) is measured (e.g., as a standard deviation) and then fit with the regression equation. The normalizing comprises subtracting the error (e.g., delta cap) from the raw electrical characteristic (e.g., $Cap_{raw}$ in equation 5) to obtain the normalized electrical characteristic ($Cap_{norm}$) using equation 5, so that $Cap_{norm} = -(\text{delta cap} - Cap_{raw}) = Cap_{norm} - (\text{regression equation} - Cap_{raw})$ Example HDA Correlation The following data are measured for analyte sensors as illustrated in FIG. 2B and comprising an analyte sensing layer comprising glucose oxidase, SPRE, and HDA layer (0.5× to 2×HDA), a glucose limiting membrane (analyte modulating layer PCUGLM), but without interference rejection layer (IRM) which has an interaction with HDA.

The results presented herein demonstrate that the magnitude of the capacitance of a sensor comprising the HDA layer on an electrode on the structure shown in FIG. 5A and in a dry environment (Dry EIS HDA capacitance) correlates to the magnitudes of Isig, slope, intercept, and EIS (impedance Zreal and Zimag) of the sensor illustrated in FIGS. 2B and 5B. In addition, the results demonstrate that the variability of the dry EIS HDA capacitance also correlates to the variabilities in Isig, Cal Ratio, Intercept, and EIS (Zimag and Zreal).

Figure 11A:
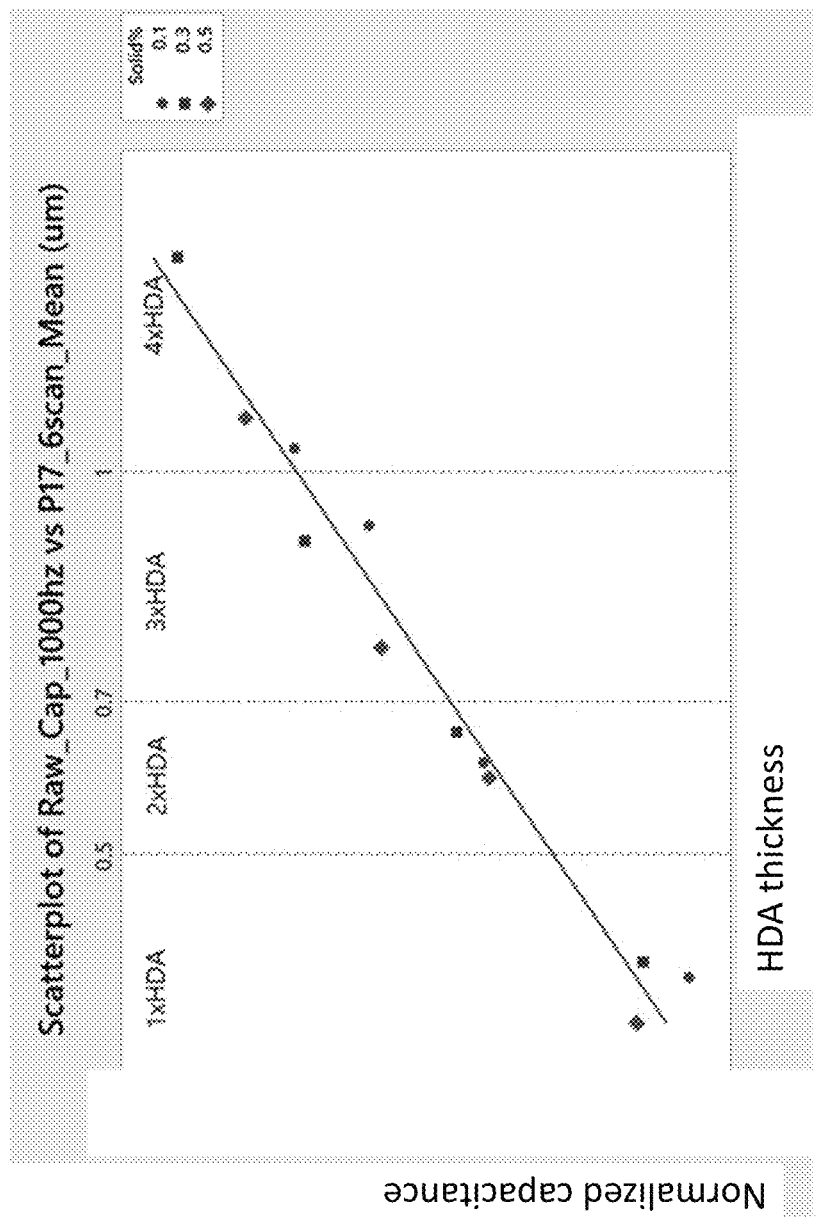
FIG. 11A illustrates correlation of HDA thickness and roughness, as measured using a profilometer, and capacitance measured using dry EIS.
Figure 11B:
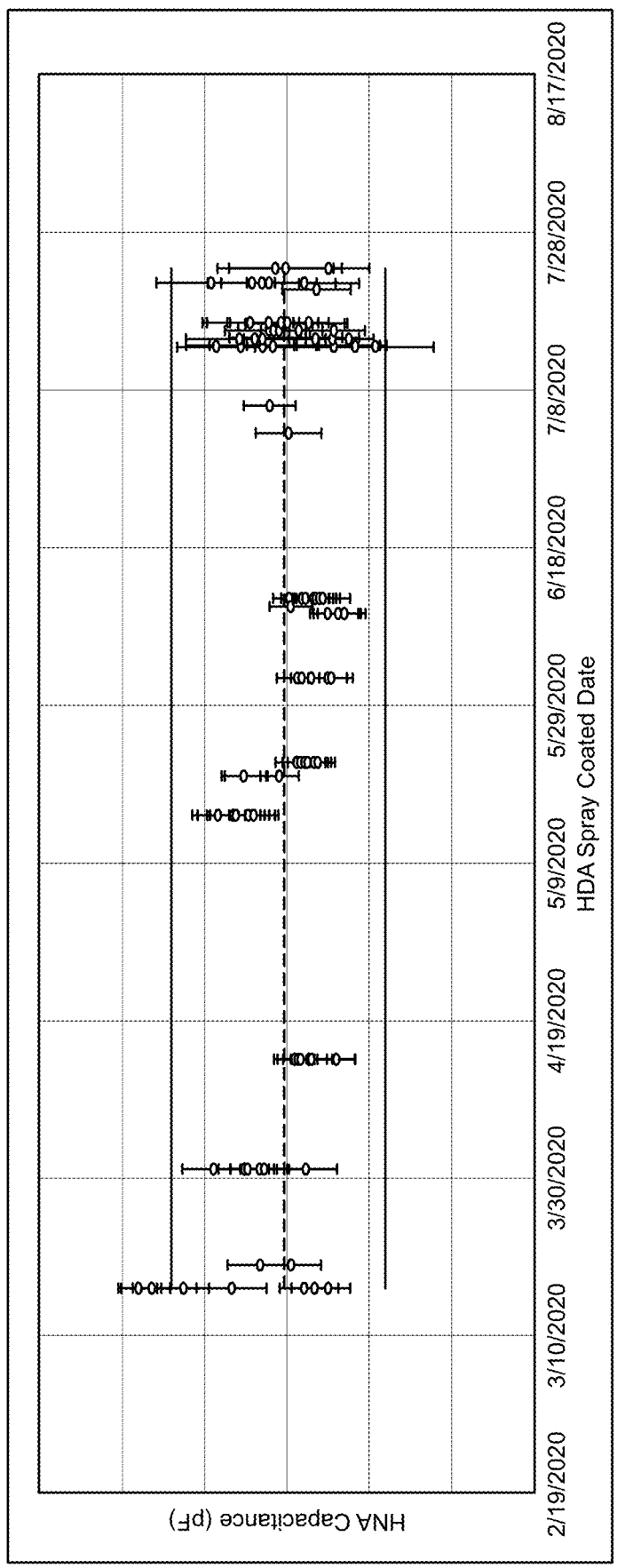
FIG. 11B illustrates uniformity of the HDA in a plurality of different sensors manufactured on different dates, as measured by the dry EIS capacitance.

FIG. 11A illustrates dry EIS HDA capacitance correlates with the thickness of HDA at least up to an upper limit thickness of 1.3 micrometers. Dry EIS Metrology has passed gage of repeatability and reproducibility (GR&R) and statistic process control (SPC) chart and has been established to monitor nominal part's run-to-run variability. GR&R is a measure of how reproducible and repeatable the test method is under different circumstances such as, but not limited to, (different days and different operators). Assuming the metrology itself is reproducible, SPC is then deployed to measure the stability of the process of producing parts, which is critical to evaluate part's run-to-run variability.

Figure 12:
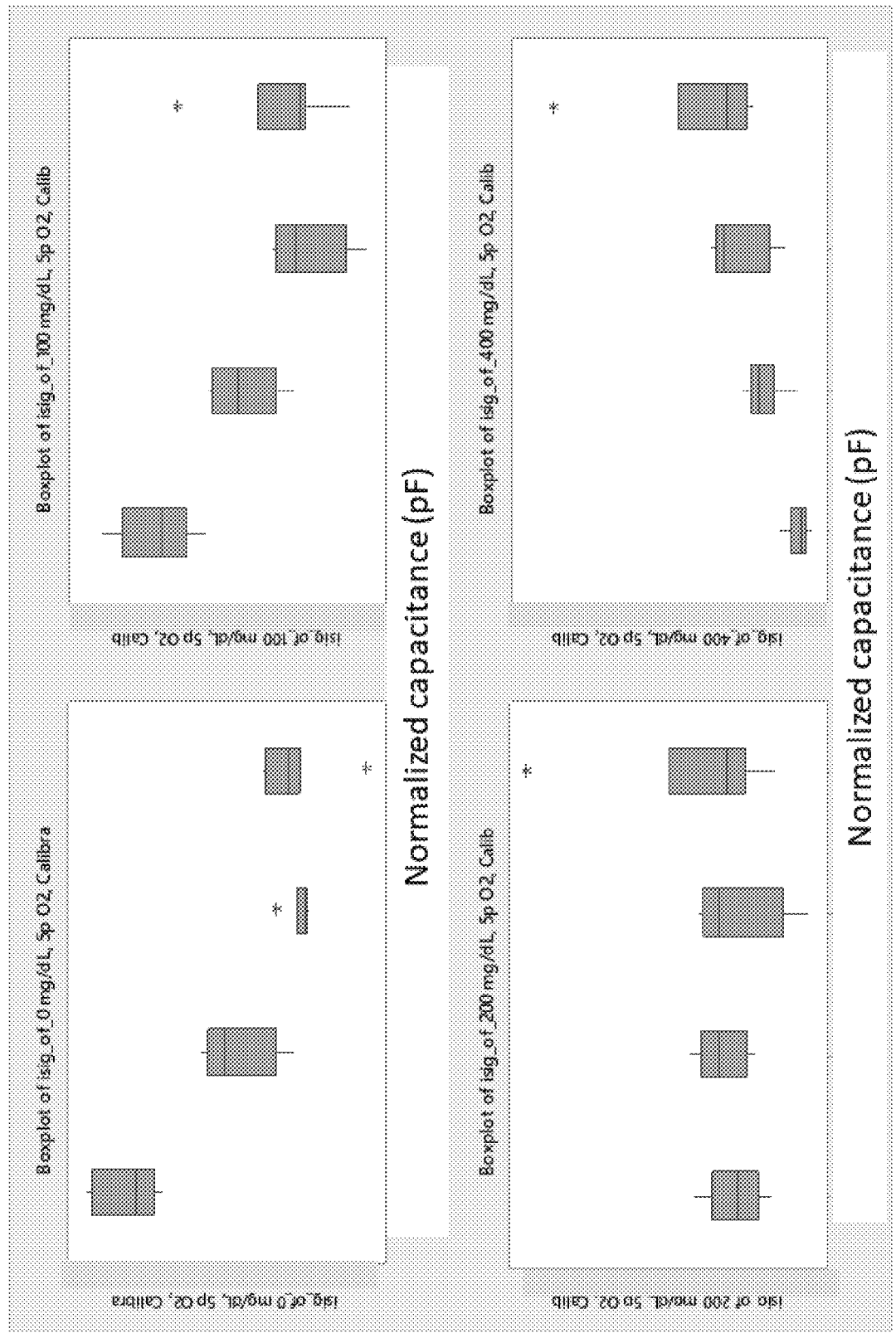
FIG. 12 illustrates the correlation between sensor Isig (Y-axis) and normalized dry EIS capacitance (pF) on the X-axis (isig measured for calibration at 5% $O_2$ for various glucose concentrations and on day 1).
Figure 13:
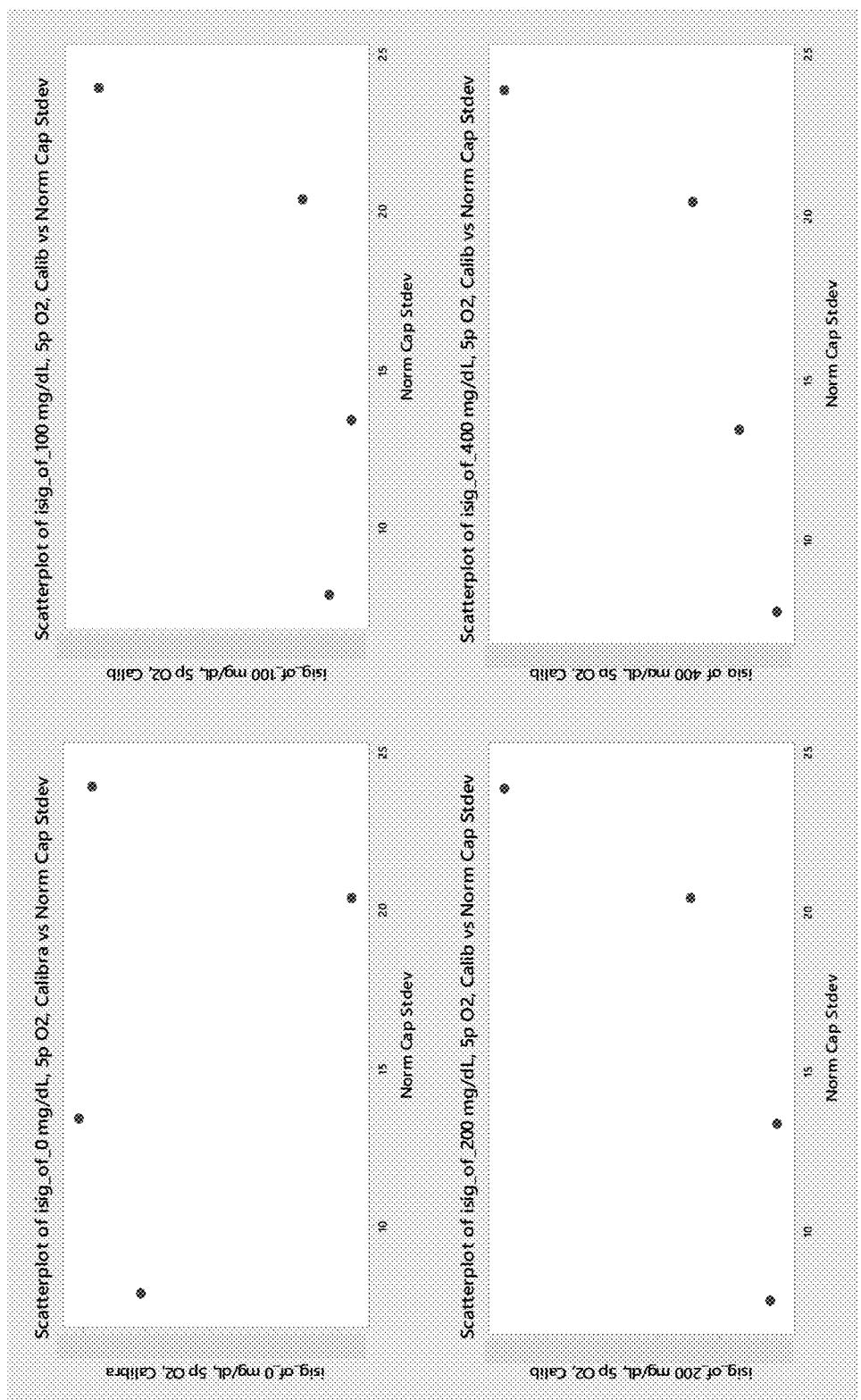
FIG. 13 plots standard deviation of Isig vs normalized standard deviation of capacitance (pF) measured by dry EIS (isig measured for calibration at 5% $O_2$ for various glucose concentrations and on day 1).
Figure 14:
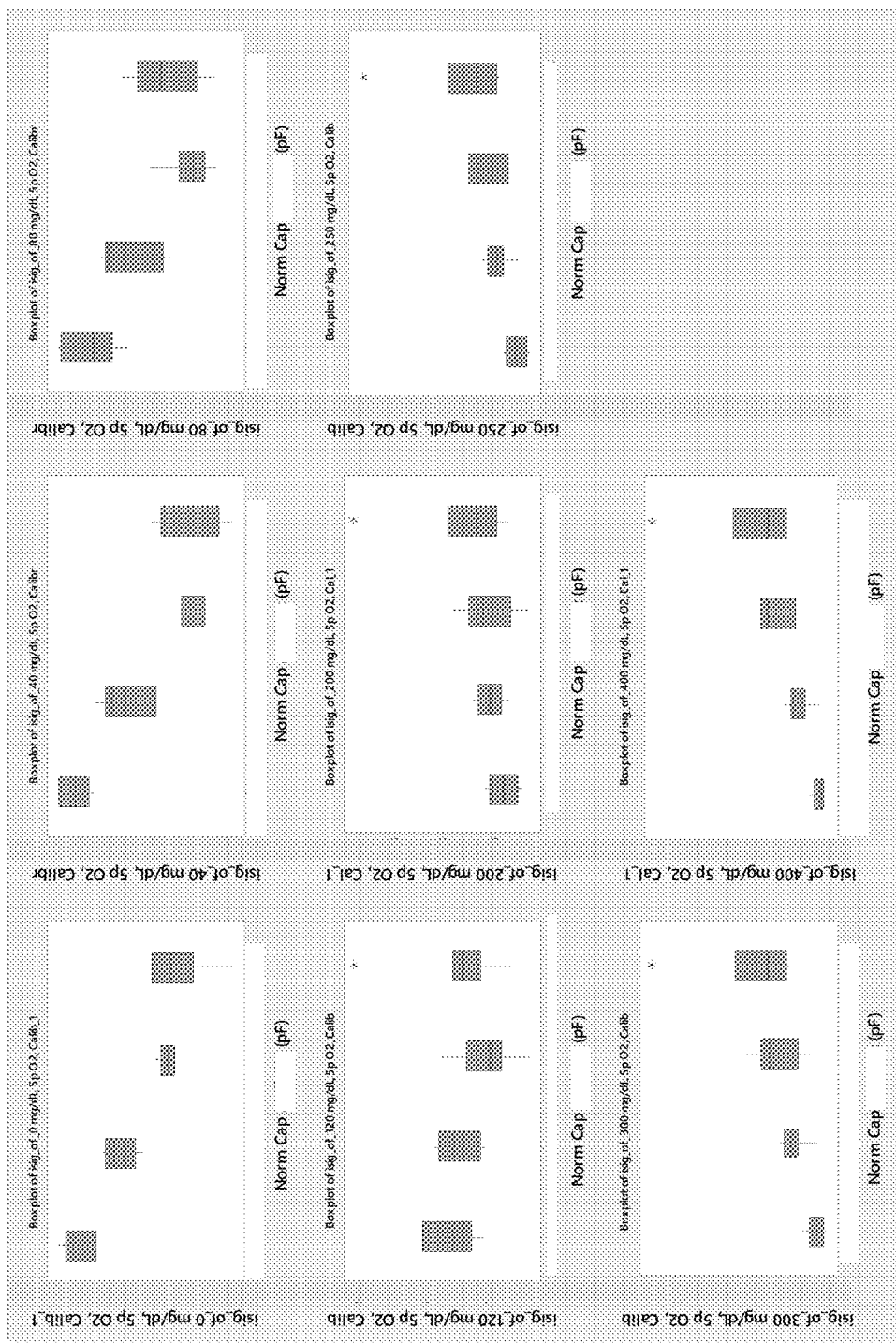
FIG. 14 plots Isig vs normalized dry EIS capacitance (pF) (isig measured for calibration at 5% $O_2$ for various glucose concentrations using the same sensors as in FIG. 12 but on day 2).
Figure 15:
FIG. 15 plots standard deviation of Isig vs normalized standard deviation of capacitance (pF) measured by dry EIS (isig measured for calibration at 5% $O_2$ for various glucose concentrations using the same sensors as in FIG. 13 but on day 2).
Figure 16:
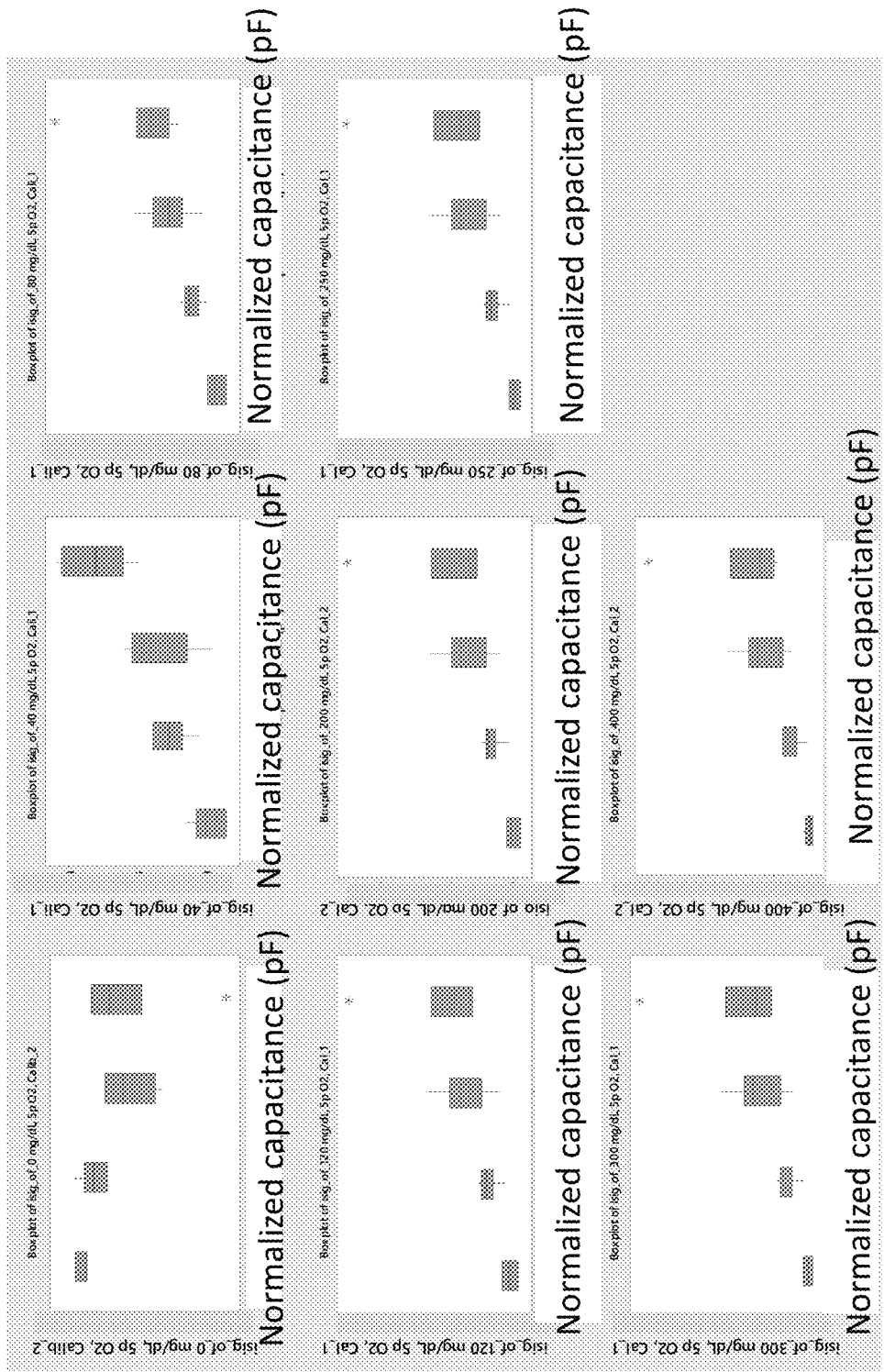
FIG. 16 plots Isig vs normalized dry EIS capacitance (pF) (isig measured for calibration at 5% $O_2$ for various glucose concentrations using the same sensors as in FIG. 12 but on day 8).
Figure 17:
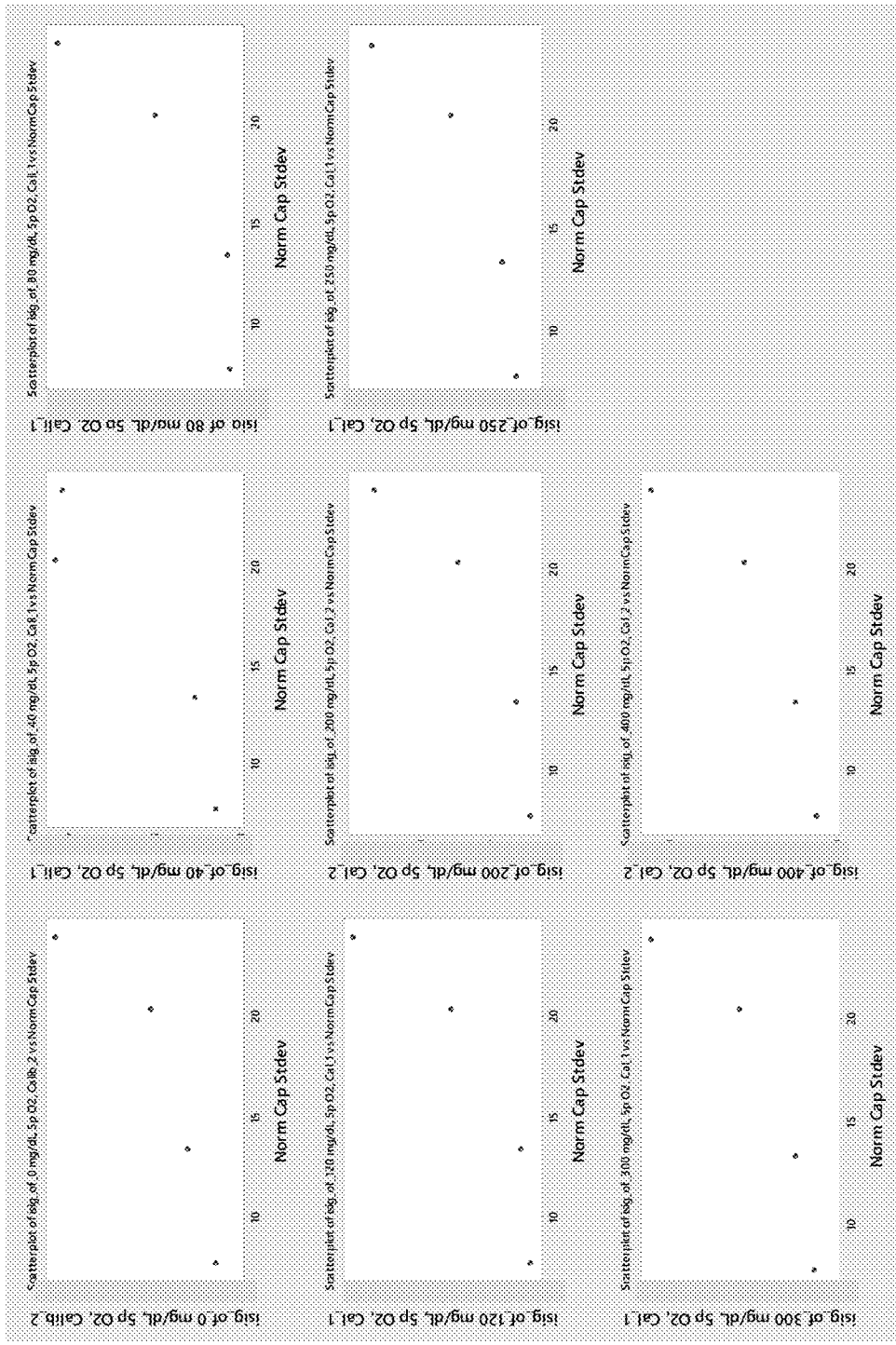
FIG. 17 plots standard deviation of Isig vs normalized standard deviation of capacitance (pF) measured by dry EIS (isig measured for calibration at 5% $O_2$ for various glucose concentrations using the same sensors as in FIG. 13 but on day 8).
Figure 18:
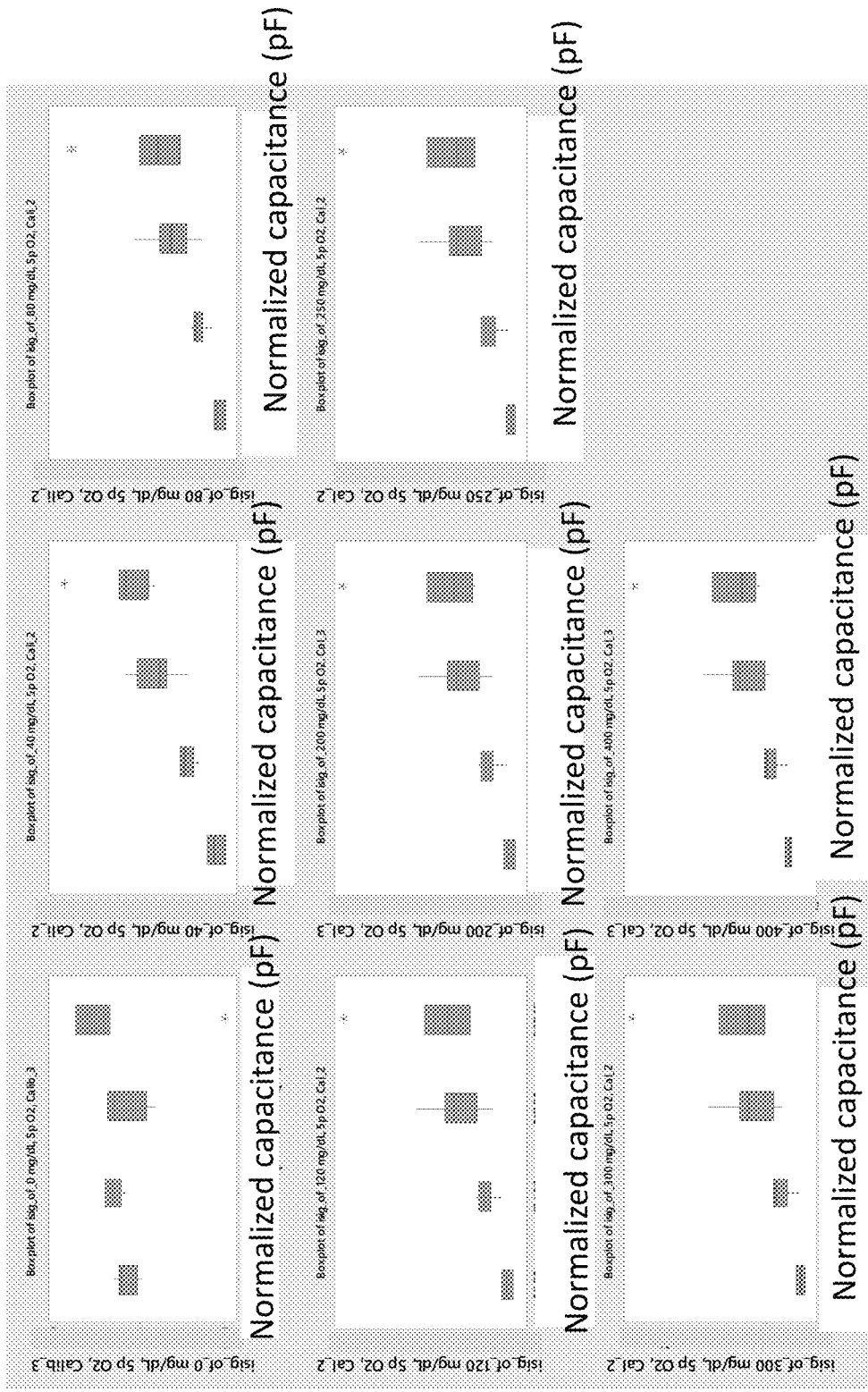
FIG. 18 plots Isig vs normalized dry EIS capacitance (pF) (isig measured for calibration at 5% $O_2$ for various glucose concentrations using the same sensors as in FIG. 12 but on day 14).
Figure 19:
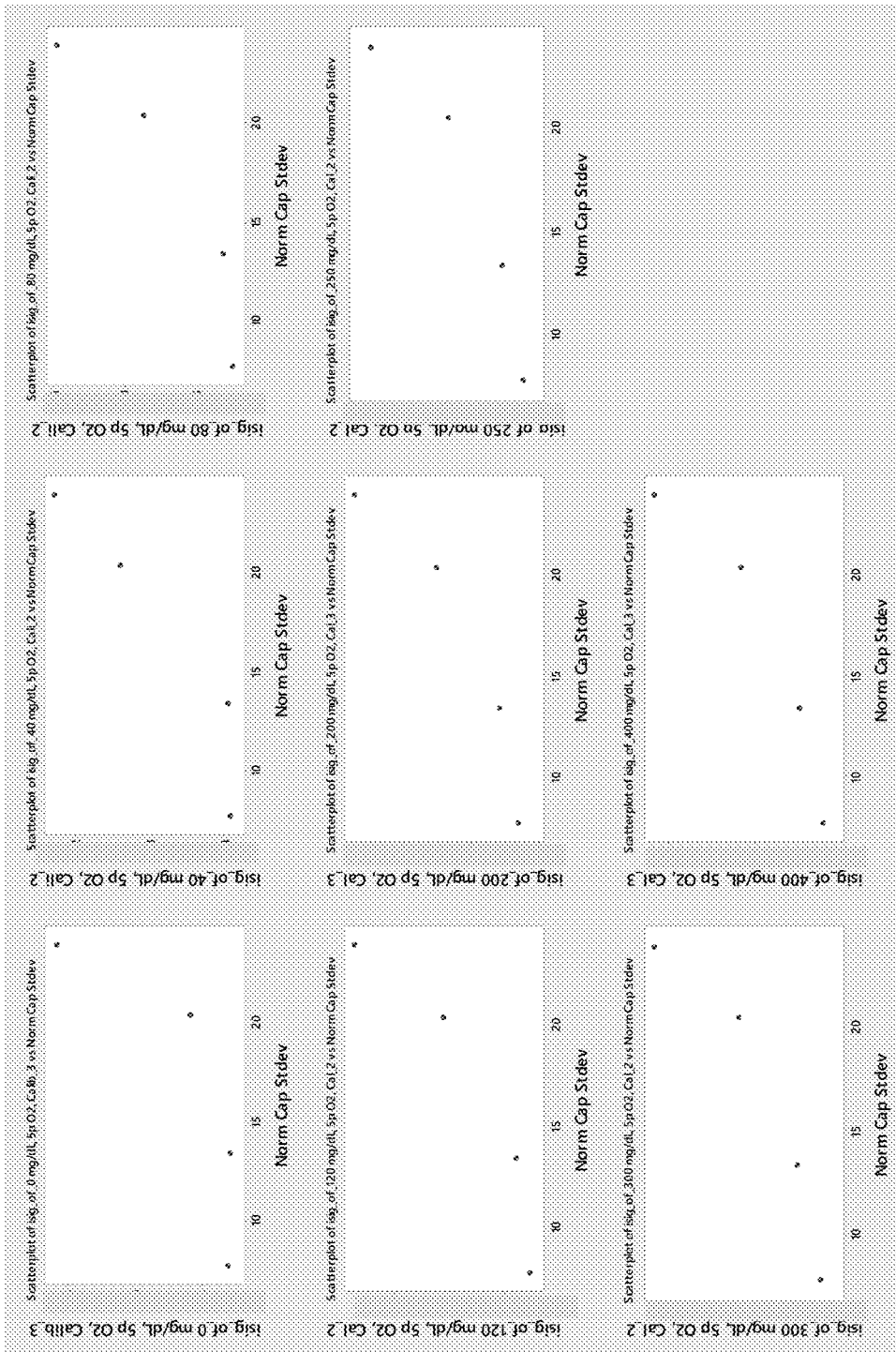
FIG. 19 plots standard deviation of Isig vs normalized standard deviation of capacitance (pF) measured by dry EIS (isig measured for calibration at 5% $O_2$ for various glucose concentrations using the same sensors as in FIG. 13 but on day 14).

FIGS. 12, 14, 16, and 18 plot Isig of the sensors in glucose vs. dry EIS capacitance measured when there is no glucose (measurement in production) on different days (day 1, day 2, day 8, and day 14, respectively). Each box in the data contains data points for measurements of 20 identical PCM structures on a wafer. Different boxes in FIG. 12 represent PCM's having different structures (different thicknesses of HDA) and therefore are characterized by different dry EIS capacitance.

FIGS. 13, 15, 17, and 19 plot standard deviation of Isig of the sensors in glucose vs. standard deviation of dry EIS capacitance measured when there is no glucose (measurement in production) on different days (day 1, day 2, day 8, and day 14, respectively). The standard deviation is for the 20 identical PCM structures on a wafer.

The dry EIS measurements in FIGS. 12-19 are measured at a frequency of the voltage potential that provides an optimal balance between sensitivity, test time, robustness to environmental noise (for FIGS. 12-19, the voltage potential is applied at 1 kHz, 0V DC, and 50 mV AC).

Figure 20:
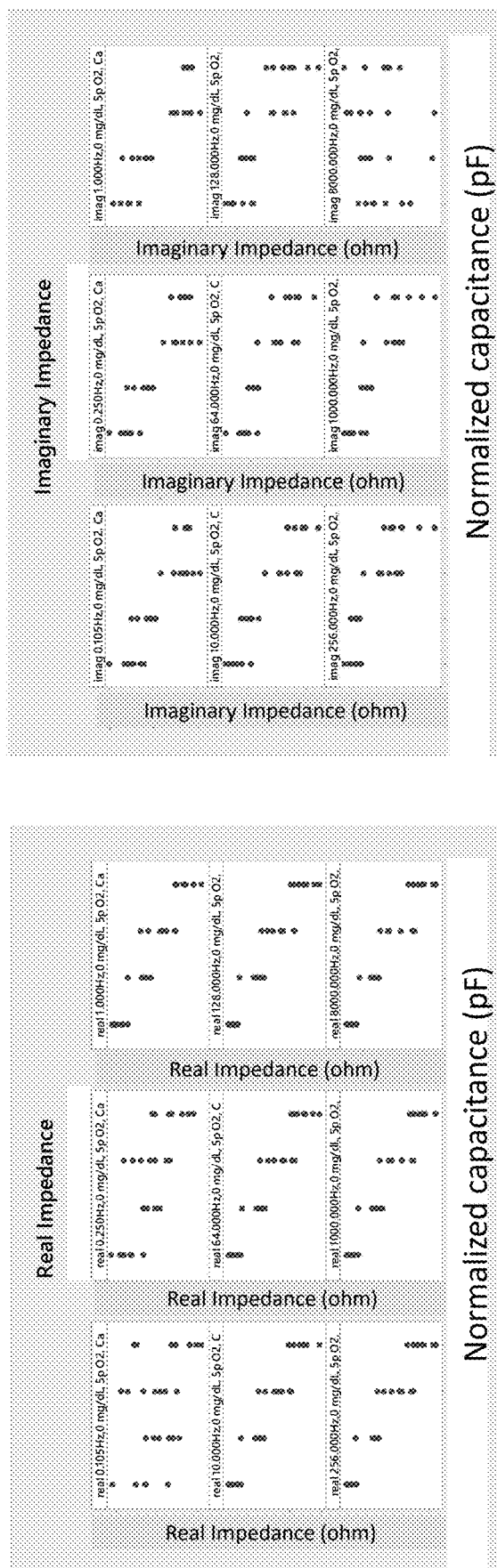
FIG. 20 plots EIS signals (impedance Zreal and Zimag) vs dry EIS capacitance for 0 mg/dL glucose concentration (day 1), for different frequencies of the frequency sweep of the voltage potential, wherein the frequencies, from top left to bottom right, are: 0.105, 0.25, 1, 10, 64, 128, 256, 1000, 8000 Hz.

FIG. 20 illustrates that on day 1, at 0 mg/dL glucose concentration, Zreal for all voltage sweep frequencies besides 0.1 Hz correlates with dry EIS HDA capacitance (higher dry EIS capacitance indicates a lower Zreal). Zimag at all voltage sweep frequencies below 8 k Hz correlates to Dry EIS HDA (higher Dry EIS capacitance indicating lower Zimag).

Figure 21:
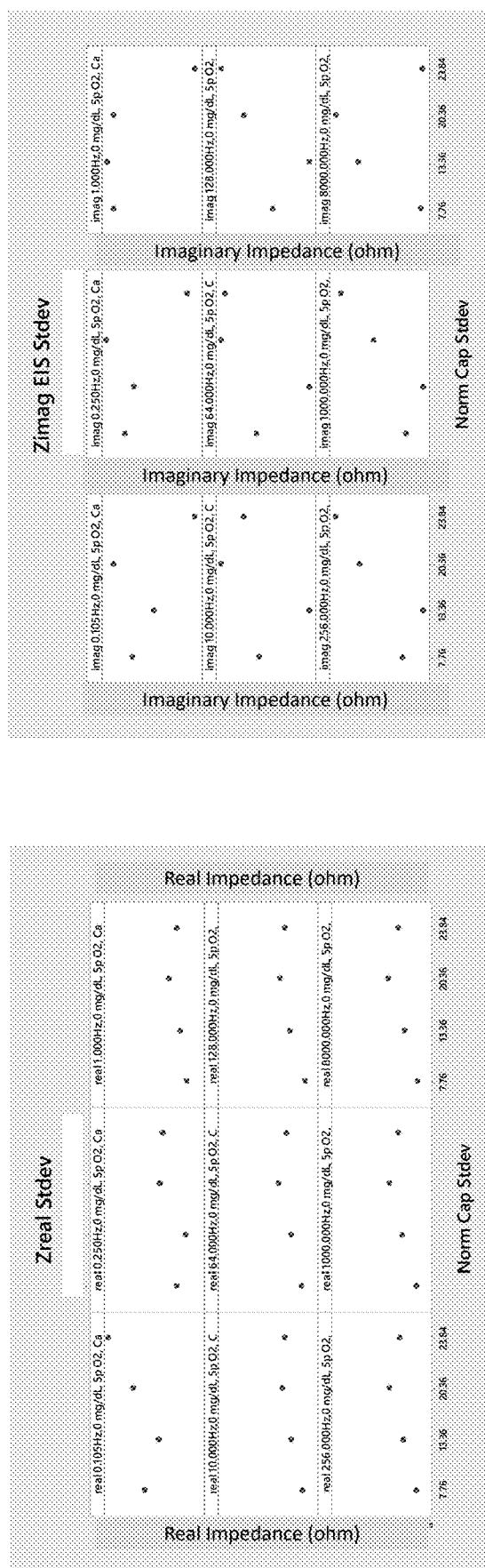
FIG. 21 plots EIS signal (impedance Zreal and Zimag) standard deviation (day 1), for 0 mg/dL glucose concentration, vs capacitance standard deviation measured using dry EIS, wherein the capacitance standard deviation is measured for different frequencies of the frequency sweep of the voltage potential, wherein the frequencies, from top left to bottom right, are: 0.105, 0.25, 1, 10, 64, 128, 256, 1000, 8000 Hz.

FIG. 21 illustrates that on day 1, dry EIS capacitance standard deviation correlates with measurements of standard deviation of Zreal at 0 mg/dL glucose concentration (low Dry EIS standard deviation indicating low Zreal standard deviation).

Figure 22:
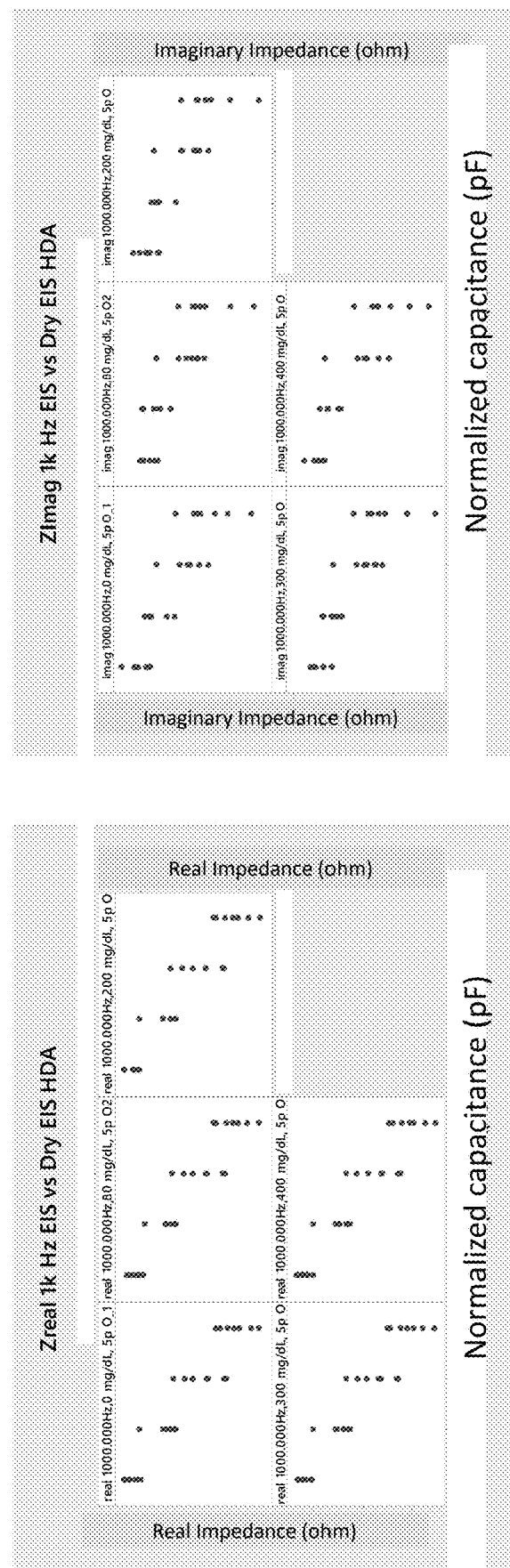
FIG. 22 plots EIS signal (impedance Zreal and Zimag) for different glucose concentrations in the range 0-400 mg/dL vs dry EIS capacitance, wherein the glucose concentrations, from top left to bottom right, are: 0, 80, 200, 300, 400 mg/dL.
Figure 23:
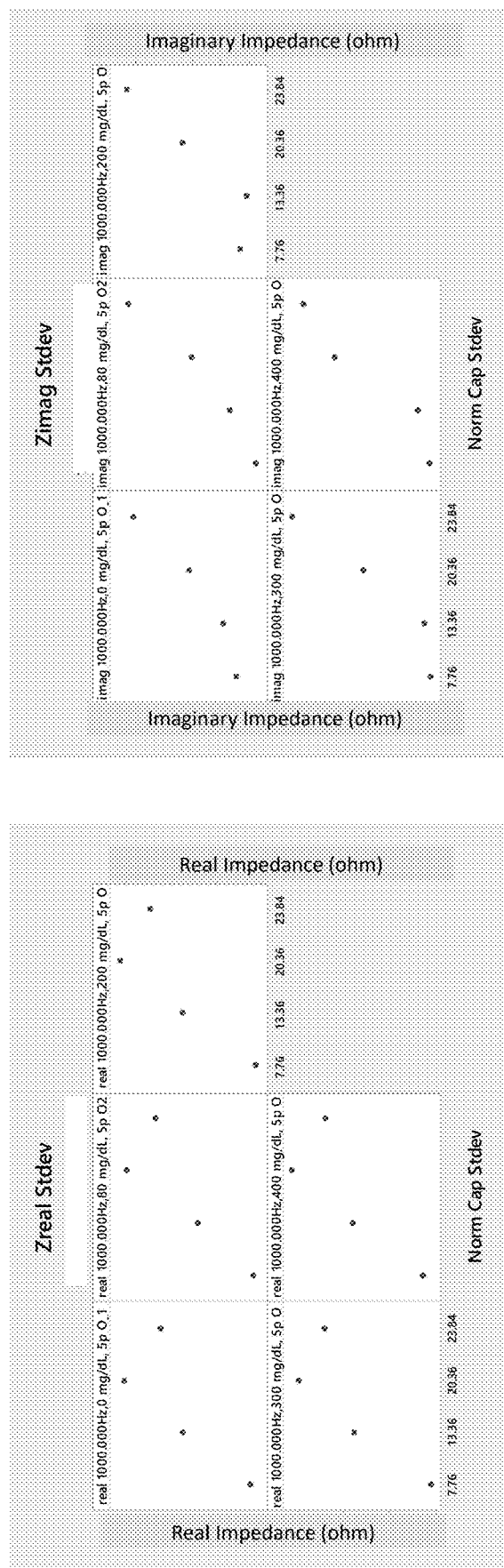
FIG. 23 plots EIS signal (impedance Zreal and Zimag) standard deviation measured at day 2 vs standard deviation of capacitance measured by dry EIS, wherein the EIS signal is measured in different glucose concentrations in a range of 0-400 mg/dL and the glucose concentrations, from top left to bottom right, are: 0, 80, 200, 300, 400 mg/dL.

FIG. 22 illustrates that on day 2, EIS measured at a variety of glucose concentrations in a range of 0-400 mg/dL still correlates to Dry EIS HDA capacitance, with higher dry EIS HDA capacitance indicating lower Zreal and higher dry EIS HDA capacitance indicating lower Zimag. FIG. 23 illustrates that on day 2, EIS standard deviation, measured at a variety of glucose concentrations in range 0-400 mg/dL, still correlates to dry EIS HDA capacitance with lower dry EIS capacitance standard deviation indicating lower Zreal standard deviation and lower dry EIS standard deviation indicating lower Zimag standard deviation.

Figure 24:
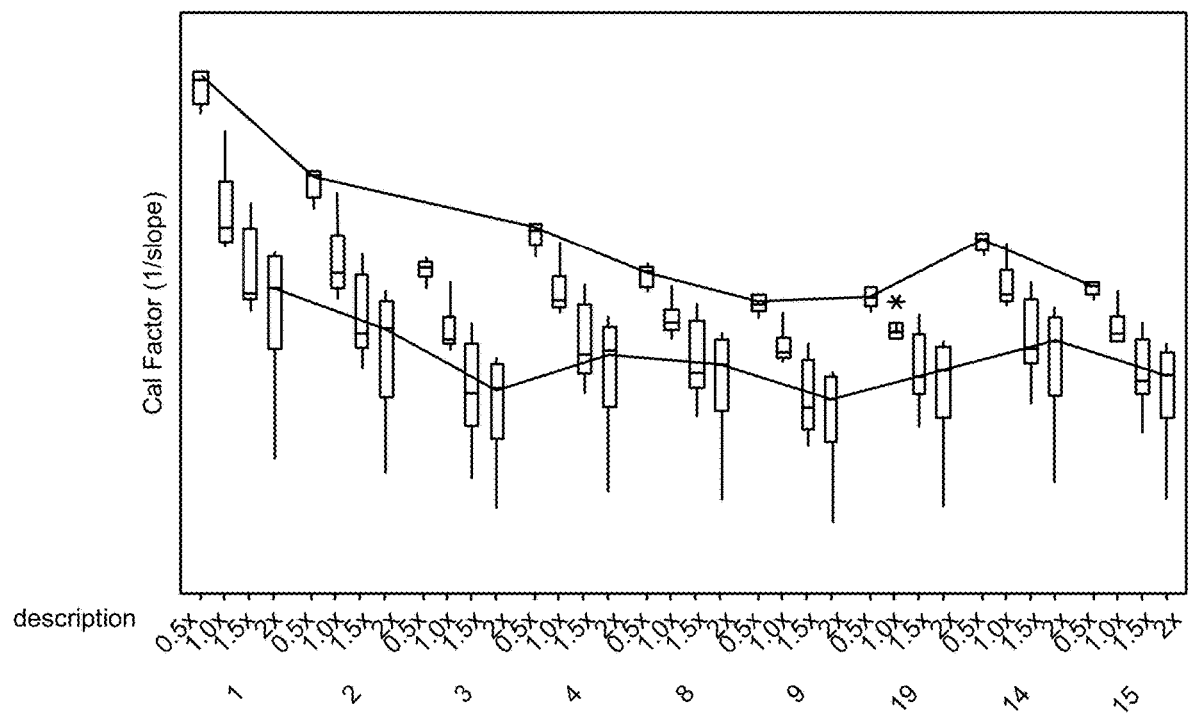
FIG. 24 plots slope and intercept of Isig as a function of time for the sensors characterized herein.
Figure 24:
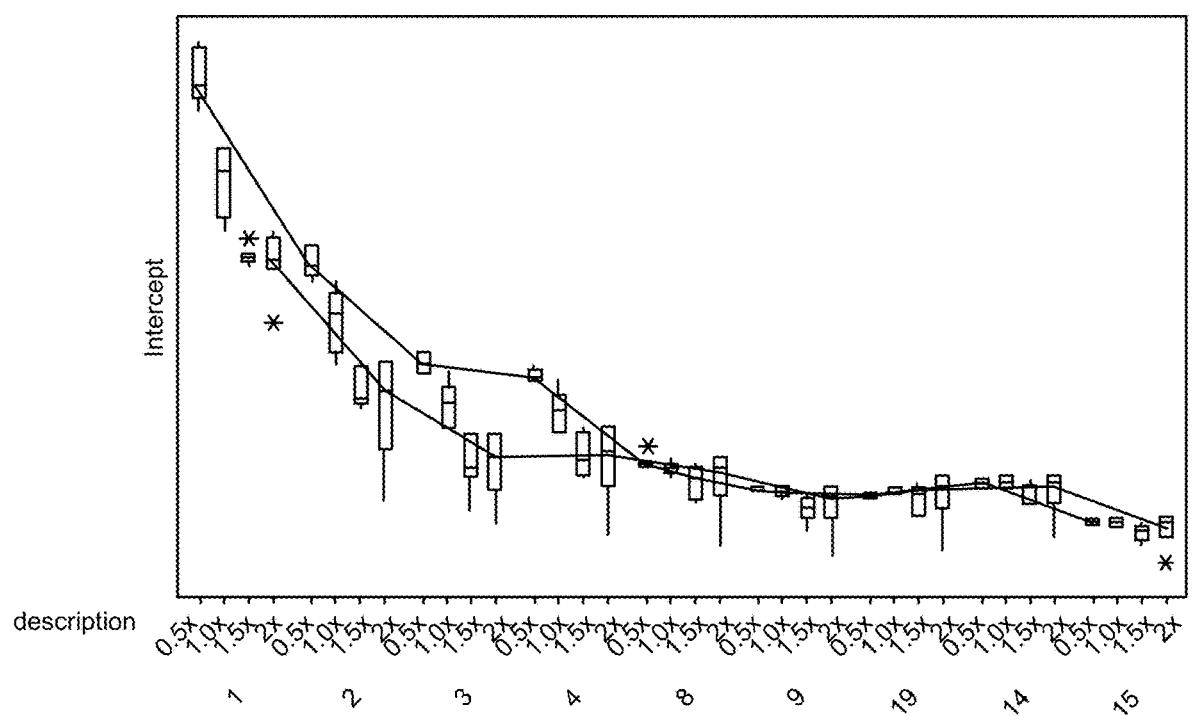

Thus the data in FIGS. 12-23 show correlation between dry EIS measurement of the analyte sensor in production and Isig, standard deviation of Isig, and impedance (real and imaginary) of the analyte sensor when sensing glucose, demonstrating that dry EIS can be used to predict sensor performance. FIG. 24 shows both slope (calibration factor) and intercept of the isig decreases over time, regardless of HDA Dry EIS capacitance. The data shows 0.5×HDA (lowest Dry EIS HDA) takes the longest to stabilize (around day 8) and has the smallest variability in both calibration factor and intercept.

Figure 25:
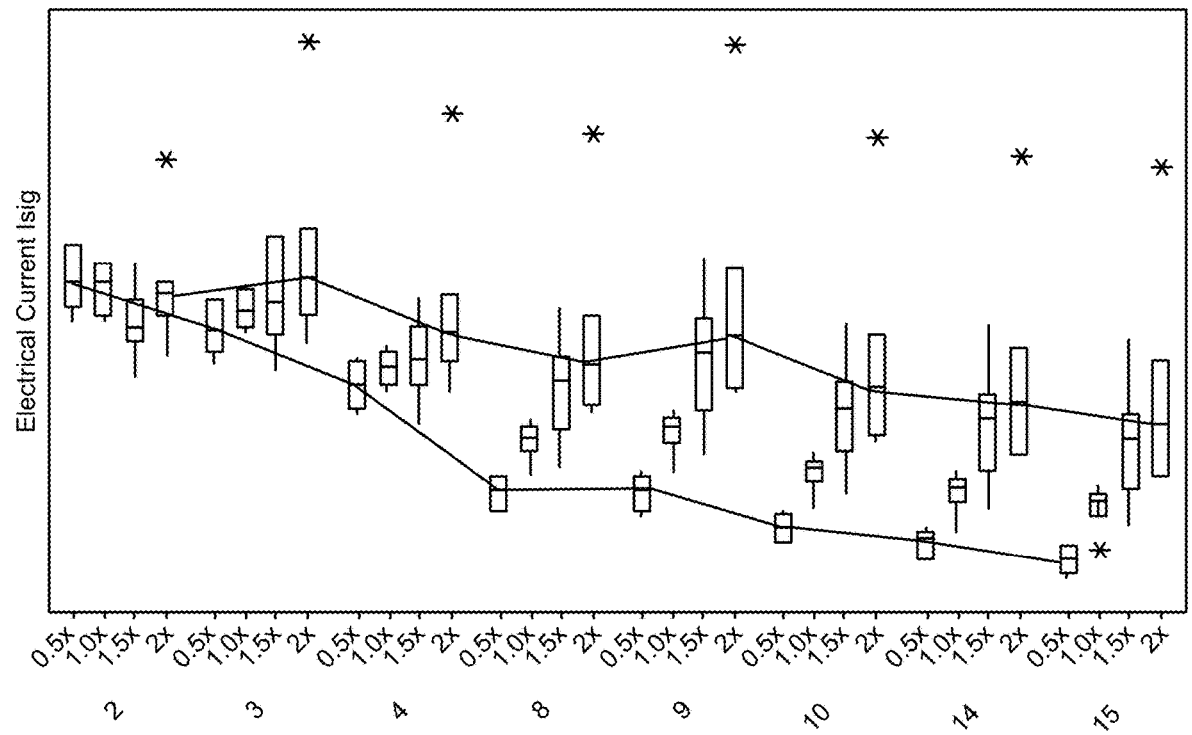
FIG. 25 plots isig over time (for glucose concentrations of 120 mg/dL and 400 mg/dL) and for the analyte sensors characterized herein.
Figure 25:
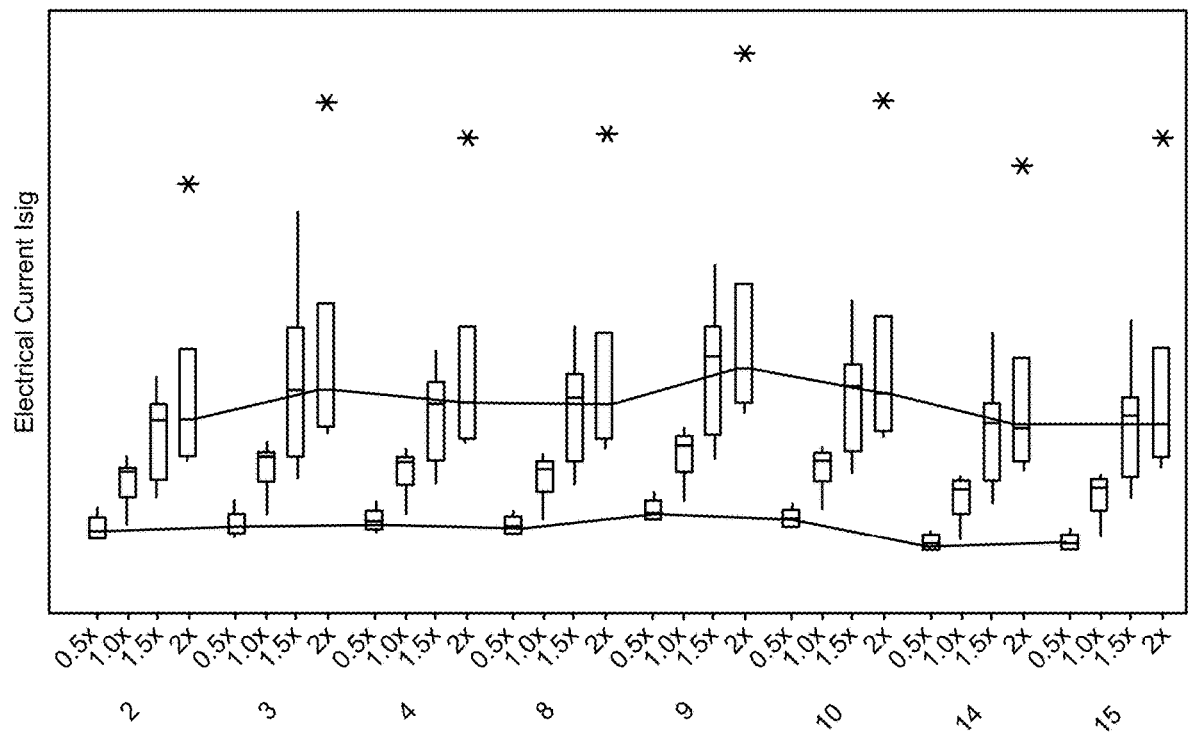
Figure 26:
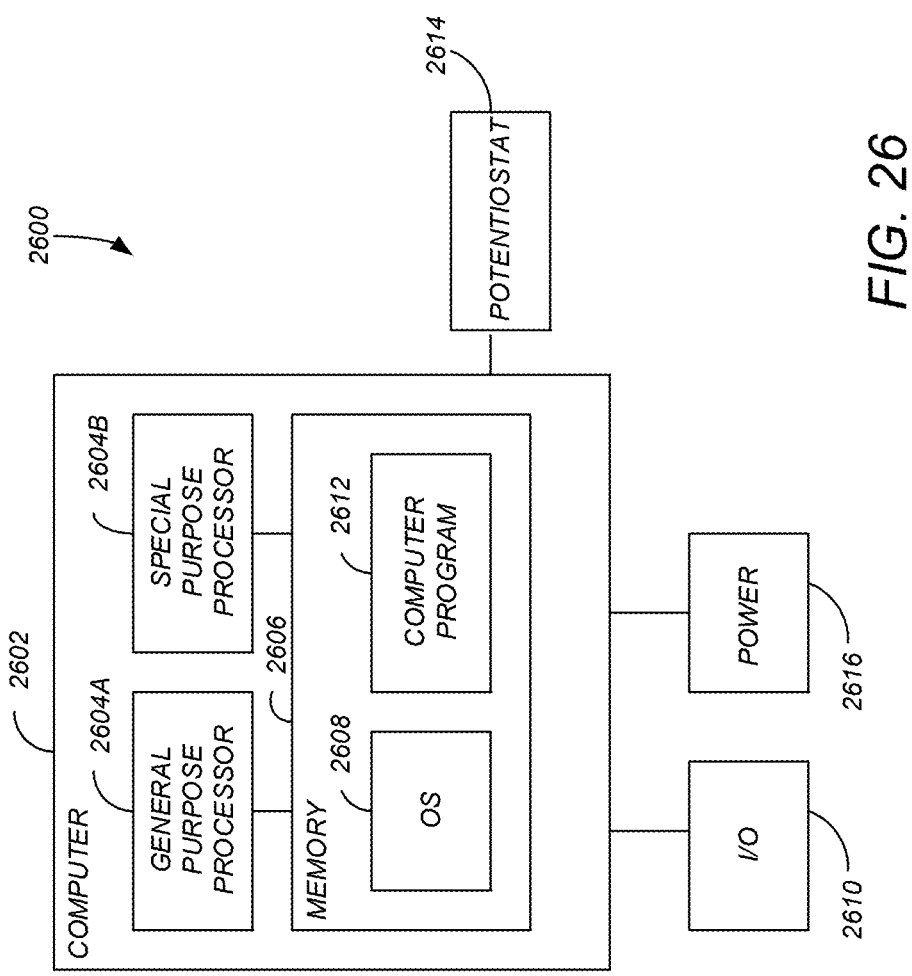
FIG. 26 illustrates an example hardware environment for performing the methods described herein.

FIG. 25 illustrates the reason for decreasing calibration factor and intercept is that Isig at lower glucose concentrations decreases over time, but not as pronounced as at higher glucose concentrations Processing Environment FIG. 26 illustrates an exemplary system 2600 that could be used to apply the voltage potential and perform the methods disclosed herein.

The computer 2602 comprises a processor 2604 (general purpose processor 2604A and special purpose processor 2604B) and a memory, such as random access memory (RAM) 2606. Generally, the computer 2602 operates under control of an operating system 2608 stored in the memory 2606, and interfaces with the user/other computers to accept inputs and commands (e.g., analog or digital signals) and to present results through an input/output (I/O) module 2610. The computer program application 2612 accesses and manipulates data stored in the memory 2606 of the computer 2602. The operating system 2608 and the computer program 2612 are comprised of instructions which, when read and executed by the computer 2602, cause the computer 2602 to perform the operations herein described. In one embodiment, instructions implementing the operating system 2608 and the computer program 2610 are tangibly embodied in the memory 2606, thereby making a computer program product or article of manufacture. As such, the terms "article of manufacture," "program storage device" and "computer program product" as used herein are intended to encompass a computer program accessible from any computer readable device or media.

In one embodiment, computer 2602 comprises one or more field programmable gate arrays (FPGAs) or application specific integrated circuits (ASICs).

The computer system 2600 is connected to the working electrode (e.g., via a circuit such as a potentiostat configured for electrochemical impedance spectroscopy 2614) so as to apply the voltage potentials and sense the output current.

FIG. 26 further illustrates a power source 2616 for providing power to the system 2600.

Those skilled in the art will recognize many modifications may be made to this configuration without departing from the scope of the present disclosure. For example, those skilled in the art will recognize that any combination of the above components, or any number of different components, peripherals, and other devices, may be used.

Process Steps

Figure 27:
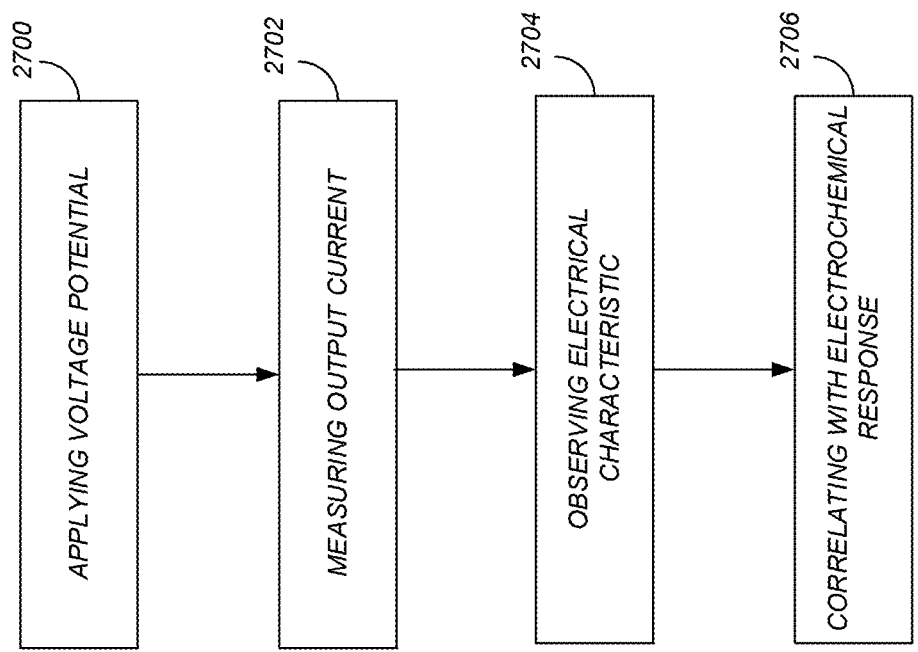
FIG. 27 is a flowchart illustrating an example method for testing an analyte sensor.
Figure 28:
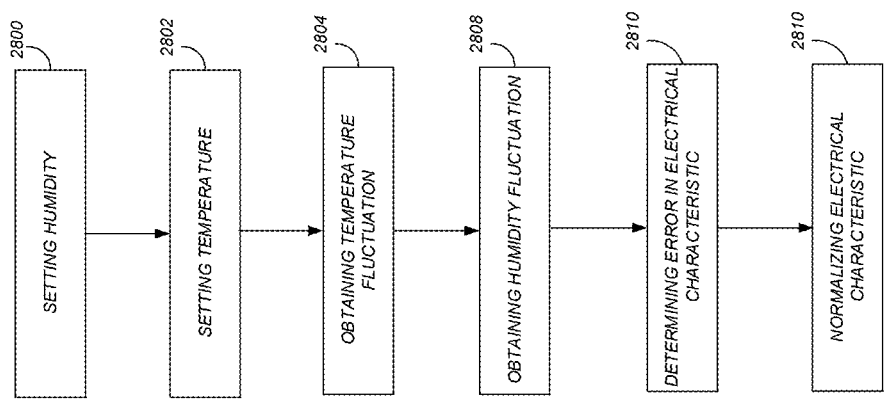
FIG. 28 is a flowchart illustrating using regression for normalization.

FIG. 27 illustrates a method of testing one or more analyte sensors each comprising a first electrode; a second electrode; and a material layer disposed on or above the first electrode. The method comprises the following steps.

Block 2700 represents applying a voltage potential to the first electrode with respect to the second electrode.

Block 2702 represents measuring a test signal (e.g., an output current) from the first electrode that results from the application of the voltage potential.

Block 2704 represents using the test signal from (b) to observe or determine an electrical characteristic of the analyte sensor. Example electrical characteristics include, but are not limited to, capacitance, impedance, admittance, or at least one parameter derived from capacitance, impedance, and admittance.

Block 2706 represents correlating the electrical characteristic with a parameter associated with an electrochemical response of the analyte sensor to an analyte, wherein the testing is under dry conditions without exposure of the electrodes to a fluid containing the analyte or an in-vivo environment containing the analyte.

Illustrative, non-exclusive examples of inventive subject matter according to the present disclosure are described in the following enumerated paragraphs (referring also to FIGS. 1-28):

1. A method of testing one or more analyte sensors 200 each comprising a first electrode (500, WE); a second electrode (501, CE/RE); and a material layer 214 disposed on or above the first electrode; the method comprising:
  (a) applying a voltage potential to the first electrode with respect to the second electrode;
  (b) measuring a test signal comprising an output current from the first electrode that results from the application of the voltage potential;
  (c) using the test signal from (b) to observe an electrical characteristic of the analyte sensor; and
  (d) correlating the electrical characteristic with a parameter associated with an electrochemical response of the analyte sensor to an analyte, wherein the testing is under dry conditions without exposure of the electrodes to a fluid containing the analyte or an in-vivo environment containing the analyte.

2. The method of example 1, wherein the electrical characteristic is capacitance (e.g., magnitude, real and/or imaginary part of the capacitance) of the analyte sensor. In one or more examples, the output current outputted from the first electrode in response to a voltage potential is used to determine the total impedance using. $Z_{total} = \frac{\Delta \tilde{V}}{\Delta \tilde{I}}$, where ΔV is the applied voltage potential and ΔI is the measured output current. The capacitance is determined from Ztotal using:

$$\text{Capacitance} = \frac{1}{2 * \pi * \text{frequency} * Z_{total}},$$

where the frequency is the frequency of the applied voltage potential.

3. The method of example 1 or 2, further comprising determining the parameter associated with the electrochemical response from the electrical characteristic and comparing the parameter to one or more predetermined values so as to determine whether the electrochemical response enables a measurement of a concentration level of the analyte in the in-vivo environment that is useful for determining an administration of insulin to the body of a diabetic patient.

4. The method of any of the examples 1-3, further comprising:
automatically testing a plurality of the analyte sensors 200 in a batch; and
recording the electrical characteristic (e.g., capacitance) for each of the analyte sensors 200 in a database so that the electrical characteristic of each of the analyte sensors can be traced and read from the database.

5. The method of any of the examples 1-4, wherein the first electrode WE comprises a working electrode and the second electrode comprises a reference electrode RE and/or a counter electrode CE.

6. The method of any of the examples 1-5, further comprising correlating the electrical characteristic with at least one property of the material layer, wherein the property comprises:
a dielectric property of the material layer 214;
a thickness of the material layer 214;
an architecture or roughness of the material layer 214;
a concentration of a component in a composition that forms the material layer 214; or
a homogeneity of a composition that forms the material layer. 214

7. The method of any of the examples 1-6, wherein:
the material layer 214 comprises a high density amine layer (HDA, 510); and
the analyte sensor further comprises:
an analyte sensing layer 210 including an enzyme (e.g., glucose oxidase) having a composition that reacts with the analyte (e.g., glucose) to form a byproduct (e.g., hydrogen peroxide), the byproduct detectably altering an electrical current (e.g., Isig) at the working electrode; and
an analyte modulating layer 212 disposed over the analyte sensing layer 210, wherein the analyte modulating layer facilitates the diffusion of the analyte from an external environment to the analyte sensing layer.

8. The method of any of the examples 1-7, wherein:
the parameter comprises a gradient of output current (e.g., Isig) as a function of a concentration level of the analyte, the gradient used to determine a calibration factor (e.g., Cal Factor) needed to measure the concentration level, or
a value of the output current in an absence of the analyte (an intercept), or
the electrical current at the working electrode altered by the byproduct.

9. The method of any of the examples 1-8, wherein the voltage potential comprises an AC voltage having a frequency, a magnitude between two voltages in a range of 5 volts and −5 volts, and the frequency is in a range of 0.1 to 1 megahertz.

10. The method of any of the examples 1-9, wherein correlating the electrical characteristic with the property of the material layer or the parameter comprises application of a mathematical model of impedance.

11. The method of any of the examples 1-10, wherein no ions are transferred between the first electrode and the second electrode in the method such that impedance measured is solely based on charge transfer within the material layer.

12. The method of any of the examples 1-11, wherein the property comprises a thickness of the material layer 214, and the thickness is between 0.1 and 20 microns.

13. The method of any of the examples 1-12, further comprising testing the analyte sensor in a test chamber 602 comprising an environment having a humidity and temperature wherein an error in the measurement of the electrical characteristic (e.g., capacitance) is less than 10%.

14. The method of any of the examples 1-13, wherein the electrical characteristic comprises capacitance of the analyte sensor 200, the method further comprising testing the analyte sensor 200 in a test chamber 602 comprising an environment having a humidity and temperature such that the capacitance is greater than 25 picofarads (pF).

15. The method of any of the examples 1-14, further comprising testing the analyte sensor in a test chamber 602 comprising an environment having a humidity greater than 40% and wherein the analyte sensor 200 is thermally coupled to a temperature chuck 604 having a temperature less than 25 degrees Celsius.

16. The method of any of the examples 13-15, further comprising controlling the humidity so that the humidity varies by less than 1.5% over a period of 10 days or less and the humidity is measured using a humidity probe measuring the humidity with an accuracy of <+/−0.5%.

17. The method of any of the examples 13-16, further comprising controlling the temperature so that the temperature varies by less than 0.1° C. over a period of 10 days and the temperature is measured using a temperature probe measuring the temperature with an accuracy of <+/−0.1° C.

18. The method of any of the examples 1-18, wherein the first electrode 500 and the second electrode 501 are interdigitated 505, the first electrode 500 comprises a first set of at least 40 fingers 502, the second electrode 501 comprises a second set of at least fingers 504, and the first set of fingers and the set of fingers are interdigitated 505 and such that the electrical characteristic is measured with a signal to noise ratio of at least 1000.

19. The method of any of the examples 1-18, further comprising:
normalizing 2810 the electrical characteristic to obtain a normalized electrical characteristic, so as to suppress noise contributions to the electrical characteristic induced by any variability in the an environment of the analyte sensor during the testing.

20. The method of example 19, wherein the normalizing uses linear regression.

21. FIG. 28 illustrates the method of example 19 or 20, further comprising:
setting a humidity target value 900 for a humidity of the environment (Block 2800);
setting a temperature target value 900 for a temperature of the environment (Block 2802);

obtaining a first peak fluctuation (delta chuck temp) of the temperature with respect the temperature target value (Block 2804);

obtaining a second peak fluctuation (delta % RH) of the humidity with respect to the humidity target value (Block 2806);

determining an error (e.g., delta cap) in the electrical characteristic (e.g., capacitance) using a regression equation and fitting parameters including the first peak fluctuation and the second peak fluctuation (Block 2808); and wherein the normalizing (Block 2810) comprises subtracting the error from the electrical characteristic to obtain the normalized electrical characteristic (e.g., using the equation 5).

22. The method of example 21, further comprising selecting a frequency of the voltage potential for which the error in the capacitance is fit by the regression equation with an $R^2$ of at least 0.99.

23. The method of any of the examples 1-22, wherein the charges in the material layer 214 form a leaky capacitor in which the dielectric properties of the material layer are proportional to the amount of the chemistry. The charge density (and consequently the test signal in response to the applied voltage) can be governed by:

the electrode structure: a highly interdigitated electrode enhances charge density ambient humidity: higher humidity improves the moistureness of the film and makes it more conductive surface temperature: colder temperature enhances moisture condensation near the electrode surface 24. The method of any of the examples 1-23, wherein the test signal magnitude depends on at least one of the amount of charges in the target chemistry, the test chamber's humidity, surface temperature, degree of interdigitation of the electrode, and lower limit of detection of the electrical tester that performs the EIS measurements.

25. The method of any of the examples 1-24, wherein the EIS signal's reproducibility depends on at least one of the accuracy of equipment and process monitors, environment normalization algorithm (ENA), data collection and storage (software, automation) and database recording and traceability.

Figure 6D:
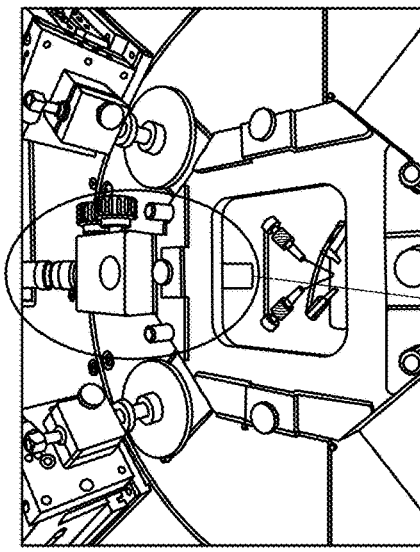
Figure 6C:
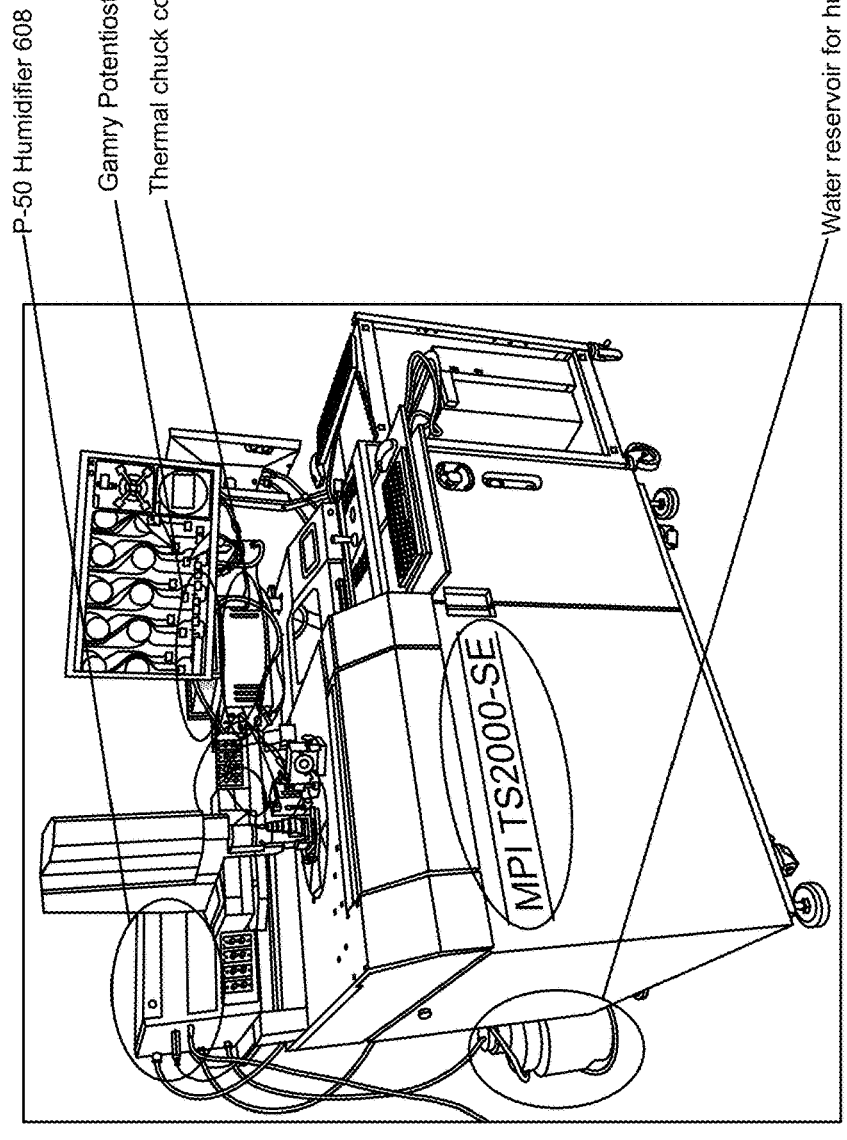

26. FIGS. 6A-6C illustrate an apparatus 600 for testing an electrode for an analyte sensor apparatus, comprising:

a test chamber 602 including a sample chuck for holding an analyte sensor 200, the analyte sensor comprising a first electrode (electrode 1 in FIG. 5A); a second electrode (electrode 2 in FIG. 5A); and a material layer (e.g., HDA) disposed on or above the first electrode, electronic circuitry 616, 301:

(a) applying a voltage potential to the first electrode 500 with respect to the second electrode 501;

(b) measuring a test signal comprising an output current from the first electrode that results from the application of the voltage potential; and a computer 2600:

(c) using the test signal from (b) to observe an electrical characteristic of the analyte sensor; and (d) correlating the electrical characteristic with a parameter associated with an electrochemical response (e.g., Isig) of the analyte sensor 200 to an analyte (e.g., glucose); and wherein the test chamber 602 comprises a dry environment that does not expose the electrodes to a fluid containing the analyte or an in-vivo environment containing the analyte.

27. The apparatus of example 26, further comprising:

a humidifier 608 coupled to the test chamber for controlling a humidity in the test chamber; and at temperature controller 614 controlling a temperature of the electrodes during the testing.

28. The method of any of the examples 1-25 performed using the apparatus of any of the examples 26-27.

29. A computer implemented system for testing an electrode in an analyte sensor apparatus using the method of any of the examples 1-25 or the apparatus of any of the examples 26-28, comprising:

one or more processors; one or more memories; and an application stored in the one or more memories, wherein the application executed by the one or more processors (c) using the test signal from (b) to observe an electrical characteristic of the analyte sensor; and (d) correlating the electrical characteristic with a parameter associated with an electrochemical response (e.g., Isig) of the analyte sensor 200 to an analyte (e.g., glucose); and wherein the test chamber 602 comprises a dry environment that does not expose the electrodes to a fluid containing the analyte or an in-vivo environment containing the analyte.

The method or apparatus of any of the examples 1-29 wherein the analyte sensor comprises a glucose sensor comprising at least one of:

a base layer;

a conductive layer;

an analyte sensing layer;

a protein layer;

an adhesion promoting layer;

a high density amine layer; or an analyte modulating layer.

It is to be understood that this invention is not limited to the particular embodiments described, as such may, of course, vary. It is also to be understood that the terminology used herein is for the purpose of describing particular embodiments only, and is not intended to be limiting, since the scope of the present invention will be limited only by the appended claims. In the description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

What is claimed is:

1. A method of testing one or more analyte sensors each comprising a first electrode; a second electrode; and a material layer disposed on or above the first electrode; the method comprising:

(a) applying a voltage potential to the first electrode with respect to the second electrode;

(b) measuring a test signal comprising an output current from the first electrode that results from the application of the voltage potential;

(c) using the test signal from (b) to determine a capacitance of the one or more analyte sensors, wherein the steps (a)-(c) are performed in an environment outside a human body without exposure of the first electrode and the second electrode to a fluid containing glucose;

(d) correlating the capacitance with a measurement of isig, wherein isig is a current associated with an electrochemical response of the one or more analyte sensors to the fluid containing the glucose, wherein the correlating comprises obtaining a plot of the isig versus the capacitance for a plurality of the one or more analyte sensors having different thicknesses of the material layer; and (e) using the correlating to estimate a thickness of the material layer of the one or more analyte sensors during manufacturing for quality control purposes.

2. The method of claim 1, further comprising determining the estimate of the thickness from the capacitance and comparing the estimate to one or more predetermined values.

3. The method of claim 1, further comprising:
automatically testing the one or more analyte sensors in a batch; and
recording the capacitance for each of the one or more analyte sensors in a database so that the capacitance of each of the one or more analyte sensors can be traced and read from the database.

4. The method of claim 1, wherein the first electrode comprises a working electrode and the second electrode comprises at least one of a reference electrode or a counter electrode.

5. The method of claim 1, further comprising correlating the capacitance with a property of the material layer, wherein the property comprises:
a dielectric property of the material layer;
an architecture or roughness of the material layer;
a concentration of a component in a composition that forms the material layer; or a homogeneity of a composition that forms the material layer.

6. The method of claim 1, wherein:
the material layer comprises a high density amine layer, and each of the one or more analyte sensors further comprise:
an analyte sensing layer including an enzyme having a composition that reacts with the glucose to form a byproduct, the byproduct detectably altering an electrical current at the first working electrode; and
an analyte modulating layer disposed over the analyte sensing layer, wherein the analyte modulating layer facilitates a diffusion of the glucose from an external environment to the analyte sensing layer.

7. The method of claim 6, further comprising correlating the capacitance with a gradient of the isig as a function of a concentration level of the glucose, the gradient used to determine a calibration factor needed to measure the concentration level, and/or
a value of the isig in an absence of the glucose (an intercept).

8. The method of claim 1, wherein the voltage potential comprises an alternating current (AC) voltage having a frequency, a magnitude between two voltages in a range of 5 volts and −5 volts, and the frequency in a range of 0.1 to 1 megahertz.

9. The method of claim 1, wherein no ions are transferred between the first electrode and the second electrode in the steps (a)-(c) such that the capacitance is determined solely based on charge transfer within the material layer.

10. The method of claim 1, further comprising testing the plurality of the one or more analyte sensors in a test chamber comprising the environment having a humidity and a temperature wherein an error in a measurement of the capacitance is less than 10% using the test signal.

11. The method of claim 1, further comprising testing the plurality of the one or more analyte sensors in a test chamber comprising the environment having a humidity and a temperature such that the capacitance is greater than 25 picofarads.

12. The method of claim 1, further comprising:
testing the plurality of the one or more analyte sensors in a test chamber comprising the environment having a humidity greater than 40% and using thermal coupling to a temperature chuck having a temperature less than 25° C.;
controlling the humidity so that the humidity varies by less than 1.5% over a period of 10 days or less and the humidity is measured using a humidity probe measuring the humidity with an accuracy of less than +/−0.5%; and
controlling the temperature so that the temperature varies by less than 0.1° C. over the period of 10 days and the temperature is measured using a temperature probe measuring the temperature with an accuracy of less than +/−0.1° C.

13. The method of claim 1, wherein the first electrode comprises a first set of at least 40 fingers, the second electrode comprises a second set of at least 40 fingers, and the first set of fingers and the second set of fingers are interdigitated such that the capacitance is measured with a signal to noise ratio of at least 1000.

14. The method of claim 1, further comprising:
normalizing the capacitance to obtain a normalized capacitance, so as to suppress noise contributions to the capacitance induced by any variability in the environment of the plurality of the one or more analyte sensors during the testing.

15. The method of claim 14, further comprising:
setting a humidity target value for a humidity of the environment;
setting a temperature target value for a temperature of the environment;
obtaining a first peak fluctuation of the temperature with respect the temperature target value;
obtaining a second peak fluctuation of the humidity with respect to the humidity target value;
determining an error in the capacitance using a regression equation and fitting parameters including the first peak fluctuation and the second peak fluctuation; and
wherein the normalizing comprises subtracting the error from the capacitance to obtain the normalized capacitance.

16. The method of claim 15, further comprising selecting a frequency of the voltage potential for which the error in the capacitance is fit by the regression equation with an $R^2$ regression coefficient of at least 0.99.

17. The method of claim 1, wherein the steps (a)-(b) are performed using electrochemical impedance spectroscopy.

18. The method of claim 17, wherein the step (c) comprises determining the capacitance using:

$$\text{Capacitance} = \frac{1}{2 * \pi * \text{frequency} * Z_{total}}$$

wherein $Z_{total} = \Delta V/\Delta I$, $\Delta V$ is the voltage potential, and $\Delta I$ is output current in response to the voltage potential.

19. The method of claim 1, further comprising using the correlating to calibrate the one or more analyte sensors for measurement of the glucose.

20. A method of testing one or more analyte sensors each comprising a first electrode; a second electrode; and a material layer disposed on or above the first electrode; the method comprising:

(a) applying a voltage potential to the first electrode with respect to the second electrode;
(b) measuring a test signal comprising an output current from the first electrode that results from the application of the voltage potential;
(c) using the test signal from (b) to determine a capacitance of the one or more analyte sensors, wherein the steps (a)-(c) are performed in an environment outside a human body without exposure of the first electrode and the second electrode to a fluid containing glucose;
(d) correlating the capacitance with a measurement of isig, wherein isig is a current associated with an electrochemical response of the one or more analyte sensors to the fluid containing the glucose, wherein the correlating comprises obtaining a plot of the isig versus the capacitance for a plurality of the one or more analyte sensors having different thicknesses of the material layer; and
(e) performing the correlating to obtain the plot for a first plurality of the one or more analyte sensors and estimating the thickness and/or the isig for a second plurality of the one or more analyte sensors from the capacitance determined using steps (a)-(c) and the correlating.

* * * * *